(12) United States Patent
Poudel et al.

(10) Patent No.: US 12,565,428 B2
(45) Date of Patent: *Mar. 3, 2026

(54) SOLID ELECTROLYTES AND METHODS FOR MAKING THE SAME

(71) Applicant: Florida State University Research Foundation, Inc., Tallahassee, FL (US)

(72) Inventors: Tej Prasad Poudel, Tallahassee, FL (US); Yan-Yan Hu, Tallahassee, FL (US); Ifeoluwa Peter Oyekunle, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/221,851

(22) Filed: May 29, 2025

(65) Prior Publication Data

US 2025/0289728 A1 Sep. 18, 2025

Related U.S. Application Data

(63) Continuation of application No. 18/959,854, filed on Nov. 26, 2024, now Pat. No. 12,365,598.

(60) Provisional application No. 63/603,404, filed on Nov. 28, 2023.

(51) Int. Cl.
| | |
|---|---|
| *C01G 15/00* | (2006.01) |
| *C01F 7/78* | (2022.01) |
| *H01M 10/0562* | (2010.01) |

(52) U.S. Cl.
CPC .............. *C01G 15/006* (2013.01); *C01F 7/78* (2022.01); *H01M 10/0562* (2013.01); *C01P 2002/72* (2013.01); *C01P 2002/76* (2013.01); *C01P 2002/77* (2013.01); *C01P 2002/86* (2013.01); *C01P 2006/40* (2013.01); *H01M 2300/0068* (2013.01)

(58) Field of Classification Search
CPC ..................................................... C01B 17/22
See application file for complete search history.

(56) References Cited

U.S. PATENT DOCUMENTS

| | | | |
|---|---|---|---|
| 11,462,766 | B2 | 10/2022 | Mo et al. |
| 2012/0077070 | A1 | 3/2012 | Soloveichik et al. |
| 2019/0260074 | A1 | 8/2019 | Hambitzer |
| 2020/0411903 | A1 | 12/2020 | Hambitzer |

OTHER PUBLICATIONS

Gao et al. "LiAlCl4.3SO2 as a high conductive, non-flammable and inorganic non-aqueous liquid electrolyte for lithium ion batteries" Electrochimica Acta, 2018, 286, 77-85. (Year: 2018).*

Nagel et al. "6Li and 7Li MAS-NMR studies on fast ionic conducting inverse spinel-type Li2-2xMg1+xCI4 and normal spinel-type Li2ZnCl4" Solid State Ionics, 2000, 130, 1-2, pp. 169-173. (Year: 2000).*

Ong et al. "Python Materials Genomics (pymatgen): A robust, open sourced python library for materials analysis" Computational Materials Sciences, 2013, 68, 314-319. (Year: 2013).*

Shastri et al. "The novel oxy-sulfide glassy ionic conductors Na4P2S7-xOx 0 <= x <= 7: Understanding the features of static and dynamic cations" Solid State Ionics, 2023, 402, 116363. (Year: 2023).*

Campos, J. M. S. D., & Viccini, L. F. (2003). Cytotoxicity of aluminum on meristematic cells of *Zea mays* and Allium cepa. Caryologia, 56(1), 65-73. https://doi.org/10.1080/00087114.2003. 10589309.

J. Mark Weller, Minyuan M. Li, Evgueni Polikarpov, Kee Sung Han, Neil Kidner, Anant Patel, Mai Nguyen, Meghan Stout, Michael Gossett, Keeyoung Jung, David M. Reed, Vincent L. Sprenkle, Guosheng Li, Unlocking the NaCl—AlCl3 phase diagram for low-cost, long-duration Na—Al batteries, Energy Storage Materials,vol. 56,2023,pp. 108-120,ISSN 2405-8297,https://doi.org/10.1016/j.ensm. 2023.01.009.(https://www.sciencedirect.com/science/article/pii/ S2405829723000107).

Scholz, F., Unkrig, W., Eiden, P., Schmidt, M. A., Garsuch, A., & Krossing, I. (2015). Synthesis, spectroscopic characterization, crystal structures, energetics, and thermal stabilities of LI[ALX4] (X=Cl, Br): investigation and performance of their electrolyte solutions. European Journal of Inorganic Chemistry, 2015(19), 3128-3138. https://doi.org/10.1002/ejic.201500254.

Flores-González N, Minafra N, Dewald G, Reardon H, Smith RI, Adams S, Zeier WG, Gregory DH. Mechanochemical Synthesis and Structure of Lithium Tetrahaloaluminates, LiAlX4 (X=Cl, Br, I): A Family of Li-Ion Conducting Ternary Halides. ACS Mater Lett. May 3, 2021;3(5):652-657. doi: 10.1021/acsmaterialslett.1c00055. Epub Apr. 20, 2021. PMID: 34476400; PMCID: PMC8397468.

Tanibata, N., Takimoto, S., Nakano, K., Takeda, H., Nakayama, M., & Sumi, H. (2020). Metastable Chloride Solid Electrolyte with High Formability for Rechargeable All-Solid-State Lithium Metal Batteries. ACS Materials Letters, 2(8), 880-886. https://doi.org/10.1021/ acsmaterialslett.0c00127.

Richards, W. D., Miara, L. J., Wang, Y., Kim, J. C., & Ceder, G. (2015). Interface stability in Solid-State batteries. Chemistry of Materials, 28(1), 266-273. https://doi.org/10.1021/acs.chemmater. 5b04082.

(Continued)

*Primary Examiner* — Peter F Godenschwager
(74) *Attorney, Agent, or Firm* — Thomas | Horstemeyer, LLP

(57) ABSTRACT

In accordance with the purpose(s) of the present disclosure, as embodied and broadly described herein, the disclosure, in one aspect, relates to solid chalcohalide electrolytes and the efficient synthesis of solid chalcohalide electrolytes. The electrolytes have the general formula $A_aM_bN_cX_dY_eS_f$ and have relatively high ionic conductivity. The electrolytes can be a component of different types of batteries. The process of synthesizing the electrolytes can be done with cost-effective materials, which is useful for scaling-up production of batteries such as all-solid-state batteries.

8 Claims, 17 Drawing Sheets

(56) References Cited

OTHER PUBLICATIONS

Park, J., Son, J. P., Ko, W., Kim, J., Choi, Y., Kim, H., Kwak, H., Seo, D., Kim, J., & Jung, Y. S. (2022). NAALCL4: New Halide Solid electrolyte for 3 v Stable Cost-Effective All-Solid-State Na-Ion batteries. ACS Energy Letters, 7(10), 3293-3301. https://doi.org/10.1021/acsenergylett.2c01514.

Weppner, W., & Huggins, R. A. (1977). Ionic conductivity of solid and liquid LIALCL4. Journal of the Electrochemical Society, 124(1), 35-38. https://doi.org/10.1149/1.2133238.

Feng, X., Chien, P., Zhu, Z., Chu, I., Wang, P., Immediato-Scuotto, M., Arabzadeh, H., Ong, S. P., & Hu, Y. (2019). Studies of Functional Defects for Fast Na-Ion Conduction in Na3-yPS4-xCIx with a Combined Experimental and Computational Approach. Advanced Functional Materials, 29(9). https://doi.org/10.1002/adfm.201807951.

Patel, S. V., Banerjee, S., Liu, H., Wang, P., Chien, P., Feng, X., Liu, J., Ong, S. P., & Hu, Y. (2021). Tunable Lithium-Ion transport in Mixed-Halide argyrodites Ll6-xPS5-xCLBRX: an unusual compositional space. Chemistry of Materials, 33(4), 1435-1443. https://doi.org/10.1021/acs.chemmater.0c04650.

Karabelli, D., Birke, K. P., & Weeber, M. (2021). A Performance and Cost Overview of Selected Solid-State Electrolytes: Race between Polymer Electrolytes and Inorganic Sulfide Electrolytes. Batteries, 7(1), 18. https://doi.org/10.3390/batteries7010018.

Wood Brandon C., Varley Joel B., Kweon Kyoung E., Shea Patrick, Hall Alex T., Grieder Andrew, Ward Michael, Aguirre Vincent P., Rigling Dylan, Lopez Ventura Eduardo, Stancill Chimara and Adelstein Nicole 2021Paradigms of frustration in superionic solid electrolytesPhil. Trans. R. Soc. A.37920190467 http://doi.org/10.1098/rsta.2019.0467.

Deck, M. J., & Hu, Y. (2023). Leveraging local structural disorder for enhanced ion transport. Journal of Materials Research/Pratt's Guide to Venture Capital Sources, 38(10), 2631-2644. https://doi.org/10.1557/s43578-023-01023-8.

Gao, Y., Nolan, A. M., Du, P., Wu, Y., Yang, C., Chen, Q., Mo, Y., & Bo, S. (2020). Classical and emerging characterization techniques for investigation of ion transport mechanisms in crystalline fast ionic conductors. Chemical Reviews, 120(13), 5954-6008. https://doi.org/10.1021/acs.chemrev.9b00747.

Wu N, Chien PH, Qian Y, Li Y, Xu H, Grundish NS, Xu B, Jin H, Hu YY, Yu G, Goodenough JB. Enhanced Surface Interactions Enable Fast Li+ Conduction in Oxide/Polymer Composite Electrolyte. Angew Chem Int Ed Engl. Mar. 2, 2020;59(10):4131-4137. doi: 10.1002/anie.201914478. Epub Jan. 23, 2020. PMID: 31893468.

Nagel, R., Groß, T., Günther, H., & Lutz, H. D. (2002). 6li and 7li mas nmr studies on fast ionic conducting spinel-type li2mgcl4, li2-xcuxmgcl4, li2-xnaxmgcl4, and li2zncl4. Journal of Solid State Chemistry, 165(2), 303-311. https://doi.org/10.1006/jssc.2002.9534.

Duff BB, Elliott SJ, Gamon J, Daniels LM, Rosseinsky MJ, Blanc F. Toward Understanding of the Li-Ion Migration Pathways in the Lithium Aluminum Sulfides Li3AlS3 and Li4.3AlS3.3CI0.7 via 6,7Li Solid-State Nuclear Magnetic Resonance Spectroscopy. Chem Mater. Dec. 16, 2022;35(1):27-40. doi: 10.1021/acs.chemmater.2c02101. PMID: 36644214; PMCID: PMC9835825.

Laura A. Huff, Jennifer L. Rapp, Jessi A. Baughman, Peter L. Rinaldi, Andrew A. Gewirth, Identification of lithium-sulfur battery discharge products through 6Li and 33S solid-state MAS and 7Li solution NMR spectroscopy, Surface Science, vol. 631,2015,pp. 295-300,ISSN 0039-6028,https://doi.org/10.1016/j.susc.2014.07.027. (https://www.sciencedirect.com/science/article/pii/S0039602814002209).

Zhang Z, Roy PN, Li H, Avdeev M, Nazar LF. Coupled Cation-Anion Dynamics Enhances Cation Mobility in Room-Temperature Superionic Solid-State Electrolytes. J Am Chem Soc. Dec. 11, 2019;141(49):19360-19372. doi: 10.1021/jacs.9b09343. Epub Nov. 27, 2019. PMID: 31701751.

Wang, K., Ren, Q., Gu, Z. et al. A cost-effective and humidity-tolerant chloride solid electrolyte for lithium batteries. Nat Commun 12, 4410 (2021). https://doi.org/10.1038/s41467-021-24697-2.

Tsai, P., Mair, S., Smith, J., Halat, D. M., Chien, P., Kim, K., Zhang, D., Li, Y., Yin, L., Liu, J., Lapidus, S. H., Reimer, J. A., Balsara, N. P., Siegel, D. J., & Chiang, Y. (2022). Double Paddle-Wheel enhanced sodium ion conduction in an antiperovskite solid electrolyte. Advanced Energy Materials, 13(7). https://doi.org/10.1002/aenm.202203284.

Ohno, S., Rosenbach, C., Dewald, G. F., Janek, J., & Zeier, W. G. (2021). Linking Solid Electrolyte Degradation to Charge Carrier Transport in the Thiophosphate-Based Composite Cathode toward Solid-State Lithium-Sulfur Batteries. Advanced Functional Materials, 31(18). https://doi.org/10.1002/adfm.202010620.

Zhang, Q., Arnold, W., Hood, Z. D., Li, Y., DeWees, R., Chi, M., Chen, Z., Chen, Y., & Wang, H. (2021). Li0.625Al0.125H0.25Cl0.75O0.25 Superionic Conductor with Disordered Rock-Salt Structure. ACS Applied Energy Materials, 4(8), 7674-7680. https://doi.org/10.1021/acsaem.1c01011.

Olson M, Kmiec S, Martin SW. NaPON Doping of Na4P2S7 Glass and Its Effects on the Structure and Properties of Mixed Oxy-Sulfide-Nitride Phosphate Glass. Inorg Chem. Nov. 7, 2022;61(44):17469-17484. doi: 10.1021/acs.inorgchem.2c02300. Epub Oct. 24, 2022. PMID: 36279422.

Zheng J, Hu YY. New Insights into the Compositional Dependence of Li-Ion Transport in Polymer-Ceramic Composite Electrolytes. ACS Appl Mater Interfaces. Jan. 31, 2018; 10(4):4113-4120. doi: 10.1021/acsami.7b17301. Epub Jan. 16, 2018. PMID: 29303244.

Wang, P., Liu, H., Patel, S., Feng, X., Chien, P., Wang, Y., & Hu, Y. (2020). Fast Ion Conduction and Its Origin in Li6-xPS5-xBr1+x. Chemistry of Materials, 32(9), 3833-3840. https://doi.org/10.1021/acs.chemmater.9b05331.

Bloembergen, N., Purcell, E. M., & Pound, R. V. (1948). Relaxation effects in nuclear magnetic resonance absorption. Physical Review, 73(7), 679-712. https://doi.org/10.1103/physrev.73.679.

Gamon, J., Dyer, M. S., Duff, B. B., Vasylenko, A., Daniels, L. M., Zanella, M., Gaultois, M. W., Blanc, F., Claridge, J. B., & Rosseinsky, M. J. (2021). Li4.3AlS3.3Cl0.7: A Sulfide-Chloride Lithium Ion Conductor with Highly Disordered Structure and Increased Conductivity. Chemistry of Materials, 33(22), 8733-8744. https://doi.org/10.1021/acs.chemmater.1c02751.

Wang, Y., Richards, W., Ong, S. et al. Design principles for solid-state lithium superionic conductors. Nature Mater 14, 1026-1031 (2015). https://doi.org/10.1038/nmat4369.

Perdew JP, Burke K, Ernzerhof M. Generalized Gradient Approximation Made Simple. Phys Rev Lett. Oct. 28, 1996;77(18):3865-3868. doi: 10.1103/PhysRevLett.77.3865. PMID: 10062328.

Blöchl, P. E. (1994). Projector augmented-wave method. Physical Review. B, Condensed Matter, 50(24), 17953-17979. https://doi.org/10.1103/physrevb.50.17953.

Kresse G, Furthmüller J. Efficient iterative schemes for ab initio total-energy calculations using a plane-wave basis set. Phys Rev B Condens Matter. Oct. 15, 1996;54(16):11169-11186. doi: 10.1103/physrevb.54.11169. PMID: 9984901.

Deck, M. J., Chien, P., Poudel, T. P., Jin, Y., Liu, H., & Hu, Y. (2023). Oxygen-Induced structural disruption for improved LI+ transport and electrochemical stability of LI3PS4. Advanced Energy Materials, 14(4). https://doi.org/10.1002/aenm.202302785.

Poudel, T. P., Deck, M. J., Wang, P., & Hu, Y. (2023). Transforming Li3PS4 via Halide Incorporation: a Path to Improved Ionic Conductivity and Stability in All-Solid-State Batteries. Advanced Functional Materials, 34(4). https://doi.org/10.1002/adfm.202309656.

Cao, X., Xu, S., Zhang, Y. et al. Fluorine-Doped High-Performance Li6PS5Cl Electrolyte by Lithium Fluoride Nanoparticles for All-Solid-State Lithium-Metal Batteries. Trans. Tianjin Univ. 30, 250-261 (2024). https://doi.org/10.1007/s12209-024-00394-1.

Bui, A. D., Choi, S., Choi, H., Lee, Y., Doh, C., Park, J., Kim, B. G., Lee, W., Lee, S., & Ha, Y. (2021). Origin of the outstanding performance of dual Halide doped LI7P2S8X (X=I, Br) solid electrolytes for All-Solid-State lithium batteries. ACS Applied Energy Materials, 4(1), 1-8. https://doi.org/10.1021/acsaem.0c02321.

Wang, S.; Fang, R.; Li, Y.; Liu, Y.; Xin, C.; Richter, F. H.; Nan, C.-W. Interfacial Challenges for All-Solid-State Batteries Based on

(56) References Cited

OTHER PUBLICATIONS

Sulfide Solid Electrolytes. Journal of Materiomics 2021, 7 (2), 209-218. https://doi.org/10.1016/j.jmat.2020.09.003.

Han, F., Zhu, Y., He, X., Mo, Y., & Wang, C. (2016). Electrochemical stability of LI10GEP2S12 and LI7LA3ZR2O12 solid electrolytes. Advanced Energy Materials, 6(8). https://doi.org/10.1002/aenm.201501590.

Tian, Y., Shi, T., Richards, W. D., Li, J., Kim, J. C., Bo, S., & Ceder, G. (2017). Compatibility issues between electrodes and electrolytes in solid-state batteries. Energy & Environmental Science, 10(5), 1150-1166. https://doi.org/10.1039/c7ee00534b.

Tan, D. H. S., Wu, E. A., Nguyen, H., Chen, Z., Marple, M. a. T., Doux, J., Wang, X., Yang, H., Banerjee, A., & Meng, Y. S. (2019). Elucidating reversible electrochemical redox of LI6PS5CL solid electrolyte. ACS Energy Letters, 4 (10), 2418-2427. https://doi.org/10.1021/acsenergylett.9b01693.

Dewald, G. F., Ohno, S., Kraft, M. A., Koerver, R., Till, P., Vargas-Barbosa, N. M., Janek, J., & Zeier, W. G. (2019). Experimental assessment of the practical oxidative stability of lithium thiophosphate solid electrolytes. Chemistry of Materials, 31(20), 8328-8337. https://doi.org/10.1021/acs.chemmater.9b01550.

Zheng, J., Tang, M., & Hu, Y. (2016). Lithium Ion Pathway within Li 7 La 3 Zr 2 O 12—Polyethylene Oxide Composite Electrolytes. Angewandte Chemie International Edition, 55(40), 12538-12542. https://doi.org/10.1002/anie.201607539.

Zheng, J., Dang, H., Feng, X., Chien, P., & Hu, Y. (2017). Li-ion transport in a representative ceramic-polymer-plasticizer composite electrolyte: Li7La3Zr2O12-polyethylene oxide-tetraethylene glycol dimethyl ether. Journal of Materials Chemistry A, 5(35), 18457-18463. https://doi.org/10.1039/c7ta05832b.

Shin, B. R.; Nam, Y. J.; Kim, J. W.; Lee, Y.-G.; Jung, Y. S. Interfacial Architecture for Extra Li+ Storage in All-Solid-State Lithium Batteries. Sci Rep 2014, 4 (1), 5572. https://doi.org/10.1038/srep05572.

Oh, D. Y.; Choi, Y. E.; Kim, D. H.; Lee, Y.-G.; Kim, B.-S.; Park, J.; Sohn, H.; Jung, Y. S. All-Solid-State Lithium-Ion Batteries with TiS2 Nanosheets and Sulphide Solid Electrolytes. J. Mater. Chem. A 2016, 4 (26), 10329-10335. https://doi.org/10.1039/C6TA01628F.

Minnmann, P.; Quillman, L.; Burkhardt, S.; Richter, F. H.; Janek, J. Editors' Choice—Quantifying the Impact of Charge Transport Bottlenecks in Composite Cathodes of All-Solid-State Batteries. J. Electrochem. Soc. 2021, 168 (4), 040537. https://doi.org/10.1149/1945-7111/abf8d7.

Qu, J.; Xiao, J.; Wang, T.; Legut, D.; Zhang, Q. High Rate Transfer Mechanism of Lithium Ions in Lithium-Tin and Lithium-Indium Alloys for Lithium Batteries. J. Phys. Chem. C 2020, 124 (45), 24644-24652. https://doi.org/10.1021/acs.jpcc.0c07880.

Wang, S., Bai, Q., Nolan, A. M., Liu, Y., Gong, S., Sun, Q., & Mo, Y. (2019). Lithium Chlorides and Bromides as Promising Solid-State Chemistries for Fast Ion Conductors with Good Electrochemical Stability. Angewandte Chemie International Edition, 58(24), 8039-8043. https://doi.org/10.1002/anie.201901938.

Banerjee, S., Chandrappa, M. L. H., & Ong, S. P. (2022). Role of critical oxygen concentration in the B-LI3PS4-XOx solid electrolyte. ACS Applied Energy Materials, 5(1), 35-41. https://doi.org/10.1021/acsaem.1c03795.

International Search Report for PCT/US24/57397 application mailed Mar. 3, 2025.

* cited by examiner

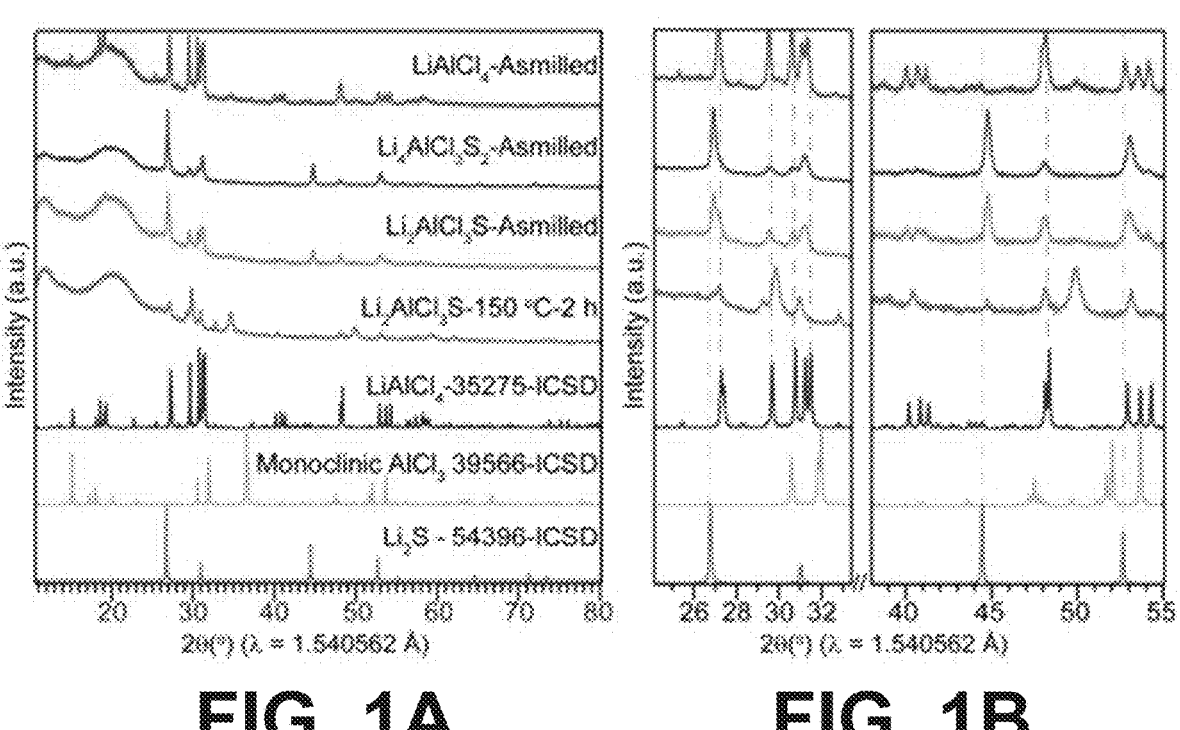
FIG. 1A          FIG. 1B
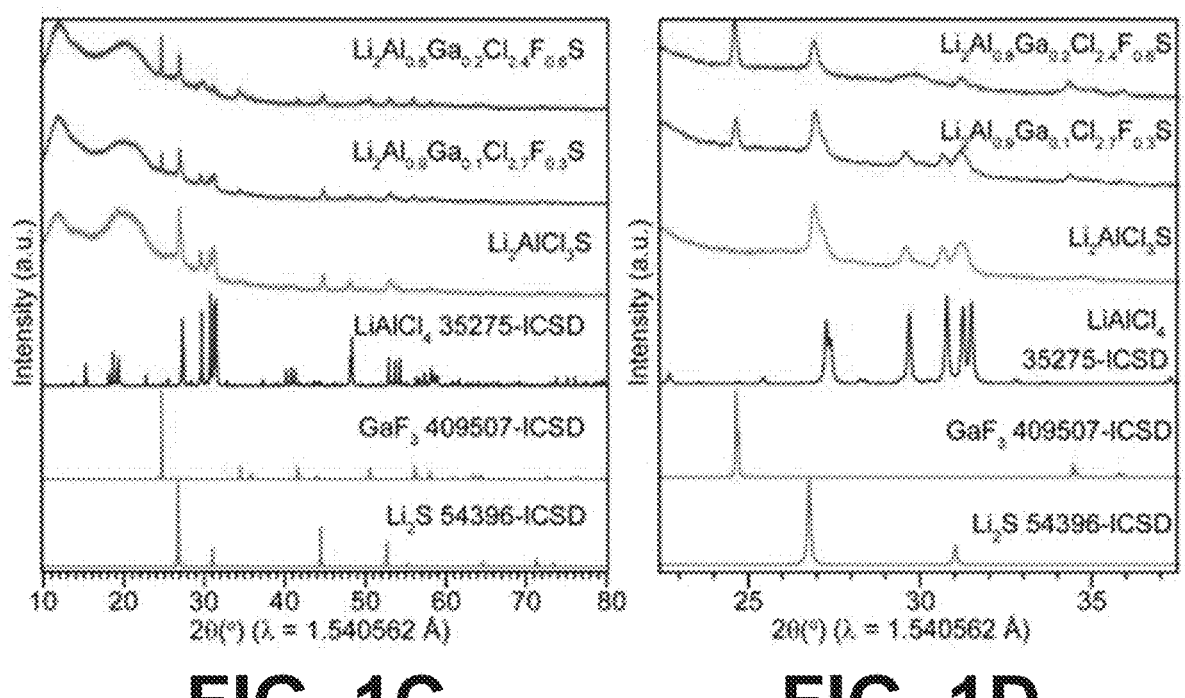
FIG. 1C          FIG. 1D

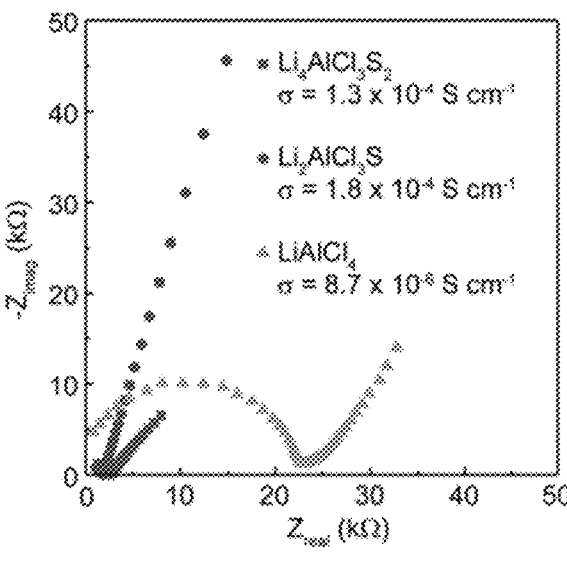
FIG. 7A
FIG. 7B
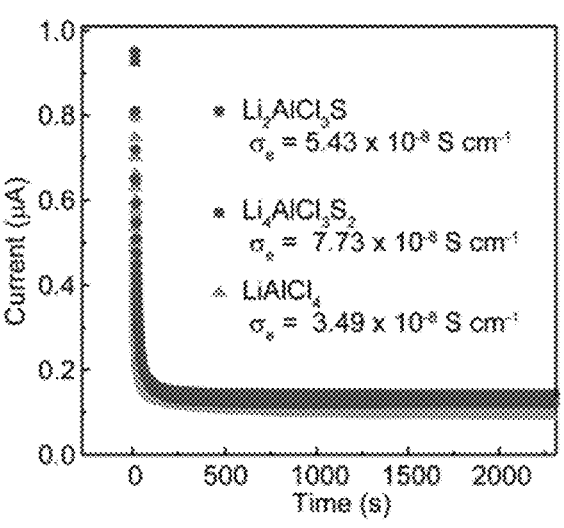
FIG. 7C
FIG. 7D

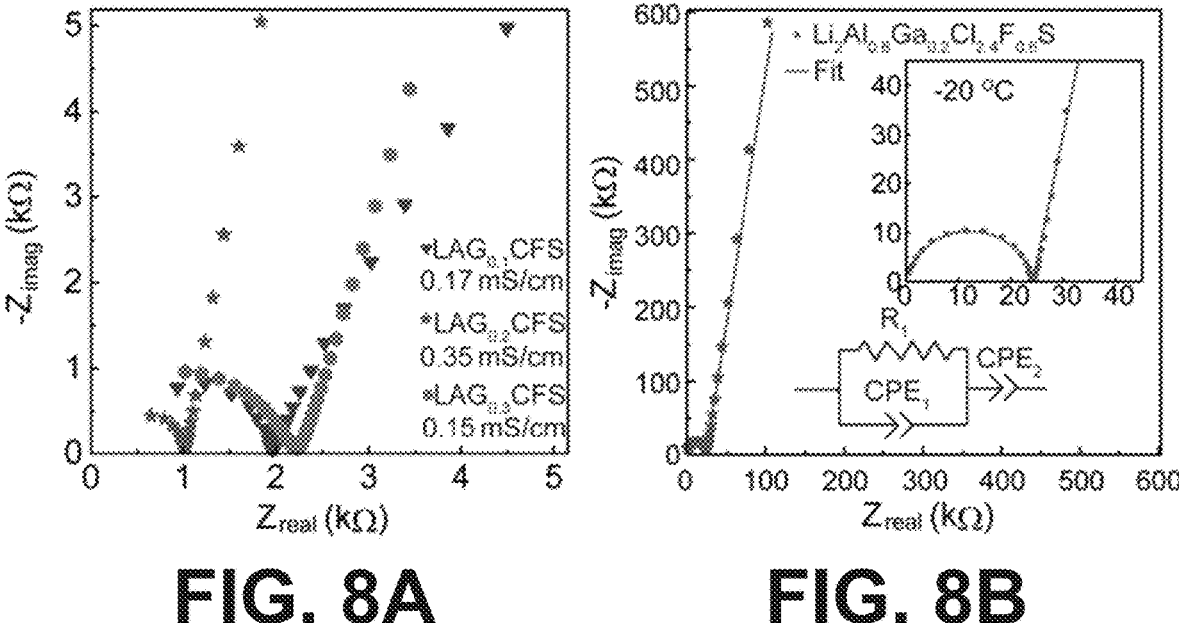
FIG. 8A           FIG. 8B
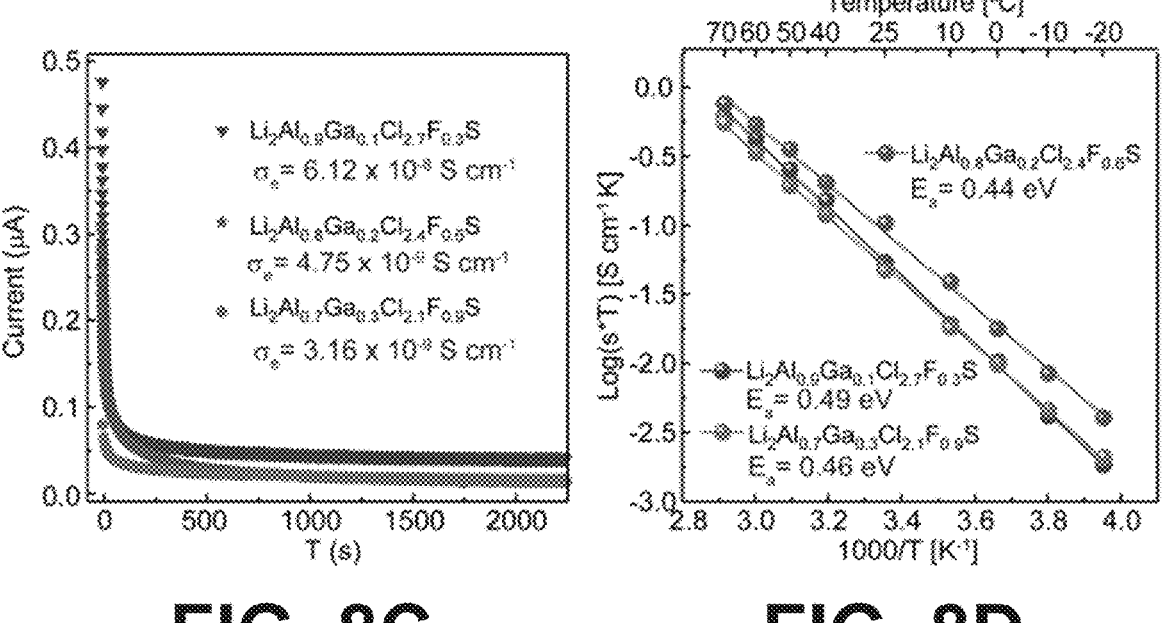
FIG. 8C           FIG. 8D

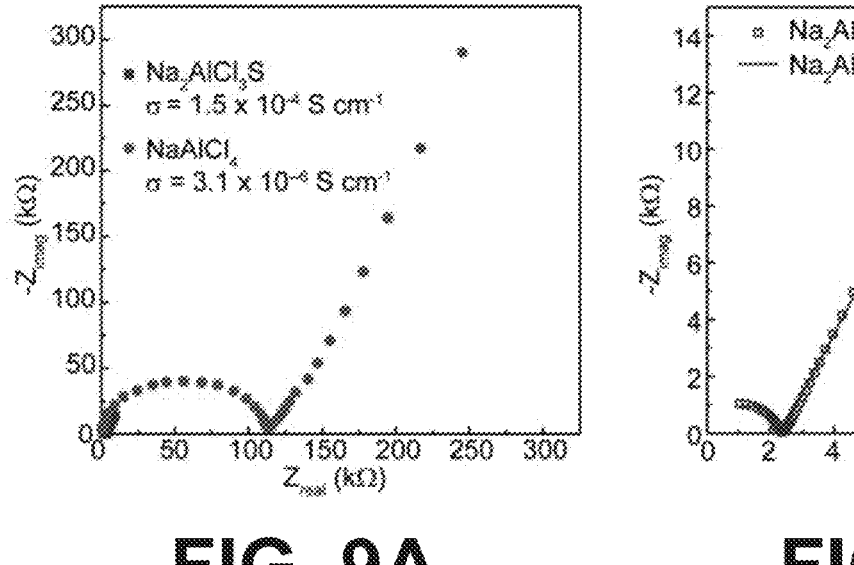
FIG. 9A
FIG. 9B
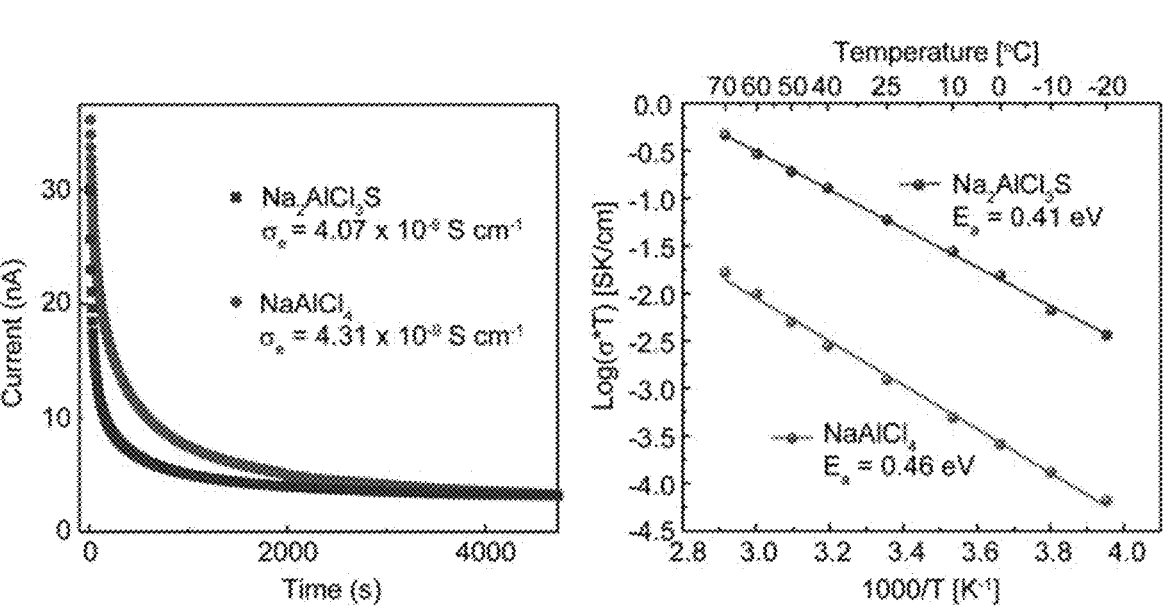
FIG. 9C
FIG. 9D

SOLID ELECTROLYTES AND METHODS FOR MAKING THE SAME

CROSS-REFERENCE TO RELATED APPLICATIONS

This application is a continuation application of U.S. Nonprovisional patent application Ser. No. 18/959,854, filed on Nov. 26, 2024, which claims the benefit of and priority to U.S. Provisional Patent Application No. 63/603,404, filed on Nov. 28, 2023, the contents of which are incorporated by reference herein in their entireties.

STATEMENT REGARDING FEDERALLY SPONSORED RESEARCH OR DEVELOPMENT

This invention was made with government support under DMR1847038, DMR1644779, and DMR2128556 awarded by the National Science Foundation. The government has certain rights in the invention.

BACKGROUND

As the demand for safe, affordable, sustainable, and renewable energy continues to rise, it has become more urgent to advance existing frontiers in the development of cost-effective energy storage. With the advent of superionic solid electrolytes (SEs), all-solid-state batteries (ASSBs) have emerged as next-generation high-performance secondary batteries. Both Li- and Na-superionic SEs can satisfy cost and performance metrics necessary for consumer electronics and large-scale energy storage. Over the past decades, ternary halides, e.g., $LiAlCl_4$ (LAC) and $NaAlCl_4$ (NAC), have gained popularity owing to their low cost and fast ion transport when in solution or as a melt. While this class of halide electrolytes demonstrates great potential in the liquid or molten state, there remains a need to overcome numerous safety issues associated with liquid electrolytes.

One consideration in the development of SEs for practical applications is the cost of materials. Aluminum is the third most abundant element in the earth's crust, which makes its compounds desirable in both lithium and sodium SEs for ASSBs. The stability, electrochemical performance, and structure of alkali tetrahaloaluminates $ZAlX_4$ (Z=Li, Na; X=Cl, Br, I) has been examined in previous studies. $LiAlCl_4$, for example, has a good electrochemical stability window of 1.7 V-4.5 V vs $Li/Li^+$. Computational predictions have suggested that doping $LiAlCl_4$ with Zn may lead to some improvements in its ionic conductivity. However, the synthesis of computationally predicted materials requires a careful synthesis route which is often unachievable due to thermodynamic considerations.

In the design of promising low melting point SEs, a one-step synthesis approach that uses mechanochemistry is beneficial as it can remove the extra heating step. Despite the efforts in the past years to provide structural insights to improve the $Li^+$ dynamics within this material class, the ionic conductivity of this class of SE is still significantly low, consequently limiting the practical applications of this material.

SUMMARY

In accordance with the purpose(s) of the present disclosure, as embodied and broadly described herein, the disclosure, in one aspect, relates to solid chalcohalide electrolytes and the efficient synthesis of solid chalcohalide electrolytes.

The electrolytes have the general formula $A_aM_bN_cX_dY_eS_f$ and have relatively high ionic conductivity. The electrolytes can be a component of different types of batteries. The process of synthesizing the electrolytes can be done with cost-effective materials, which is useful for scaling-up production of batteries such as all-solid-state batteries.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1D show powder X-ray diffraction (XRD) pattern of as-milled $LiAlCl_4$ (LAC), $Li_4AlCl_3S_2$(LACS2), $Li_2AlCl_3S$ (LACS), and $Li_2AlCl_3S$ (heat treated at 150° C. for 2 hours) with the comparison of the ICSD patterns of precursor and $LiAlCl_4$ monoclinic phase ($P2_1/C$ space group) (FIG. 1A) and as-milled $LiAlCl_4$, $Li_2Al_{0.9}Ga_{0.1}Cl_{2.7}F_{0.3}S$, and $Li_2Al_{0.9}Ga_{0.2}Cl_{2.4}F_{0.6}S$ with the comparison of the ICSD patterns of precursor and $LiAlCl_4$ monoclinic phase ($P2_1/C$ space group) (FIG. 1C). FIG. 1B and FIG. 1D are magnified view of selected positions of FIG. 1A and FIG. 1C, respectively.

FIG. 7A shows Nyquist plots of $LiAlCl_4$, $Li_2AlCl_3S$, and $Li_4AlCl_3S_2$.

FIG. 7B shows an exemplary equivalent circuit fitting of the Nyquist plot at 25° C. for LACS.

FIG. 7C shows DC polarization effects of $LiAlCl_4$, $Li_2AlCl_3S$, and $Li_4AlCl_3S_2$.

FIG. 7D shows an Arrhenius plot and activation energy of $LiAlCl_4$, $Li_2AlCl_3S$, and $Li_4AlCl_3S_2$.

FIG. 8A shows Nyquist plots of $Li_2Al_{0.9}Ga_{0.1}Cl_{2.7}F_{0.3}S$, $Li_2Al_{0.8}Ga_{0.2}Cl_{2.4}F_{0.6}S$, and $Li_2Al_{0.7}Ga_{0.3}Cl_{2.1}F_{0.9}S$.

FIG. 8B shows an equivalent circuit fitting of the Nyquist plot at 25° C. for $Li_2Al_{0.8}Ga_{0.2}Cl_{2.4}F_{0.6}S$.

FIG. 8C shows DC polarization effects of $Li_2Al_{0.9}Ga_{0.1}Cl_{2.7}F_{0.3}S$, $Li_2Al_{0.8}Ga_{0.2}Cl_{2.4}F_{0.6}S$, and $Li_2Al_{0.7}Ga_{0.3}Cl_{2.1}F_{0.9}S$.

FIG. 8D shows an Arrhenius plot and activation energy of $Li_2Al_{0.9}Ga_{0.1}Cl_{2.7}F_{0.3}S$, $Li_2Al_{0.8}Ga_{0.2}Cl_{2.4}F_{0.6}S$, and $Li_2Al_{0.7}Ga_{0.3}Cl_{2.1}F_{0.9}S$.

FIG. 9A shows Nyquist plots of $NaAlCl_4$ and $Na_2AlCl_3S$.

FIG. 9B shows an exemplary equivalent circuit fitting of the Nyquist plot at 25° C. for NACS.

FIG. 9C shows DC polarization effects of $NaAlCl_4$ and $Na_2AlCl_3S$.

FIG. 9D shows an Arrhenius plot and activation energy of $NaAlCl_4$ and $Na_2AlCl_3S$.

Figures 2A, 2B:
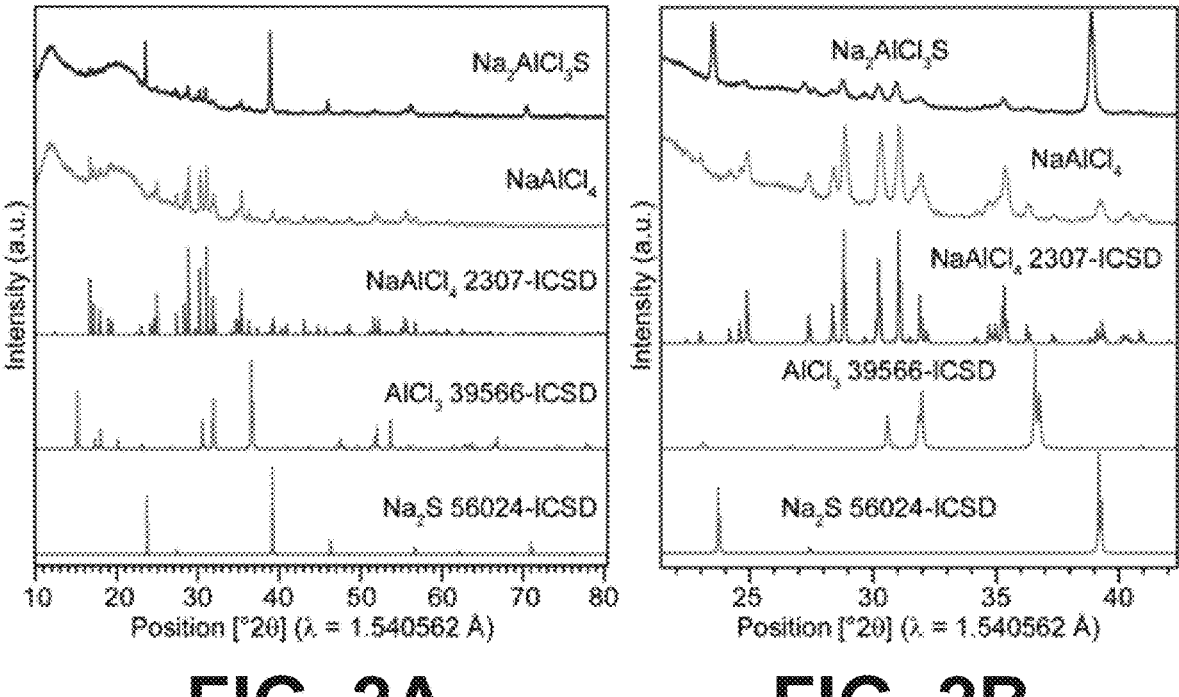
FIGS. 2A-2B show powder X-ray diffraction pattern of as-milled $NaAlCl_4$ (NAC) and $Na_2AlCl_3S$ (NACS), with the comparison of the ICSD patterns of precursor and $NaAlCl_4$ orthorhombic phase ($P2_12_12_1$ space group) (FIG. 2A) and the magnified view of the selected position of FIG. 2A (FIG. 2B).

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "an excipient" include, but are not limited to, mixtures or combinations of two or more such excipients, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range. Thus, for example, if a component is in an amount of about 1%, 2%, 3%, 4%, or 5%, where any value can be a lower and upper endpoint of a range, then any range is contemplated between 1% and 5% (e.g., 1% to 3%, 2% to 4%, etc.).

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Solid Electrolytes and Methods of Making and Using the Same

The present disclosure provides for chalcohalide solid electrolytes and the method of making and using chalcohalide solid electrolytes. The method of making can include using cost-effective precursors in the synthesis of chalcohalide solid electrolytes. The electrolytes have the general formula $A_a M_b N_c X_d Y_e S_f$ and can have relatively high ionic conductivity. Additionally, the synthesis of these electrolytes with high ionic conductivity can be achieved via a one-step mechanochemical approach. The electrolytes can be included as a component of different types of batteries, such as solid-state batteries. In a particular aspect, Li- and Na-superionic solid electrolytes made with low-cost precursors work well for producing energy storage devices, such as batteries (e.g., solid-state batteries), on a large scale.

In one aspect, the electrolytes have the formula $A_a M_b N_c X_d Y_e Sr$, where A can be one of Li, Na, K, or any combination thereof; M can be Al, Ga, In, or any combination thereof; N can be Mg, Ca, Zn, or any combination thereof; X and Y can be, independently, F, Cl, Br, or I; and S is sulfur. Furthermore, a can be about 1 to about 4 or about 1.0, 2.0, 3.0, or 4.0, where any value can be a lower and upper endpoint of a range (e.g., 3.0 to 4.0); b can be about 0.5 to about 5.0 or about 0.5, 1.0, 2.0, 3.0, 4.0, or 5.0, where any value can be a lower and upper endpoint of a range (e.g., 0.5 to 3.0); c can be greater than or equal to 0 to about 1.5 or equal to 0.0, about 0.5, about 1.0, or about 1.5, where any value can be a lower and upper endpoint of a range (e.g., 0.5 to 1.0); d can be about 1 to about 5 or about 1.0, 2.0, 3.0, 4.0, or 5.0, where any value can be a lower and upper endpoint of a range (e.g., 4.0 to 5.0); e can be greater than or equal to 0 to about 3 or equal to 0.0, about 1.0, about 2.0, or about 3.0, where any value can be a lower and upper endpoint of a range (e.g., 2.0 to 3.0); and f can be greater than 0 to about 3 or about 0.1, 0.5, 1.0, 1.5, 2.0, 2.5, or 3.0, where any value can be a lower and upper endpoint of a range (e.g., 1.5 to 2.5). Furthermore, a, b, c, d, e, and f can be assigned values such that (a+3b+2c) is equal to (d+e+2f). In some aspects, A is Li or Na, M is Al, and X is Cl. In other aspects, A is Li, M is Al and Ga, X is Cl, and Y is F.

In other aspects, a can be about 1 to about 2 or about 1.0, 1.5, or 2.0, where any value can be a lower and upper endpoint of a range (e.g., 1.5 to 2.0). In other aspects, b can be about 0.5 to about 1.0 or about 0.50, 0.75, or 1.00, where any value can be a lower and upper endpoint of a range (e.g., 0.50 to 1.00). In other aspects, c can be about 0.1 to about 1.0 or about 0.1, 0.3, 0.7, or 1.0, where any value can be a lower and upper endpoint of a range (e.g., 0.3 to 1.0). In other aspects, d can be about 2 to about 4 or about 2.0, 2.5, 3.0, 3.5, or 4.0, where any value can be a lower and upper endpoint of a range (e.g., 2.5 to 3.0). In other aspects, e can be greater than 0 to about 1 or about 0.1, 0.3, 0.7, or 1.0, where any value can be a lower and upper endpoint of a range (e.g., 0.7 to 1.0).

In other aspects, the electrolytes can have the formula $A_a Al_b Cl_d S_f d$, where A can be Li or Na. In some aspects, a can be about 2 to about 4 or about 2.0, 2.5, 3.0, 3.5, or 4.0, where any value can be a lower and upper endpoint of a range (e.g., 2.5 to 3.0); b can be about 0.5 to about 1.0 or about 0.50, 0.75, or 1.00, where any value can be a lower and upper endpoint of a range (e.g., 0.5 to 1.0); d can be about 2 to about 4 or about 2.0, 2.5, 3.0, 3.5, or 4.0, where any value can be a lower and upper endpoint of a range (e.g., 2.5 to 3.0); and f can be about 1 to about 3 or about 1.0, 1.5, 2.0, 2.5, or 3.0, where any value can be a lower and upper endpoint of a range (e.g., 1.5 to 2.0).

In other aspects, the electrolytes can have the formula $Li_aAl_bN_cCl_dS_f$, where N is Ca or Zn. In some aspects, a can be about 1 to about 2 or about 1.0, 1.5, or 2.0, where any value can be a lower and upper endpoint of a range (e.g., 1.5 to 2.0); b can be about 0.5 to about 1.0 or about 0.50, 0.75, or 1.00, where any value can be a lower and upper endpoint of a range (e.g., 0.50 to 1.00); c can be about 0.1 to about 1.0 or about 0.1, 0.3, 0.7, or 1.0, where any value can be a lower and upper endpoint of a range (e.g., 0.3 to 1.0); d can be about 2 to about 4 or about 2.0, 2.5, 3.0, 3.5, or 4.0, where any value can be a lower and upper endpoint of a range (e.g., 2.5 to 3.0); and f can be about 1 to about 3 or about 1.0, 1.5, 2.0, 2.5, or 3.0, where any value can be a lower and upper endpoint of a range (e.g., 1.5 to 2.0).

In other aspects, the electrolytes can have the formula $Li_aAl_bCl_dBr_eS_f$. In some aspects, a can be about 1 to about 2 or about 1.0, 1.5, or 2.0, where any value can be a lower and upper endpoint of a range (e.g., 1.5 to 2.0); b can be about 0.5 to about 1.0 or about 0.50, 0.75, or 1.00, where any value can be a lower and upper endpoint of a range (e.g., 0.50 to 1.00); d can be about 2 to about 4 or about 2.0, 2.5, 3.0, 3.5, or 4.0, where any value can be a lower and upper endpoint of a range (e.g., 2.5 to 3.0); e can be greater than 0 to about 1 or about 0.1, 0.3, 0.7, or 1.0, where any value can be a lower and upper endpoint of a range (e.g., 0.7 to 1.0); and f can be about 1 to about 3 or about 1.0, 1.5, 2.0, 2.5, or 3.0, where any value can be a lower and upper endpoint of a range (e.g., 1.5 to 2.0).

In another aspect, the electrolytes can have the formula $Li_2Al_{b1}Ga_{b2}Cl_dF_eS$. In some aspects, b1 can be about 0.5 to about 1.0 or about 0.50, 0.75, or 1.00, where any value can be a lower and upper endpoint of a range (e.g., 0.50 to 0.75); b2 can be about 0.1 to about 0.5 or about 0.1, 0.3, or 0.5, where any value can be a lower and upper endpoint of a range (e.g., 0.3 to 0.5); d can be from about 2.1 to about 2.9 or about 2.1, 2.3, 2.6, or 2.9, where any value can be a lower and upper endpoint of a range (e.g., 2.3 to 2.6); and e can be from about 0.1 to 0.9 or about 0.1, 0.3, 0.6, or 0.9, where any value can be a lower and upper endpoint of a range (e.g., 0.3 to 0.6). In further aspects, b1 and b2 can have values such that (b1+b2)=b.

In another aspect, the electrolytes can have the formula $Li_aAlCl_dS_f$. In some aspects, a can be about 1.0 to about 2.0 or about 1.0, 1.1, 1.2, 1.3, 1.4, 1.5, 1.6, 1.7, 1.8, 1.9, or 2.0, where any value can be a lower and upper endpoint of a range (e.g., 1.5 to 1.7); d is from about 3.0 to about 4.0 or about 3.1, 3.2, 3.3, 3.4, 3.5, 3.6, 3.7, 3.8, 3.9, or 4.0, where any value can be a lower and upper endpoint of a range (e.g., 3.3 to 5.5); and f can be from about 0.1 to about 1.0 or about 0.1, 0.2, 0.3, 0.4, 0.5, 0.6, 0.7, 0.8, 0.9, or 1.0, where any value can be a lower and upper endpoint of a range (e.g., 0.5 to 0.7).

In some aspects, the electrolytes can have the formula $Li_2AlCl_3S$, $Li_4AlCl_3S_2$, $Na_2AlCl_3S$, or $K_2AlCl_3S$. In other aspects, the electrolytes can have the formula $Li_2AlCl_3S$, $Li_4AlCl_3S_2$, or $Na_2AlCl_3S$. In other aspects, the electrolytes can have the formula $Li_2Al_{0.9}Ga_{0.1}Cl_{2.7}F_{0.3}S$, $Li_2Al_{0.8}Ga_{0.2}Cl_{2.4}F_{0.6}S$, $Li_2Al_{0.7}Ga_{0.3}Cl_{2.1}F_{0.9}S$, or $Li_{1.6}AlCl_{3.4}S_{0.6}$.

The electrolytes disclosed herein can be characterized by various properties. In one aspect, the electrolytes disclosed herein can have relatively high ionic conductivity. The electrolytes can have an ionic conductivity of at least about 0.10 mS/cm, 0.30 mS/cm, 0.50 mS/cm, 0.70 mS/cm, or 1.00 mS/cm. In other aspects, the electrolytes can have an ionic conductivity of about 0.10 mS/cm to about 1.00 mS/cm or about 0.10 mS/cm, 0.30 mS/cm, 0.50 mS/cm, 0.70 mS/cm, or 1.00 mS/cm, where any value can be a lower and upper endpoint of a range (e.g., 0.50 mS/cm to 0.70 mS/cm). In another aspect, the electrolytes can be conductive over a temperature range of about –20° C. to about 100° C. or about –20° C., 0° C., 20° C., 40° C., 60° C., 80° C., or 100° C., where any value can be a lower and upper endpoint of a range (e.g., 0° C. to 40° C.). In further aspects, the electrolytes can have an electronic conductivity of about $1.00 \times 10^{-7}$ S/cm to about $1.00 \times 10^{-10}$ S/cm or about $1.00 \times 10^{-7}$ S/cm, $1.00 \times 10^{-8}$ S/cm, $1.00 \times 10^{-9}$ S/cm, or $1.00 \times 10^{-10}$ S/cm, where any value can be a lower and upper endpoint of a range (e.g., $1.00 \times 10^{-7}$ S/cm to $1.00 \times 10^{-8}$ S/cm). Exemplary methods for determining ionic conductivity and electronic conductivity are provided in the Examples.

In some aspects, the electrolytes have a monoclinic structure type in the $P2_1/c$ space group. In other aspects, the electrolytes have an orthorhombic structure type in the $P2_12_12_1$ space group. In other aspects, the electrolytes have a cubic structure type belonging to the Fm-3m space group.

The electrolytes described herein have unique X-ray diffraction (XRD) patterns. In some aspects, the X-ray powder diffractions can be performed using an X-ray wavelength of 1.5406 Å. In some aspects, the electrolytes can have an X-ray powder diffraction pattern including peaks at 26.9, 31.2, and $44.8 \pm 0.2°$ $2\theta$ as measured by X-ray powder diffraction using an X-ray wavelength of 1.5406 Å. In further aspects, the electrolytes with this XRD pattern can include $Li_2AlCl_3S$ and/or $Li_4AlCl_3S_2$. In other aspects, the electrolytes can have an X-ray powder diffraction pattern including peaks at 24.6 and $26.9 \pm 0.2°$ $2\theta$ as measured by X-ray powder diffraction using an X-ray wavelength of 1.5406 Å. In further aspects, the electrolytes with this XRD pattern can include $Li_2Al_{0.9}Ga_{0.1}Cl_{2.7}F_{0.3}S$, $Li_2Al_{0.8}Ga_{0.2}Cl_{2.4}F_{0.6}S$, and/or $Li_2Al_{0.7}Ga_{0.3}Cl_{2.1}F_{0.9}S$. In other aspects, the electrolytes can have an X-ray powder diffraction pattern including peaks at 23.5 and $38.9 \pm 0.2°$ $2\theta$ as measured by X-ray powder diffraction using an X-ray wavelength of 1.5406 Å. In further aspects, the electrolytes with this XRD pattern can include $Na_2AlCl_3S$. In still other aspects, the electrolytes can have an X-ray powder diffraction pattern including peaks at 28.4 and $40.6 \pm 0.2°$ $2\theta$ as measured by X-ray powder diffraction using an X-ray wavelength of 1.5406 Å. In further aspects, the electrolytes with this XRD pattern can include $K_2AlCl_3S$.

The electrolytes described herein possess unique solid-state NMR spectra. The Li-containing electrolytes can have peaks at about –0.98 ppm, 0.15 ppm, 1.60 ppm and 2.43 ppm as determined by $^6Li$ solid-state NMR spectroscopy. In further aspects, the Li-containing electrolytes can have peaks at about –0.98 ppm, 0.15 ppm, and 1.60 ppm as determined by $^6Li$ solid-state NMR spectroscopy. The Na-containing electrolytes can have peaks at about 42.66 ppm as determined by $^{23}Na$ solid-state NMR spectroscopy. In other aspects, the Na-containing electrolytes can have peaks at about –15.04 ppm, –16.63 ppm, –19.17 ppm, –21.75 ppm, –23.21 ppm, –24.83 ppm, and 42.66 ppm as determined by $^{23}Na$ solid-state NMR spectroscopy. In other aspects, the Na-containing electrolytes can have peaks at about –15.04 ppm, –16.63 ppm, –21.75 ppm, and 42.66 ppm as determined by $^{23}$Na solid-state NMR spectroscopy. Exemplary methods for performing XRD and NMR measurements are provided in the Examples.

The electrolytes described herein possess good long-term cycling stability and rate performance, which makes the electrolytes described herein excellent candidates as electrolytes for all solid-state batteries (ASSBs). In one aspect, electrolytes described herein have a specific capacity of about 150 mAh/g to about 200 mAh/g at a discharge rate of 2 coulombs (C) in a battery cell. Exemplary methods for determining the capacity of the electrolytes described herein are provided in the Examples.

Also disclosed is a method for making chalcohalide solid electrolytes having the formula $A_aM_bN_cX_dY_eS_f$, where A can be one of Li, Na, K, or any combination thereof; M can be Al, Ga, In, or any combination thereof; N can be Mg, Ca, Zn, or any combination thereof; and X and Y can be, independently, F, Cl, Br, or I; and S is sulfur. a can be about 1 to about 4 or about 1.0, 2.0, 3.0, or 4.0, where any value can be a lower and upper endpoint of a range (e.g., 3.0 to 4.0); b can be about 0.5 to about 5.0 or about 0.5, 1.0, 2.0, 3.0, 4.0, or 5.0, where any value can be a lower and upper endpoint of a range (e.g., 0.5 to 3.0); c can be greater than or equal to 0 to about 1.5 or equal to 0.0, about 0.5, about 1.0, or about 1.5, where any value can be a lower and upper endpoint of a range (e.g., 0.5 to 1.0); d can be about 1 to about 5 or about 1.0, 2.0, 3.0, 4.0, or 5.0, where any value can be a lower and upper endpoint of a range (e.g., 4.0 to 5.0); e can be greater than or equal to 0 to about 3 or equal to 0.0, about 1.0, about 2.0, or about 3.0, where any value can be a lower and upper endpoint of a range (e.g., 2.0 to 3.0); and f can be greater than 0 to about 3 or about 0.1, 0.5, 1.0, 1.5, 2.0, 2.5, or 3.0, where any value can be a lower and upper endpoint of a range (e.g., 1.5 to 2.5). Furthermore, a, b, c, d, e, and f can be assigned values such that (a+3b+2c) is equal to (d+e+2f). The method includes mixing a plurality of precursor compounds, such as salts, in various amounts in the solid state. In one aspect, the compounds are mixed together in stoichiometric amounts. In further aspects, the mixing can include grinding stoichiometric amounts of the compounds in different molar ratios. The compounds mixed together can include $A_2S$; AX, AY, or a combination thereof; $MX_3$, $MY_3$, or a combination thereof; and $NX_2$, $NY_2$, or a combination thereof. A, X, Y, M, and N are as defined previously.

The compounds used to produce the electrolytes described herein are generally highly pure materials. In one aspect, each of the compounds has a purity of greater than 99%, greater than 99.5%, or greater than 99.9%. In one aspect, each compound used to produce the electrolytes is substantially anhydrous, where each compound is at least 95% moisture free, at least 98% moisture free, at least 99% moisture free, at least 99.9% moisture free, or 100% moisture free. In another aspect, each compound has less than 0.5 ppm water, less than 0.25 ppm water, or less than 0.1 ppm water.

In another aspect, the compounds can be mixed by mechanochemical milling. Mixing of the compounds can occur in a mixing jar or container using one or more balls to produce a complex motion that combines back-and-forth swings with short lateral movements. In one aspect, the compounds are mixed with one another for at least three hours, at least two hours, less than two hours, or less than one hour. In another aspect, the compounds are mixed from about 45 minutes to about 135 minutes or about 45 minutes, 60 minutes, 75 minutes, 90 minutes, 105 minutes, 120 minutes, or 135 minutes, where any value can be a lower and upper endpoint of a range (e.g., 60 minutes to 105 minutes). In one aspect, the compounds are mixed in an inert atmosphere such as, for example, nitrogen or argon. In one aspect, the inert atmosphere has less than 0.5 ppm oxygen, less than 0.25 ppm oxygen, or less than 0.1 ppm oxygen. After mixing, the mixture can be pelletized.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Aspects

Aspect 1. A compound having the formula $A_aM_bN_cX_dY_eS_f$, wherein
 A is Li, Na, K, or any combination thereof;
 M is Al, Ga, In, or any combination thereof;
 N is Mg, Ca, Zn, or any combination thereof;
 X and Y are, independently, F, Cl, Br, or I;
 S is sulfur;
 a is from about 1 to about 4;
 b is from about 0.5 to about 5.0;
 c is greater than or equal to 0 to about 1.5;
 d is from about 1 to about 5;
 e is greater than or equal to 0 to about 3;
 f is greater than 0 to about 3; and
 the sum (a+3b+2c) is equal to the sum (d+e+2f).

Aspect 2. The compound of Aspect 1, wherein A is Li.

Aspect 3. The compound of Aspect 1, wherein A is Na.

Aspect 4. The compound of any one of Aspects 1-3, wherein a is from about 1 to about 2.

Aspect 5. The compound of any one of Aspects 1-4, wherein M is Al.

Aspect 6. The compound of any one of Aspects 1-4, wherein M is Ga.

Aspect 7. The compound of any one of Aspects 1-4, wherein M is In.

Aspect 8. The compound of any one of Aspects 1-7, wherein b is from about 0.5 to about 1.0.

Aspect 9. The compound of any one of Aspects 1-8, wherein N is Ca.

Aspect 10. The compound of any one of Aspects 1-8, wherein N is Zn.

Aspect 11. The compound of any one of Aspects 1-10, wherein c is zero.

Aspect 12. The compound of any one of Aspects 1-10, wherein c is from about 0.1 to about 1.0.

Aspect 13. The compound of any one of Aspects 1-12, wherein X is Cl

Aspect 14. The compound of Aspect 13, wherein d is from about 2 to about 4.

Aspect 15. The compound of any one of Aspects 1-14, wherein when e is greater than zero, Y is Br.

Aspect 16. The compound of Aspect 15, wherein e is greater than zero to about 1.

Aspect 17. The compound of Aspect 1, wherein A is Li or Na, M is Al, and X is Cl.

Aspect 18. The compound of Aspect 1, wherein A is Li, M is Al and Ga, X is Cl, and Y is F.

Aspect 19. The compound of Aspect 1, where the compound has the formula $A_aAl_bCl_dS_f$, wherein A is Li or Na.

Aspect 20. The compound of Aspect 19, wherein a is from about 2 to about 4, b is from about 0.5 to about 1.0, d is from about 2 to about 4, and f is from about 1 to about 3.

Aspect 21. The compound of Aspect 1, wherein the compound has the formula $Li_aAl_bN_cCl_dS_f$, wherein N is Ca or Zn.

Aspect 22. The compound of Aspect 21, wherein a is from about 1 or to about 2, b is from about 0.5 to about 1.0, c is from about 0.1 to about 1.0, d is from about 2 to about 4, and f is from about 1 to about 3.

Aspect 23. The compound of Aspect 1, where the compound has the formula $Li_aAl_bCl_dBr_eSr$.

Aspect 24. The compound of Aspect 23, wherein a is from about 1 or to about 2, b is from about 0.5 to about 1, d is from about 2 to about 4, e is greater than zero to about 1, and f is from about 1 to about 3.

Aspect 25. The compound of Aspect 1, wherein the compound has the formula $Li_2AlCl_3S$, $Li_4AlCl_3S_2$, $Na_2AlCl_3S$, or $K_2AlCl_3S$.

Aspect 26. The compound of Aspect 1, wherein the compound has the formula $Li_2Al_{b1}Ga_{b2}Cl_dF_eS$, wherein (b1+b2)=b.

Aspect 27. The compound of Aspect 26, wherein b1 is from about 0.5 to about 0.9, b2 is from about 0.1 to about 0.5, d is from about 2.1 to about 2.9, and e is from about 0.1 to about 0.9.

Aspect 28. The compound of Aspect 1, wherein the compound has the formula $Li_aAlCl_dSr$, wherein a is from about 1.0 to about 2.0, d is from about 3.0 to about 4.0, and f is from about 0.1 to about 1.0.

Aspect 29. The compound of Aspect 1, wherein the compound has the formula $Li_2Al_{0.9}Ga_{0.1}Cl_{2.7}F_{0.3}S$, $Li_2Al_{0.8}Ga_{0.2}Cl_{2.4}F^{0.6}S$, $Li_2Al_{0.7}Ga_{0.3}Cl_{2.1}F_{0.9}S$, or $Li_{1.6}AlCl_{3.4}S_{0.6}$.

Aspect 30. The compound of any one of Aspects 1-29, wherein the compound has an ionic conductivity of at least 0.10 mS/cm.

Aspect 31. The compound of any one of Aspects 1-29, wherein the compound has an ionic conductivity of at least 0.10 mS/cm to about 1.00 mS/cm.

Aspect 32. The compound of any one of Aspects 1-31, wherein the compound has an electronic conductivity less than $1.00 \times 10^{-7}$ S/cm.

Aspect 33. The compound of any one of Aspects 1-31, wherein the compound has an electronic conductivity of about $1.00 \times 10^{-7}$ S/cm to about $1.00 \times 10^{10}$ S/cm.

Aspect 34. The compound of any one of Aspects 1-33, wherein the compound is conductive over a temperature range of about $-20°$ C. to about $100°$ C.

Aspect 35. The compound of any one of Aspects 1-34, wherein the compound has a monoclinic structure type with the space group $P2_1/c$.

Aspect 36. The compound of any one of Aspects 1-35, wherein the compound has an X-ray powder diffraction pattern comprising peaks at $26.9°$, $31.2°$, and $44.8°\pm0.2°$ $2\theta$ as measured by X-ray powder diffraction using an X-ray wavelength of 1.5406 Å.

Aspect 37. The compound of any one of Aspects 1-35, wherein the compound has an X-ray powder diffraction pattern comprising peaks at $24.6°$ and $26.9°\pm0.2°$ $2\theta$ as measured by X-ray powder diffraction using an X-ray wavelength of 1.5406 Å.

Aspect 38. The compound of any one of Aspects 1-37, wherein the compound has peaks at about $-0.98$ ppm, 0.15 ppm, and 1.60 ppm, as determined by [6]Li solid-state NMR spectroscopy.

Aspect 39. The compound of any one of Aspects 1-34, wherein the compound has an orthorhombic structure type with the space group $P2_12_12_1$.

Aspect 40. The compound of any one of Aspects 1-34 or 39, wherein the compound has an X-ray powder diffraction pattern comprising peaks at $23.5°$ and $38.9°\pm0.2°$ $2\theta$ as measured by X-ray powder diffraction using an X-ray wavelength of 0.24 Å.

Aspect 41. The compound of any one of Aspects 1-34, 39, or 40, wherein the compound has a peak at about 42.66 ppm, as determined by $^{23}$Na solid-state NMR spectroscopy.

Aspect 42. The compound of any one of Aspects 1-34, wherein the compound has a cubic structure type with the space group Fm-3m.

Aspect 43. The compound of any one of Aspects 1-34 or 42, wherein the compound has an X-ray powder diffraction pattern comprising peaks at $28.4°$ and $40.6°\pm0.2°$ $2\theta$ as measured by X-ray powder diffraction using an X-ray wavelength of 0.24 Å.

Aspect 44. The compound of any one of Aspects 1-34 or 39, wherein the compound has a capacity of about 150 mAh/g to about 200 mAh/g at a discharge rate of 2 coulombs (C).

Aspect 45. A method for making a compound having the formula $A_aM_bN_cX_dY_eS_f$, wherein A is Li, Na, K, or any combination thereof;

M is Al, Ga, In, or any combination thereof;

N is Mg, Ca, Zn, or any combination thereof;

X and Y are, independently, F, Cl, Br, or I;

S is sulfur;

a is from about 1 to about 4;

b is from about 0.5 to about 5.0;

c is greater than or equal to 0 to about 1.5;

d is from about 1 to about 5;

e is greater than or equal to 0 to about 3;

f is greater than 0 to about 3; and the sum (a+3b+2c) is equal to the sum (d+e+2f), the method comprising:

mixing in the solid state the following components: (i) $A_2S$; (ii) AX, AY, or a combination thereof; (iii) $MX_3$, $MY_3$, or a combination thereof; and (iv) $NX_2$, $NY_2$, or a combination thereof to produce a first mixture.

Aspect 46. The method of Aspect 45, wherein the components are substantially anhydrous.

Aspect 47. The method of Aspect 45 or 46, wherein the components are mixed by mechanochemical milling.

Aspect 48. The method of any one of Aspects 45-47, wherein the components are mixed in an inert atmosphere.

Aspect 49. A compound produced by the method of any one of Aspects 45-48.

Aspect 50. A battery comprising the compound in any one of Aspects 1-44 or 49.

Aspect 51. The battery of Aspect 50, wherein the battery is a solid-state battery.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure.

Example 1

Materials and Methods

LiCl (Sigma Aldrich), LiBr (Sigma Aldrich), and NaCl (Sigma Aldrich) were dried at 200° C. for 12 hours under a dynamic vacuum before being stored in an argon-filled glovebox. Anhydrous $Li_2S$ (Alfa Aesar), anhydrous $Na_2S$ (Alfa Aesar), anhydrous $AlCl_3$ (Alfa Aesar), $ZnCl_2$ (Thermo Scientific), $CaCl_2$ (Thermo Scientific), and $GaF_3$ (Alfa Aesar) were received (packed under argon) and used without further purification. Stoichiometric amounts of precursors were ground using a mortar/pestle in different molar ratios for 5 minutes inside an argon-filled glovebox. After grinding, the hand-milled powder was transferred into a $ZrO_2$ jar containing two 10-mm balls as a grinding aid followed by evacuation to ensure the vacuum sealing of the jar to protect it from any external reaction. Mechanochemical mixing of the hand-milled powder in a $ZrO_2$ jar sealed under a vacuum was performed using a SPEX® 8000M MIXER/MILL® high energy ball mill (SPEX® SamplePrep, USA) for 10 hours. Afterward, the ball-milled powder, typically 130 mg, was pressed into an 8-mm pellet under pressure of ~400 MPa inside an Argon-filled MBROUN glovebox. The resulting pellet after pressing had a thickness of ~1 mm and the pellet appeared shiny white.

Powder X-ray Diffraction—The as-milled samples were packed in a zero-background sample holder. KAPTON® film (DUPONT™, USA) was used to seal the samples to prevent exposure to humid air. XRD was performed using a RIGAKU® Smartlab powder diffractometer with Bragg-Brentano geometry at a voltage of 45 kV and current of 40 mA with Cu-Ka radiation (a=1.5406 Å). The data was collected from 10-80 2θ at a step size of 0.03 for 30 minutes.

Synchrotron X-ray Diffraction—Synchrotron X-ray diffraction (SXRD) measurement was carried out in capillary transmission mode at beamline APS® ANL, 17-BM-B at the Argonne National Lab, Illinois (ANL). The exact X-ray wavelength was refined to 0.24117 Å. The sample was loaded inside a special glass capillary and the holder moved up and down during tests to ensure uniformity of measured results.

Rietveld Refinement—Rietveld refinement was carried out on powder lab XRD and synchrotron XRD data with the aid of GSAS-II software. Structural analysis from synchrotron PXRD of Li-ion conductor reveals a monoclinic phase belonging to the $P2_1/c$ space group of $LiAlCl_4$ (ICSD-35275). The LiCl and $LiAlCl_4$ phases were used to refine the structure of $LiAlCl_4$, while $Li_2S$, LiCl, and $LiAlCl_4$ were used for structural refinement of the $Li_2AlCl_3S$ electrolyte. Sulfur occupancy was tested on all the chlorine sites and the result is only considered accurate when its occupancy is greater than 1% on the tested site. Lithium and aluminum occupancy were tested for the counter-cation sites of each other to find the most probable structure for the sulfur-doped electrolytes. Lab PXRD was used to refine the Li-ion conductor with the $GaF_3$ substitution. The possible anion cation combination occupancy on the doping strategy was tested. Structural analysis from lab PXRD of Na-ion conductor reveals an orthorhombic phase belonging to the $P2_12_12_1$ space group of $NaAlCl_4$ (ICSD-2307). The NaCl and $NaAlCl_4$ phases were used to refine the structure of $NaAlCl_4$, while $Na_2S$, NaCl, and $NaAlCl_4$ were used for structural refinement of the $Na_2AlCl_3S$ electrolyte. Sulfur occupancy was tested on all the chlorine sites and the result is only considered accurate when its occupancy is greater than 1% on the tested site. Sodium and aluminum occupancy were tested for the counter-cation sites of each other to find the most probable structure for the sulfur-doped electrolytes. Site occupancies for the same site were constrained to 1 except for $Na_{2-x}S_{1-x}Cl_x$. Atomic parameters for the same site were fixed for the substituents (Na, Ga, S, Cl, F, etc.).

Solid-state NMR—$^6Li$, $^7Li$, and $^{23}Na$ NMR experiments were performed using a Bruker Advance-III 500 spectrometer at Larmor frequencies of 73.6 MHz, 194.4 MHz, and 132.31 MHz, respectively. The MAS rate was 24 kHz. For $^6Li$, $^7Li$, and $^{23}Na$, single-pulse NMR experiments were performed using π/2 pulse lengths of 3.30 μs, 2.90 μs and 3.7 μs, respectively. The recycle delays were 500 s s for $^6Li$, 80 s for $^7Li$, and 50 s for $^{23}Na$. $^{6,7}Li$ NMR spectra were calibrated with $LiCl_{(s)}$ at −1.1 ppm and $^{23}Na$ NMR spectra was calibrated with $NaCl_{(aq)}$ at 0 ppm. $^7Li$ $T_1$ and $^{23}Na$ relaxation time was measured with an inversion-recovery pulse sequence.

Electrochemical Impedance Spectroscopy (EIS)—The sample prepared was pressed in a mold of 8 mm split cell to make an approximately 1 mm thick pellet and sandwiched between 0.1 mm thick indium foils (~6 mm diameter) as blocking electrodes. The measurement of potentiostatic EIS was carried out on a Gamry electrochemical analyzer on a frequency range from 1 Hz to 5 MHz. The conductivities are calculated using impedance from Nyquist plots. Variable temperature EIS characterization was performed in the CSZ microclimate chamber from −20° C. to 70° C. using a Biologic SP-300. Conductivities at various temperatures were calculated using Nyquist plots and the Arrhenius-type plots were prepared to calculate the activation energy.

DC polarization—To measure the electronic conductivity, the DC polarization method was used. [19] In-house built split cells (diameter=8 mm) using PEEK insulating cylinder and stainless-steel plungers as current collectors and indium as ion-blocking electrodes were used.

Results and Discussion

X-ray Diffraction—First, structural disorder was induced while maintaining periodic structure by subjecting stoichiometric amounts of $AlCl_3$ and $Li_2S$ to high mechanical stress via high-energy ball milling. Structure characterization using powder XRD (PXRD) reveals the presence of a monoclinic $LiAlCl_4$ phase for the pristine LAC composition as shown in FIG. 1. Since dynamical anion disorder (anion polyhedral rotation) promotes cation mobility,[1,12,20] sulfur was introduced with higher polarizability to promote local disorder. With sulfur substitution, a trace amount of $Li_2S$ is observed, however, LAC still maintains its monoclinic phase. This confirms the preservation of the crystallinity of the SE.

Figures 10, 11, 12A, 12B, 13:
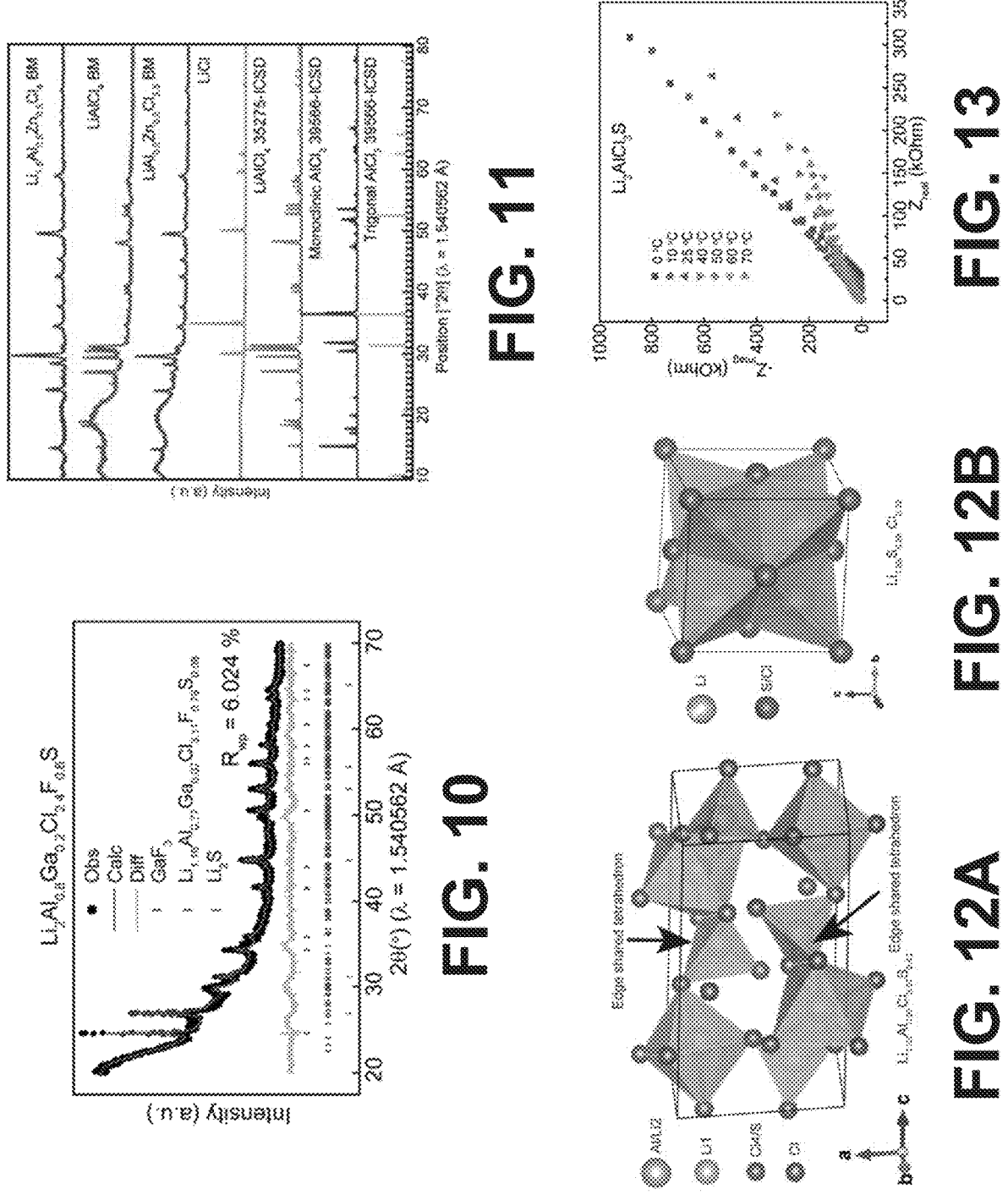
FIG. 10 shows lab powder XRD pattern and refinement of simultaneous Ga and F doped on LACS ($Li_2Al_{0.8}Ga_{0.2}Cl_{2.4}F_{0.6}S$).
FIG. 11 shows lab powder XRD pattern of different compositions with cation and anion substituted LAC and comparison with the precursors.
FIG. 12A shows a structure of sulfur-doped $LiAlCl_4$, showing edge shared tetrahedron of sulfur and chlorine anions. Lithium and aluminum occupancy is shared in one site whereas another 4e site is fully occupied with lithium. An increase in lithium-ion conduction is possible as lithium can use the aluminum sites that are shared.
FIG. 12B shows chlorine-doped $Li_2S$ structure observed as trace amount on refinement.
FIG. 13 shows representative Nyquist plots from variable temperature electrochemical impedance spectroscopy of $Li_2AlCl_3S$ electrolyte ball-milled for 20 hours.

The evolution of peaks corresponding to extra phases was observed even at low sintering temperatures. The weak and diffuse diffraction pattern of the annealed LACS suggests a decrease in the crystallinity of the material. Compared to the as-milled LACS, the annealed LACS has an intense peak of around 30° which is also present in the monoclinic LAC phase. Previous research has established the coexistence of dual phases for annealed samples.[21] The coexistence of the monoclinic phase suggests a distortion in the crystal structure of the material.[21] In addition, by simultaneously doping Ga in place of Al, and F in place of Cl, a decrease in crystallinity of the LACS phase was observed (FIG. 10) with higher crystalline traces of $Li_2S$ and $GaF_3$. However, with the aliovalent substitution such as $Zn^{2+}$ and $Ca^{2+}$ at the cation site, the structural transformation from a monoclinic to a spinel phase is observed (FIG. 11).

In the case of the Na analog, similar mixed-anion effects on the structure, like in LACS, are observed. Stoichiometric amounts of NaCl, $AlCl_3$ and $Na_2S$ were high-energy ball milled to synthesize $NaAlCl_4$ and $Na_2AlCl_3S$. Structure characterization using powder XRD (PXRD) reveals the presence of an orthorhombic $NaAlCl_4$ (NAC) phase for the pristine NAC composition (FIG. 2). Like in $LiAlCl_4$, to promote disorder to enhance cation mobility,[1] sulfur was introduced with higher polarizability considering that it could help to flatten the energy landscape. With sulfur substitution, the amount of $Na_2S$ observed is higher than $Li_2S$ in the case of LACS, however, the NAC still maintains its orthorhombic phase. This confirms the sulfur substitution and preservation of the periodic structure of the synthesized SE.

Figures 14A, 14B, 15A, 15B:
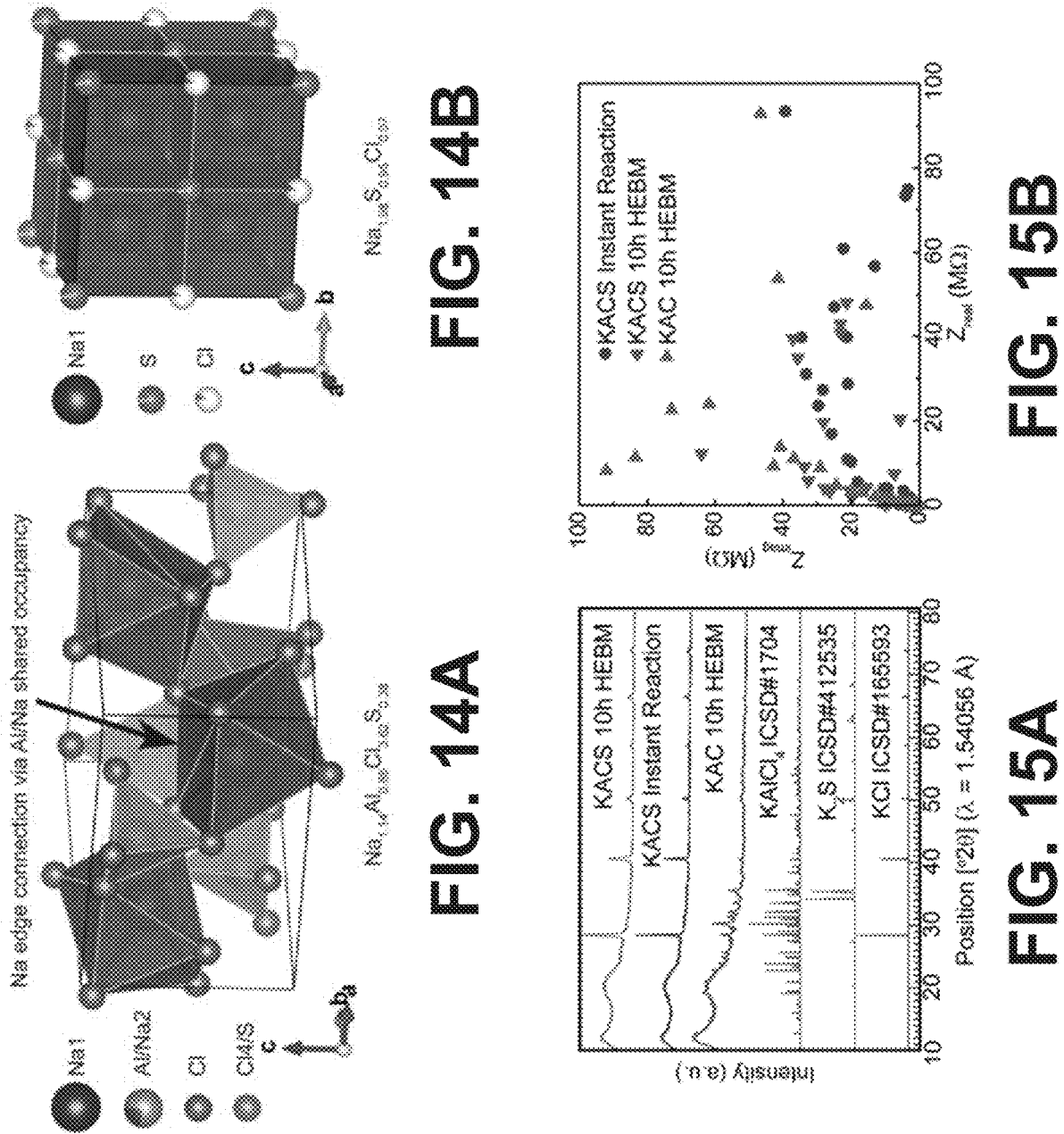
FIG. 14A shows a structure of sulfur-doped $NaAlCl_4$ showing edge shared tetrahedron of sulfur and chlorine anions. Sodium and aluminum occupancy is shared in one site while another 4a site (Na1) is fully occupied with sodium. An increase in sodium-ion conduction is possible as sodium can use the aluminum sites for hoping that are shared.
FIG. 14B shows a structure of chlorine-doped $Na_2S$.
FIG. 15A shows lab powder XRD pattern $KAlCl_4$, $K_2AlCl_3S$-instant reaction, and high-energy ball-milled $K_2AlCl_3S$.
FIG. 15B shows Nyquist plots of potassium tetrachloroaluminate and the sulfur doped samples.

In addition, synthesis of the potassium analog of LASC and NASC was attempted. The PXRD patterns of $K_2AlCl_3S$ (KACS) and $KAlCl_4$ (KAC) and the precursors are presented in FIG. 15A. The diffraction pattern of prepared KAC matches with the diffraction pattern of $KAlCl_4$ (P21 space group). While grinding the precursors for $K_2AlCl_3S$, there was an instant exothermic reaction between $K_2S$ and $AlCl_3$ which generated fumes inside the glovebox and turned the mixture to black. To prevent the safety hazard, further preparation was discontinued. However, after the observed reaction, the as-prepared black powder mixture was ball milled. As shown in FIG. 15A, the XRD pattern reveals the formation of KCl phase with Fm-3m space group for the burnt KACS. On ball milling for 10 hours, the crystallinity of KCl in $K_2AlCl_3S$ slightly decreases while preserving the diffraction pattern of Fm-3m space group.

Structure Refinement —$Li_2AlCl_3S$ crystallizes as a monoclinic structure type in the $P2_1/c$ space group. Structural refinement was performed using GSAS-11 on the synchrotron XRD data. The complete refinement parameters for the pristine and sulfur-substituted analog are provided in Table 4 to Table 9. From Table 5, refinement results reveal site disorder at the $Cl^-/S^{2-}$ site. This confirms that sulfur substitution via mechanochemical synthesis enforces local disorder made possible by the dynamic anion effect.[22] Notably, the refinement results show the presence of a trace amount of $Li_2S$ in the ball-milled sample. This result is consistent with the data from powder XRD and solid-state NMR (see below), thereby validating the accuracy of the structure refinement. In contrast to the Li site occupancies for LAC, a fraction of Li occupies the shared Al tetrahedral interstitial sites in LACS—creating more interconnected pathways for lithium-ion mobility. The fractional occupancy of lithium in tetrahedral sites particularly helps facilitate lithium hopping from one octahedral site to another octahedral site via connected tetrahedral sites. This validates the hypothesis that mechanochemical synthesis of the sulfur-substituted LAC generates a tetrahedral site occupation as confirmed by the low-intensity resonance in high-resolution [6]Li NMR analysis (see below). Notably, the formation of edge-sharing tetrahedrally coordinated lithium sites creates a pathway with lower energy barriers and correlates with the enhancement in the ionic conductivity of LACS.

For the Na analog, $Na_2AlCl_3S$ crystallizes as an orthorhombic structure type in the $P2_12_12_1$ space group. Structural refinement was performed using GSAS-II on the lab PXRD data. The complete table of refinement parameters for the pristine and sulfur-substituted analog are provided in Table 7, Table 8, and Table 9. From Table 8, the refinement results reveal disorder at the $Cl^-/S^{2-}$ sites, similar to the lithium analog. The structure of $Na_2AlCl_3S$ consists of two different polyhedral oriented randomly within the structure. In the Na-only (Na1) polyhedral, six Cl atoms and one S atom are distributed along the vertices of the polyhedral to form a 7-coordinate geometry. Na2 and Al1 occupy the tetrahedral site and are coordinated to three Cl atoms and a vacancy-rich S atom. Utilizing two of the three Cl atoms and the S atom, Na2 in the tetrahedral interstitial is edge-sharing with Na-only (Na1) polyhedral.

Figures 3A, 3B:
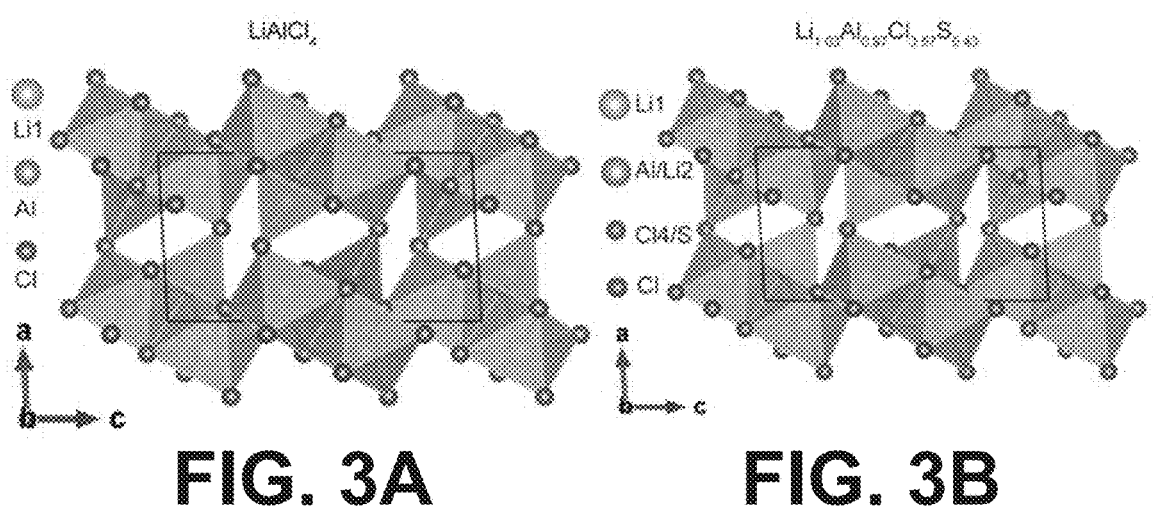
FIGS. 3A-3B show monoclinic structures of $LiAlCl_4$ with $P2_1/c$ space group obtained from the refined SXRD pattern (FIG. 3A) and $Li_2AlCl_3S$ with $P2_1/c$ space group obtained from the refined SXRD pattern (FIG. 3B).
Figure 3C:
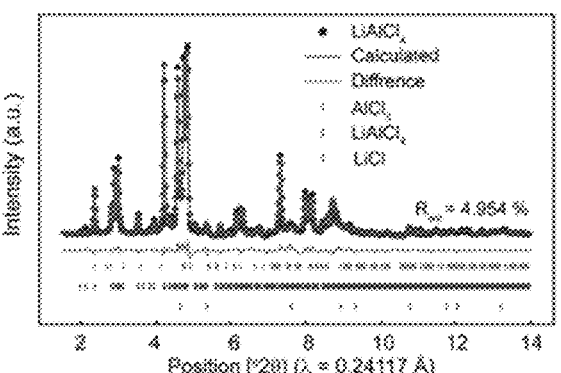
FIGS. 3C-3D show synchrotron diffraction patterns and the corresponding Rietveld refinement fits of $LiAlCl_4$ (FIG. 3C) and $Li_2AlCl_3S$ (FIG. 3D).
Figure 3D:
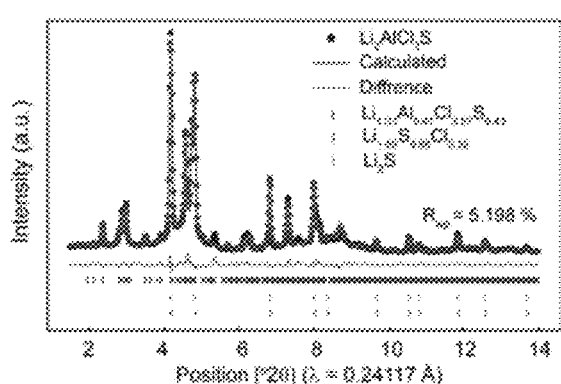
Figure 4A:
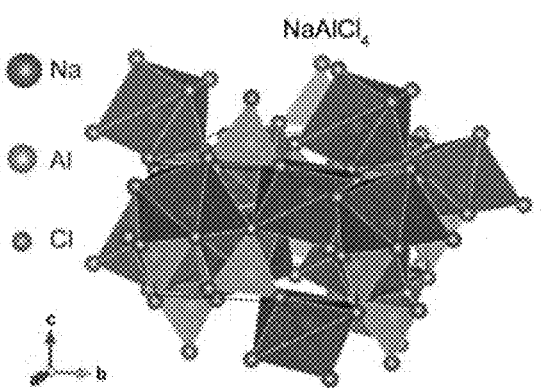
FIGS. 4A-4B show monoclinic structures of $NaAlCl_4$ with $P2_12_12_1$ space group obtained from the refined XRD pattern (FIG. 4A) and $Na_2AlCl_3S$ with $P2_12_12_1$ space group obtained from the refined XRD pattern (FIG. 4B).
Figure 4B:
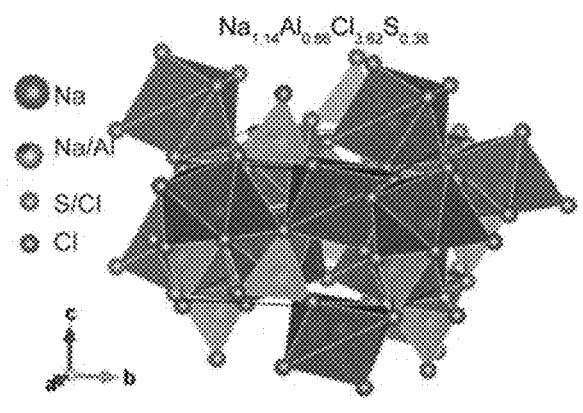
Figure 4C:
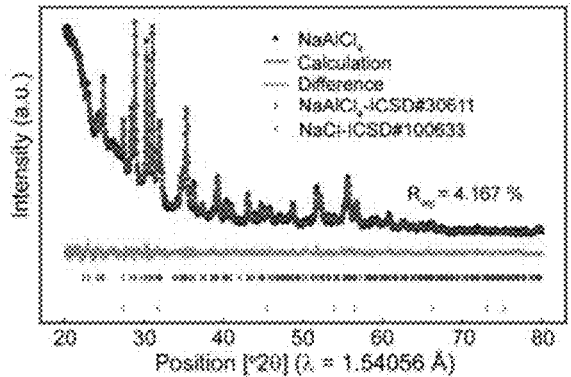
FIGS. 4C-4D show synchrotron diffraction patterns and the corresponding Rietveld refinement fits of $NaAlCl_4$ (FIG. 4C) and $Na_2AlCl_3S$ (FIG. 4D).
Figure 4D:
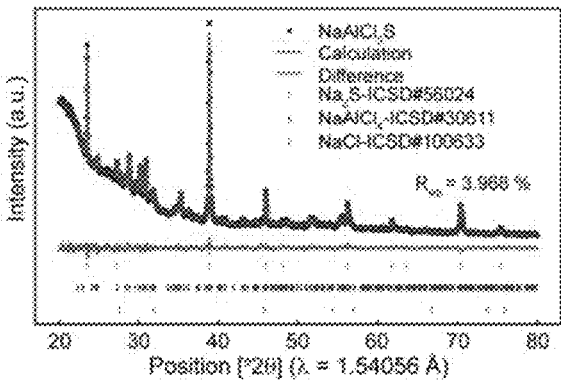
Figures 5, 6:
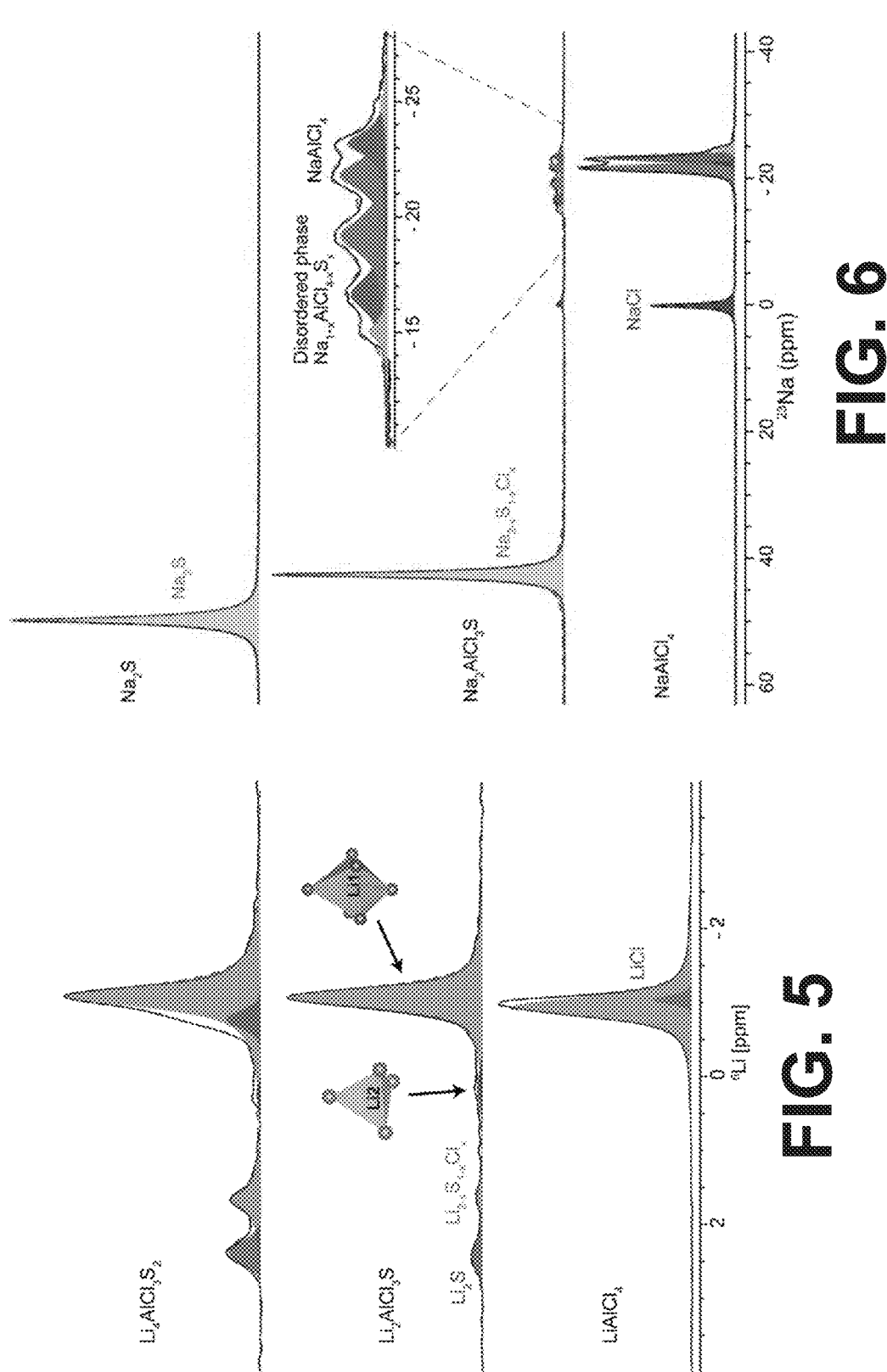
FIG. 5 shows high-resolution $^6Li$ MAS solid-state NMR spectra of LAC, LACS, and LACS2 solid electrolytes.
FIG. 6 shows high-resolution $^{23}Na$ MAS solid-state NMR spectra of ball-milled $NaAlCl_4$, $Na_2AlCl_3S$, and $Na_2S$ solid electrolytes.

Solid-state NMR—To advance understanding of the phases present and the local structure of LACS and $Li_4AlCl_3S_2$(LACS2), [6]Li solid-state NMR was performed. FIG. 5 compares the [6]Li NMR of LACS, LACS2, and LAC. The [6]Li NMR spectra of $Li_2AlCl_3S$ reveal four distinct resonances at −0.98, 0.15, 2.43, and 1.60 ppm. The minor peak observed at 2.43 ppm, corresponds to the $Li_2S$ impurity[23] previously identified in the diffraction data. Drawing upon established semi-empirical correlations that connect the lithium coordination environment to [6]Li NMR shifts,[24] the signal at 0.15 ppm is ascribed to the tetrahedrally coordinated Li2 site. This assignment agrees with the result from structural refinement where the total amount of Li occupying the tetrahedral site from [6]Li NMR phase quantification and structural refinement has been determined to be 3%. A similar low-intensity signal (Li2) corresponding to the tetrahedrally coordinated lithium sites has been previously reported for $LiAlCl_4$,[1] thereby validating the assignment. Conversely, the resonance at −0.98 ppm is assigned to the octahedrally coordinated Li1 site. The main signal, exhibiting a narrow full-width-half-maximum (FWHM) of 24.5 Hz at room temperature originates from rapid $Li^+$ hops, hindering the spectral resolution of Li sites characterized by different coordination numbers.[24] A significant increase in the peak intensity of $Li_2S$ in LACS2 was observed compared to LACS (FIG. 4). This is not surprising since twice the stoichiometric amount of $Li_2S$ used for the synthesis of LACS is required for LACS2, thereby increasing the number of impurity phases from incomplete reaction and/or residual precursor. The presence of $Li_2S$ has been further validated from powder XRD (FIG. 1) results and structural refinement (FIG. 2D) where trace amounts of $Li_2S$ were observed. The highest intensity peak of LACS2 shows a shoulder that resonates at −0.79 ppm (see FIG. 5). The asymmetry of this peak suggests the presence of an unknown phase in LACS2 which is absent in LACS. In addition, there is an extra peak assigned to $Li_{1.69}S_{0.38}Cl_{0.32}$ that resonates at 1.60 ppm—which is more evident in LACS2 (FIG. 3B). This is likely to be a metastable phase formed during the ball milling process.

The ion diffusion mechanism in ternary halides which extends to normal-spinel type and inverse-spinel type structures has been described as that in which tetrahedral coordinated Li-ions migrate using octahedral interstitials.[25,26] As expected, the ionic conductivity of some SEs in this family such as $Li_2ZnCl_4$ has been reported to be considerably low owing to the presence of only octahedrally coordinated sites for lithium ions.[25] This amplifies the need to explore routes that ensure the presence of tetrahedrally coordinated lithium sites where vacancies are preferentially generated to enhance $Li^+$ mobility.

$^7$Li spin-lattice relaxation time (Ti) is a useful indicator of ion dynamics. Table 1 confirms that LACS has a shorter $T_1$ compared to LAC and LACS2, which suggests faster ion motion.[27]

TABLE 1

| $^7$Li spin-lattice relaxation time ($T_1$) of LAC, LACS, and LACS2 | | |
|---|---|---|
| | $^7$Li $T_1$ [s] | |
| Sample | Li2 | Li1 |
| LiAlCl$_4$ | | 9.24 |
| Li$_2$AlCl$_3$S | 1.15 | 8.34 |
| Li$_4$AlCl$_3$S$_2$ | 1.19 | 8.73 |

FIG. 6 compares the MAS $^{23}$Na NMR spectra of NAC and NACS. NAC displays resonances at −21.75 ppm and −23.21 ppm with asymmetric line broadening due to second-order quadrupolar coupling.[6] A minor peak with very low intensity resonates at −24.83 ppm. The $^{23}$Na MAS spectrum of NACS displays an intense resonance at 42.66 ppm assigned to Na$_{2-x}$S$_{1-x}$Cl$_x$. This resonance is quite distinct from that of Na$_2$S in that it is shifted more upfield suggesting the incorporation of chlorine from the NAC phase into the Na$_2$S structure. Specifically, the shift upfield for Na$_{2-x}$S$_{1-x}$Cl$_x$ may be attributed to the induced changes in the local structure owing to the proximity of NAC. The weak signal at 0 ppm originates from a minimal amount of unreacted NaCl. Notably, there are six low-intense resonances further upfield at −15.04, −16.63, −19.17, −21.75, −23.21 and −24.83 ppm. The resonances at −21.75 and −23.21 ppm may be attributed to Na1 which fully occupies the 4a site in the octahedral prism polyhedron and Na2 which shares the tetrahedral 4a site with Al1.

These resonances may depict different coordination environments that may not be prominent in the structural refinement of the diffraction data. Specifically, the significant site disorder in NACS, introduces a distribution of local environments for Na$^+$ within the disordered region. The resonances at −15.04, −16.63, and −21.75 are therefore attributed to disordered Na$_{1+x}$AlCl$_{4-x}$S$_x$ from the NACS phase. Notably, the second-order quadrupolar line shape is not so prominent in NACS further corroborating the observation that the Na occupying the tetrahedral site may not be distinctly described by a perfect tetrahedral, but rather by a random distribution of S$^{2-}$ and Cl$^-$.[24] The $T_1$ of NACS is shown in Table 2.

TABLE 2

| $^{23}$Na spin-lattice relaxation time ($T_1$) of Na$_2$AlCl$_3$S | | |
|---|---|---|
| | $^{23}$Na $T_1$ [s] | |
| Sample | Na1 | Na2 |
| Na$_2$AlCl$_3$S | 0.45 | 0.61 |

Electrochemical Properties—To probe the alkali-ion dynamics of all prepared materials electrochemical impedance spectroscopy (EIS) was performed and the corresponding Nyquist plots are presented in FIGS. 7A, 8A, and 9A with a corresponding exemplary equivalent circuit fitting shown in FIGS. 7B, 8B, and 9B. The EIS analysis data are given in Table 3 and Table 10. For the composition of LACS the ionic conductivity was at least twenty-fold greater than pristine LiAlCl$_4$ at room temperature. Based on fitted resistance from the Nyquist plot using equivalent circuit modeling (exemplary fit given in FIG. 7B), LAC, LACS, LACS2, and LAG$_{0.2}$CFS achieved an ionic conductivity of 0.0086 mS cm$^{-1}$, 0.18 mS cm$^{-1}$, 0.13 mS cm$^{-1}$, and 0.35 mS cm$^{-1}$ respectively (FIGS. 7A and 8A). As shown in FIG. 12, the enhancement in ionic conductivity of the LACS may be attributed to the edge-sharing tetrahedron which also connects to the octahedron. The DC polarization plots of LACS, LACS2, and LAG$_{0.2}$CFS are given in FIGS. 7C, 8C, and 9C. The current value upon plateauing corresponds to an electronic conductivity of 5.43×10$^{-8}$ S cm$^{-1}$, 7.73×10$^{-8}$ S cm$^{-1}$, and 4.75×10$^{-9}$ S cm$^{-1}$ for LACS, LACS2, and LAG$_{0.2}$CFS, respectively, thereby confirming the negligible electronic contribution to the ionic conductivity of the samples. The significant increase in ionic conductivity can be attributed to the local disorder that causes the tetrahedron connection with near boring octahedrons. The energy barrier for Li-ion transport was then calculated form the variable temperature EIS measurement between the temperature range of 0° C. to 70° C. and representative Nyquist plots are shown in FIG. 13. The Arrhenius plot of LAC, LACS, and LACS2 are shown in FIG. 7D. The decrease in activation energy is observed with sulfur doping on LAC from 0.51 eV to 0.44 eV. This correlates with the increase in ion conductivity result, according to the Nernst-Einstein equation.[28]

Additionally, Na-ion diffusion was probed in the synthesized SEs using EIS. At an optimal composition of NACS, approximately a sixty-fold increase in ionic conductivity than pristine NAC is observed at room temperature. Based on the fitting of the Nyquist plot, an ionic conductivity of 0.15 mS cm$^{-1}$ is achieved for NACS (FIG. 9A). The significant increase in conductivity may be attributed to the local disorder that significantly enhances Na-ion mobility. In further detail, as shown in FIG. 14, the enhancement in ionic conductivity of the NACS also can be attributed to the edge-sharing between the polyhedra which creates a more favorable environment for Na$^+$ transport. The ion diffusion mechanism in ternary halides which extends to normal-spinel type and inverse-spinel type structures has been described as that in which tetrahedral coordinated lithium ions migrate using octahedral interstitials.[25,26] FIG. 9B shows the equivalent circuit fitting for the Nyquist plot of NACS at 25° C., suggesting there is negligible grain boundary resistance. The DC polarization of NAC and NACS (FIG. 9C) was performed at the constant potential of 0.1 V and the current at the plateau was used to calculate the resistance using Ohm's law. The electronic conductivity is hence calculated and corresponds to an overall electronic conductivity of 4.31×10$^{-9}$ S/cm and 4.07×10$^{-9}$ S/cm for NAC and NACS, respectively, which confirms the negligible electronic contribution to the overall ionic conductivity for the samples. The Arrhenius plot of NAC and NACS are shown in FIG. 9D. The energy barrier for Na-ion transport for NAC and NACS was determined to be 0.46 eV and 0.41 eV between the temperature range of 0° C. to 70° C. This confirms the increase in ionic conductivity is due to the decrease in the energy barrier after the introduction of sulfur to sodium tetrahaloaluminate.

Despite the futile attempt to synthesize KACS, the EIS analysis was performed on the prepared materials. Since there was no evident semicircle from the Nyquist plot, the activation energy and ionic conductivity were not determined.

The presence of octahedral and tetrahedral sites has been established for ternary metal halides such as Li$_2$MgCl$_4$ and LiAlCl$_4$ where intrinsic tetrahedral and octahedral interstitial sites govern the ion conduction mechanism. As expected, these materials possess relatively higher conductivity owing to the modified structure that facilitates ion hopping from the 4e octahedral site to the 4e tetrahedral site.[1] This 2D conduction pathway from $Li_{tet}$-$Li_{oct}$-$Li_{tet}$ has been poised as one that could be generated via mechanochemical synthesis.[1] Indeed, high-resolution $^6Li$ NMR of LACS and LACS2 in this present study reveals the two resonances at −0.98 and 0.15 ppm assigned as lithium octahedral and tetrahedral sites. It then becomes more plausible to relate the origin of the higher conductivity to the $S^{2-}/Cl^-$ site disorder and the presence of edge-sharing tetrahedrally coordinated lithium sites.

TABLE 3

Different compositions of prepared $A_aM_bNcX_dY_eS_f$ SEs and their corresponding ionic conductivity, electronic conductivity, activation energy, and Arrhenius prefactor at room 25° C.

| Composition | $\sigma_{DC,25° C.}$ [S cm$^{-1}$] | $\sigma_{e,25° C.}$ [S cm$^{-1}$] | $E_a$ [eV] | Log($\sigma_0$) [S cm$^{-1}$ K] |
|---|---|---|---|---|
| $LiAlCl_4$ - BM | $8.65 \times 10^{-6}$ | $3.49 \times 10^{-8}$ | 0.51 | 6.55 |
| $Li_2AlCl_3S$ - BM | $1.80 \times 10^{-4}$ | $5.43 \times 10^{-8}$ | 0.44 | 6.07 |
| $Li_4AlCl_3S_2$ - BM | $1.30 \times 10^{-4}$ | $7.73 \times 10^{-8}$ | 0.46 | 6.27 |
| $Li_2Al_{0.9}Ga_{0.1}Cl_{2.7}F_{0.3}S$ - BM | $1.70 \times 10^{-4}$ | $6.12 \times 10^{-8}$ | 0.49 | 7.04 |
| $Li_2Al_{0.8}Ga_{0.2}Cl_{2.4}F_{0.6}S$ - BM | $3.50 \times 10^{-4}$ | $4.75 \times 10^{-9}$ | 0.44 | 6.43 |
| $Li_2Al_{0.7}Ga_{0.3}Cl_{2.1}F_{0.9}S$ - BM | $1.50 \times 10^{-4}$ | $3.16 \times 10^{-9}$ | 0.46 | 6.51 |
| $NaAlCl_4$ - BM | $3.10 \times 10^{-6}$ | $4.31 \times 10^{-9}$ | 0.46 | 4.86 |
| $Na_2AlCl_3S$ - BM | $1.5 \times 10^{-4}$ | $4.07 \times 10^{-9}$ | 0.41 | 5.63 |

TABLE 4

Rietveld-refinement results of synchrotron diffraction data at room temperature for the mechanochemically synthesized $LiAlCl_4$.
$LiAlCl_4$ - Ball milled for 20 h.
Composition: $LiAlCl_4$
Lattice parameter: a = 7.0035(7), b = 6.5088(6), c = 13.0008(8), a = g = 90.000, b = 93.34(7),
Unit-cell volume = 591.62(8) Å$^3$
Density of $Li_2AlCl_4$ = 1.973 g/cm$^3$
$R_{wp}$ = 5.482%, Space group P2$_1$/c, Impurity phases: 2.1 wt % of LiCl

| Name | Atom | Wycoff position | x | y | z | Occupancy | $U_{iso}$ |
|---|---|---|---|---|---|---|---|
| Li1 | Li | 4e | 0.176(3) | 1.009(4) | 0.380(2) | 1 | 0.038(6) |
| Al1 | Al | 4e | 0.7098(8) | 0.329(1) | 0.9006(5) | 1 | 0.039(2) |
| Cl1 | Cl | 4e | 0.6944(8) | 0.1834(8) | 0.0459(5) | 1 | 0.045(2) |
| Cl2 | Cl | 4e | 0.8085(8) | 0.6225(8) | 0.9265(5) | 1 | 0.036(2) |
| Cl3 | Cl | 4e | 0.9232(8) | 0.1819(9) | 0.8136(5) | 1 | 0.038(2) |
| Cl4 | Cl | 4e | 0.4469(8) | 0.3062(8) | 0.8127(5) | 1 | 0.035(2) |

TABLE 5

Rietveld-refinement results of synchrotron diffraction data at room temperature for the mechanochemically synthesized $Li_2AlCl_4S$.
$Li_2AlCl_3S$ - Ball milled for 20 h.
Composition: $Li_{1.03}Al_{0.97}Cl_{3.57}S_{0.43}$
Lattice parameter: a = 7.0195(8), b = 6.5237(8), c = 13.003(2), a = g = 90.0000, b = 93.47(1),
Unit-cell volume = 594.38(8) Å$^3$;
Density of $Li_{1.15}Al_{0.85}Cl_{3.68}S_{0.32}$ = 1.941 g/cm$^3$
$R_{wp}$ = 5.76%, Space group P2$_1$/c
Impurity phases: 23.2 wt % of $Li_2S$ and 3.3 wt % of $Li_{2-x}S_{1-x}Cl_x$

| Name | Atom | Wycoff position | x | y | z | Occupancy | $U_{iso}$ |
|---|---|---|---|---|---|---|---|
| Li1 | Li | 4e | 0.17(1) | 0.99(1) | 0.364(6) | 1 | 0.072(6) |
| Li2 | Li | 4e | 0.719 | 0.329 | 0.902 | 0.030(7) | 0.023(3) |
| Al2 | Al | 4e | 0.719(2) | 0.329(2) | 0.902(1) | 0.970(4) | 0.026(3) |
| Cl1 | Cl | 4e | 0.677(2) | 0.195(1) | 0.0500(8) | 1 | 0.039(3) |
| Cl2 | Cl | 4e | 0.945(2) | 0.160(2) | 0.811(1) | 1 | 0.031(3) |
| Cl3 | Cl | 4e | 0.814(2) | 0.619(1) | 0.924(1) | 1 | 0.016(2) |
| Cl4 | Cl | 4e | 0.464(2) | 0.290(2) | 0.806(1) | 0.566(6) | 0.015(4) |
| S4 | S | 4e | 0.464 | 0.290 | 0.806 | 0.434(6) | 0.054(3) |

TABLE 6

$Na_{1.98}S_{0.92}Cl_{0.07}$ phase from Rietveld-refinement results of
XRD at room temperature for the mechanochemically
synthesized $Na_2AlCl_4S$.
Refined composition: $Li_{1.8}S_{0.8}Cl_{0.2}$
Lattice parameter: a = 5.7138(7), a = b = g = 90.0000,
Unit-cell volume = 186.54(5) $Å^3$;
Density of $Na_2AlCl_3S$ = 1.867 $g/cm^3$
Space group Fm-3m

| Name | Atom | Wycoff position | Atomic coordinates x | y | z | Occupancy | $U_{iso}$ |
|------|------|------|------|------|------|------|------|
| Li | Li | 8c | 0.25 | 0.25 | 0.25 | 0.901(1) | 0.014(5) |
| S | S | 4a | 0 | 0 | 0 | 0.801(1) | 0.010(1) |
| Cl | Na | 4a | 0 | 0 | 0 | 0.199(3) | 0.017(2) |

TABLE 9

$Na_{1.98}S_{0.92}Cl_{0.07}$ phase from Rietveld-refinement results of XRD at
room temperature for the mechanochemically synthesized $Na_2AlCl_4S$.
Refined composition: $Na_{1.98}S_{0.92}Cl_{0.07}$
Lattice parameter: a = 6.5389(7), a = b = g = 90.0000,
Unit-cell volume = 279.59(3) $Å^3$;
Density of $Na_2AlCl_3S$ = 1.867 $g/cm^3$
Space group Fm-3m

| Name | Atom | Wycoff position | Atomic coordinates x | y | z | Occupancy | $U_{iso}$ |
|------|------|------|------|------|------|------|------|
| Na | Na | 8c | 0.25 | 0.25 | 0.25 | 0.989(1) | 0.011(1) |
| S | S | 4a | 0 | 0 | 0 | 0.920(1) | 0.012(1) |
| Cl | Na | 4b | 0.5 | 0.5 | 0.5 | 0.073(3) | 0.153(6) |

TABLE 7

Rietveld-refinement results of X-ray diffraction data at room temperature for the
mechanochemically synthesized $NaAlCl_4$.
$NaAlCl_4$ - Ball milled for 20 h.
Lattice parameter: a = 10.3406(2), b = 9.8956(2), c = 6.1723(6), a = b = g = 90.0000,
Unit-cell volume = 631.59(8 $Å^3$
Density of $NaAlCl_4$ = 2.017 $g/cm^3$
$R_{wp}$ = 4.190%, Space group $P2_12_12_1$, Impurity phases: 2.9 wt % of NaCl

| Name | Atom | Wycoff position | Atomic coordinates x | y | z | Occupancy | $U_{iso}$ |
|------|------|------|------|------|------|------|------|
| Na1 | Na | 4a | 0.120(2) | 0.218(1) | 0.689(2) | 1 | 0.063(6) |
| Al1 | Al | 4a | 0.0380(9) | 0.483(2) | 0.207(2) | 1 | 0.033(4) |
| Cl1 | Cl | 4a | 0.0312(6) | 0.492(1) | 0.556(1) | 1 | 0.048(3) |
| Cl2 | Cl | 4a | 0.145(1) | 0.316(1) | 0.113(2) | 1 | 0.047(4) |
| Cl3 | Cl | 4a | 0.3475(7) | 0.024(1) | 0.923(1) | 1 | 0.038(3) |
| Cl4 | Cl | 4a | 0.382(1) | 0.336(1) | 0.572(2) | 1 | 0.049(4) |

TABLE 8

Rietveld-refinement results of XRD at room temperature for the
mechanochemically synthesized $Na_2AlCl_4S$.
Refined composition: $Na_{1.14}Al_{0.86}Cl_{3.62}S_{0.38}$
Lattice parameter: a = 10.361(1), b = 9.890(1), c = 6.1765(6), a = b = g = 90.0000,
Unit-cell volume = 632.85(8) $Å^3$;
Density of $Na_2AlCl_3S$ = 1.993 $g/cm^3$
$R_{wp}$ = 3.865%, Space group $P2_12_12_1$

| Name | Atom | Wycoff position | Atomic coordinates x | y | z | Occupancy | $U_{iso}$ |
|------|------|------|------|------|------|------|------|
| Na1 | Na | 4a | 0.117(3) | 0.211(3) | 0.696(4) | 1 | 0.036(7) |
| Al1 | Al | 4a | 0.039(2) | 0.481(3) | 0.215(3) | 0.859(3) | 0.015(6) |
| Na2 | Na | 4a | 0.039 | 0.481 | 0.215 | 0.141(4) | 0.015 |
| Cl1 | Cl | 4a | 0.031(2) | 0.493(4) | 0.553(3) | 1 | 0.041(9) |
| Cl2 | Cl | 4a | 0.141(7) | 0.307(9) | 0.111(7) | 0.619(2) | 0.04(2) |
| Cl3 | Cl | 4a | 0.344(2) | 0.018(3) | 0.921(4) | 1 | 0.030(8) |
| Cl4 | Cl | 4a | 0.374(2) | 0.333(2) | 0.570(4) | 1 | 0.012(8) |
| S2 | S | 4a | 0.144 | 0.314 | 0.105 | 0.381(2) | 0.04 |

TABLE 10

Different compositions of prepared $A_aM_bNcX_dY_eS_f$
SEs and their corresponding ionic conductivity at room 25° C.

| Composition | $\sigma_{DC,25° C.}$ [S/cm] |
| --- | --- |
| LiAlCl$_4$ - BM | $8.65 \times 10^{-6}$ |
| LiAl$_{0.5}$Zn$_{0.5}$Cl$_{3.5}$ - BM | $6.68 \times 10^{-7}$ |
| Li$_{1.5}$Al$_{0.5}$Zn$_{0.5}$Cl$_4$ - BM | $5.60 \times 10^{-6}$ |
| Li$_{1.5}$Al$_{0.5}$Zn$_{0.5}$Cl$_4$ - 250° C. | $4.90 \times 10^{-6}$ |
| Li$_{1.2}$Al$_{0.8}$Ca$_{0.2}$Cl$_4$ - 200° C. | $1.27 \times 10^{-7}$ |
| Li$_{1.6}$Al$_{0.6}$Ca$_{0.4}$Cl$_4$ - 200° C. | $1.68 \times 10^{-7}$ |
| LiAlCl$_{3.5}$Br$_{0.5}$ - BM | $6.40 \times 10^{-6}$ |

Example 2

Material Synthesis

LiCl (Sigma Aldrich) was dried at 200° C. for 12 hours under a dynamic vacuum before being stored in an argon-filled glovebox. Anhydrous Li$_2$S (Alfa Aesar) and ultra-dry AlCl$_3$ (Alfa Aesar) were used as received and handled under argon. Stoichiometric amounts of precursors were ground using a mortar/pestle for 5 minutes inside an argon-filled glovebox. The hand-milled powder was transferred into a ZrO$_2$ jar containing two 10-mm balls as milling media. After the jar was vacuum sealed, mechanochemical mixing was performed using a SPEX 8000M MIXER/MILL (SPEX® SamplePrep, USA) for 20 hours. Afterward, the ball-milled powder, typically ~130 mg, was pressed into a pellet of 8 mm in diameter under ~400 MPa inside an argon-filled Mbraun glovebox. The resulting pellet had a thickness of ~1.2 mm and appeared shiny white.

Powder X-ray Diffraction—The as-milled samples were packed in a zero-background sample holder. KAPTON® film (DUPONT™, USA) was used to seal the samples to prevent exposure to humid air. Powder X-ray Diffraction (PXRD) was performed using a RIGAKU® Smartlab powder diffractometer with Bragg-Brentano geometry at a voltage of 45 kV and current of 40 mA with Cu-Ka radiation (a=1.540562 Å). The data was collected in the 2θ range of 10-80° at a step size of 0.03° for 30 minutes.

Synchrotron X-ray Diffraction—Synchrotron X-ray diffraction (SXRD) measurements were carried out in the transmission mode at the 17-BM-B beamline, APS, at Argonne National Lab (ANL), Illinois. The exact X-ray wavelength was refined to 0.24117 Å. The sample was loaded inside a special glass capillary, and the holder was moved up and down during tests to ensure uniformity of the measured results.

Rietveld Refinement—Rietveld refinement of the lab and synchrotron PXRD data was performed using the GSAS-II software. Structural analysis of the synchrotron PXRD data on LiAlCl$_4$ and Li$_2$AlCl$_3$S reveals a monoclinic phase belonging to the P2$_1$/c space group of LiAlCl$_4$ (ICSD-35275). Sulfur occupancy was tested on all the chlorine sites, and the result was only considered accurate when sulfur occupancy was greater than 1% on the tested site. Lithium and aluminum occupancy were tested for the counter-cation sites of each other to find the most probable structure. Atomic parameters for the site were fixed for the substituents (S, Cl, etc.).

Computational Approach—All density functional theory (DFT) energy calculations and ab initio molecular dynamics (AIMD) simulations were carried out in the Vienna ab initio simulation package (VASP).[18] The projector-augmentedwave (PAW) approach was used.[19] Perdew-Burke-Ernzerhof generalized-gradient approximation (GGA-PBE) was chosen as the exchange-correlation functional using the latest PAW potential files available in VASP.[20] Python Materials Genomics (Pymatgen) package[21] was used to optimize the structures of Li$_2$AlCl$_3$S. 10 supercells with different local environments were generated based on the 2×2×1 supercell of the LACS obtained from the high-resolution XRD structure refinement. Geometry optimization of the generated supercells was carried out using DFT calculations. The AIMD simulations[22] were based on the canonical ensemble for over 80 ps with a time step of 2 fs. The temperature was initialized at 100 K and elevated to the target value for the simulations.

Solid-state NMR-$^6$Li and $^7$Li NMR experiments were performed using a BrukerAdvance-III 500 spectrometer at Larmor frequencies of 73.6 MHz and 194.4 MHz for $^6$Li and $^7$Li, respectively. The magic-angle-spinning (MAS) rate was 24 kHz. Single-pulse MAS $^6$Li and $^7$Li NMR experiments were performed using r/2 pulse lengths of 3.30 ps and 2.90 ps, respectively. For Li$_2$AlCl$_3$S, the recycle delays were 500 s for $^6$Li and 80 s for $^7$Li, while a recycle delay of 500 s for $^6$Li and 90 s for $^7$Li was utilized for LiAlCl$_4$. $^7$Li NMR spectra were calibrated with LiCl(s) at −1.1 ppm, and $^7$Li T$_1$ relaxation time was measured with an inversion-recovery pulse sequence.

Variable-temperature $^7$Li T$_1$ relaxation NMR experiments were performed using a Bruker Avance-I 300 MHz Spectrometer from 25 to 70° C. An inversion recovery pulse sequence with a π/2 pulse length of 2.63 μs was utilized. The $^7$Li Larmor frequency was 116.6 MHz. Sample powders were packed into 4 mm ZrO$_2$ rotors under Argon and spun at a MAS rate of 10 kHz.

A $^6$Li|SE|$^6$Li symmetrical cell was assembled in an argon-filled glovebox for the $^6$Li à $^7$Li tracer exchange experiment. The cell was then subjected to galvanostatic cycling for 3 days at a current density of 5 μA cm$^{-2}$ to drive the diffusion of $^6$Li$^+$ ions from the $^6$Li foil into the Li$_2$AlCl$_3$S pellet. Following the galvanostatic cycling, $^6$Li MAS NMR experiments were performed on the cycled Li$_2$AlCl$_3$S pellet using the Bruker Advance-Ill 500 spectrometer at a spinning rate of 24 kHz, using the same parameters as described above.

Electrochemical Impedance Spectroscopy (EIS)—The samples were pressed in a mold of 8-mm diameter to make 1.3-mm thick pellets, which were sandwiched between Indium of diameter 6 mm (about 0.24 in) followed by stainless steel plungers as ion-blocking electrodes. The measurement of potentiostatic EIS was carried out on a Biologic SP-300 electrochemical analyzer within a frequency range from 7 MHz to 1 Hz using a voltage of 10 mV. The conductivities are calculated using resistance obtained by fitting the Nyquist plots using an equivalent circuit model. Variable-temperature EIS characterization was performed in the CSZ microclimate chamber from −20° C. to 70° C. using a Biologic SP-300, and Arrhenius-type plots were used to calculate the activation energies and Arrhenius prefactors.

DC Polarization—The DC polarization method was used to measure the electronic conductivity.[23] In-house-built split cells (diameter=8 mm) using PEEK insulating cylinder and stainless-steel plungers as current collectors and indium foils (~6 mm diameter) as ion-blocking electrodes were used.

Cyclic Voltammetry (CV) and Galvanostatic Cycling of ASSB Half-cells—ASSB half-cells were assembled using pressure cells constructed in-house, using a PEEK casing of 10 mm diameter and stainless-steel plungers. For CV measurements, the initial steps involved pressing 100 mg of LiAlCl$_4$ (or Li$_2$AlCl$_3$S) at 300 MPa for 10 s. Then, roughly 10 mg of the manually mixed 3SE:carbon black (C: Super P) composite was evenly spread and pressed at 300 MPa for 10 s. On the opposite side of the LiAlCl$_4$ (or Li$_2$AlCl$_3$S) pellet, a piece of indium (In) foil measuring ⁵⁄₁₆ inch in diameter and 0.1 mm in thickness, with an approximate weight of 32 mg was attached. Subsequently, lithium foil with a ³⁄₁₆-inch diameter and weighing around 1 mg was pressed onto the In foil to form Li—In and used as the counter electrode, giving a final cell setup of Li—In|SE|3SE:C. With the cell sealed using vacuum grease, it was subjected to electrochemical cycling under an estimated stack pressure of approximately 30 MPa at 22° C. CV measurements were conducted with a scan rate of 0.2 mV s⁻¹ from 0 to 4 V vs. Li—In.

To prepare the composite cathode (or catholyte) for galvanostatic cycling, TiS$_2$ (Sigma Aldrich, 99.9%) was initially dried at 200° C. for 12 hours, then subjected to ball milling for 5 hours at 300 rpm to reduce particle size. Subsequently, LiAlCl$_4$ or Li$_2$AlCl$_3$S was combined with TiS$_2$ at a TiS$_2$:SE mass ratio of 1:2 and ground together using a mortar and pestle for 10 minutes. Li$_6$PS$_5$Cl, synthesized following the established method by Patel et al.,[12] was pressed into pellets at 300 MPa for 10 seconds as the separator. For the half-cell assembly, 12 mg of the catholyte was evenly spread onto one side of the Li$_6$PS$_5$Cl pellet, achieving an aerial loading of approximately 1.25 mAh cm⁻², followed by further pressing at 300 MPa for 10 seconds. A Li—In alloy foil was affixed to the opposite side of the Li$_6$PS$_5$Cl pellet to assemble the Li—In|Li$_6$PS$_5$Cl|2SE:TiS$_2$ (SE: LiAlCl$_4$ or Li$_2$AlCl$_3$S) half cells. Finally, the cells were sealed with vacuum grease and subjected to controlled cycling conditions at 22° C. with a stack pressure of ~30 MPa, within a voltage window of 1-2.5 V vs. Li—In. For rate performance evaluations, the cells underwent cycling for 5 cycles at each of the following rates: 0.1 C, 0.2 C, 0.5 C, 1 C, and 2 C, with C representing the charge-discharge rate. Correspondingly, these rates translate to current densities of 0.14 mA cm⁻², 0.28 mA cm⁻², 0.70 mA cm⁻², 1.40 mA cm⁻², and 2.80 mA cm⁻², respectively. Subsequently, long-term stability testing was conducted over 175 cycles at 0.2 C.

Results and Discussion

X-Ray Diffraction and Structure

X-ray diffraction (XRD) was employed to investigate the long-range structure of the synthesized solid electrolytes.

Figures 16A, 16B, 16C, 16D:
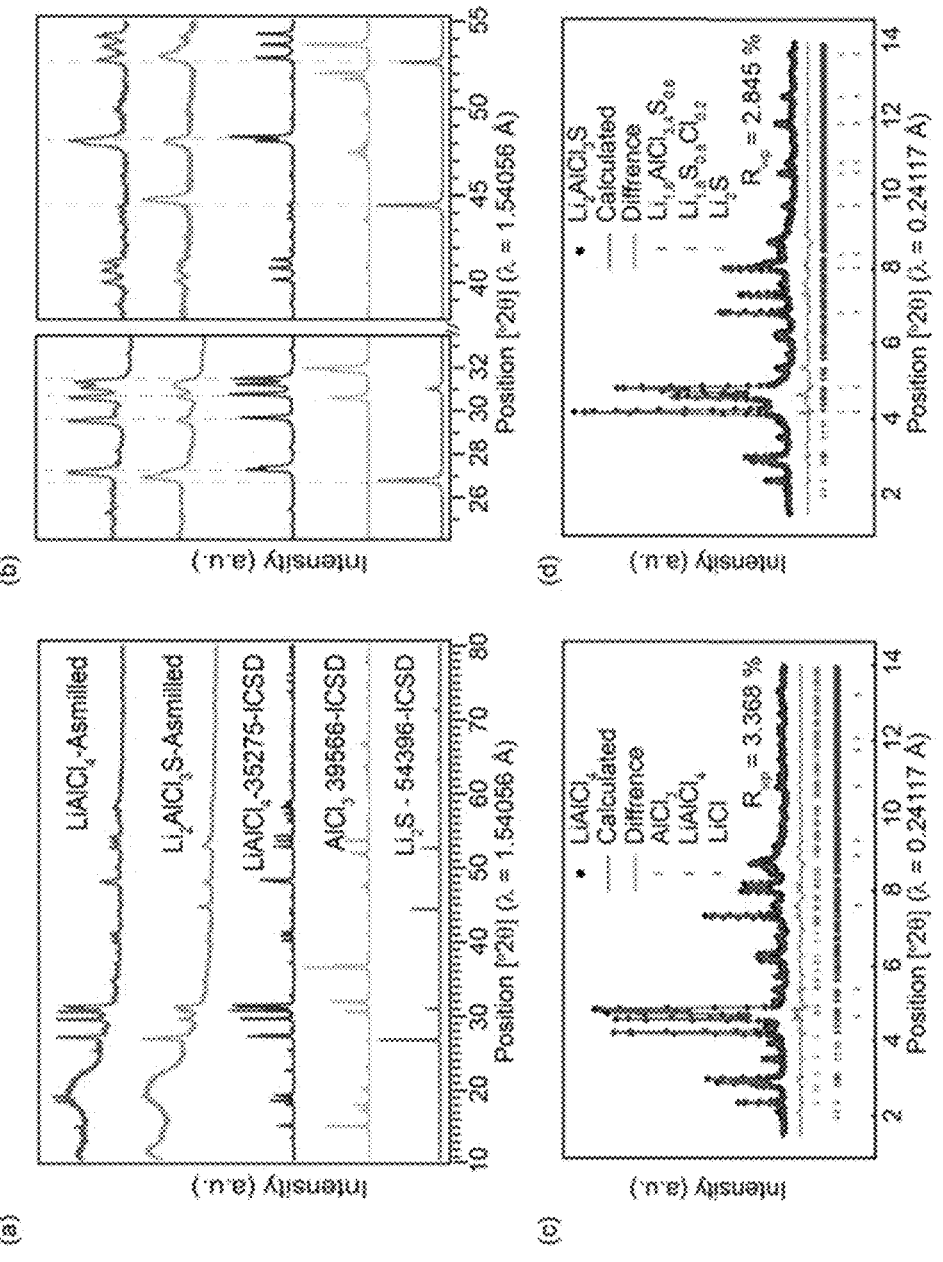
FIGS. 16A-16I show long-range structures of $LiAlCl_4$ and $Li_2AlCl_3S$, determined using Lab-X-ray diffraction and high-resolution X-ray diffraction. (a) Lab X-ray diffraction patterns of the as-milled $LiAlCl_4$ and $Li_2AlCl_3S$. The ICSD patterns of precursors and $LiAlCl_4$ monoclinic phase ($P2_1/c$ space group) are shown as references. (b) The magnified view of the selected 2q ranges in (a). (c) and (d) High-resolution X-ray diffraction patterns and the corresponding Rietveld refinement of $LiAlCl_4$ and $Li_2AlCl_3S$, respectively. (e) and (g) Monoclinic structures of $LiAlCl_4$ and $Li_{1.6}AlCl_{3.4}S_{0.6}$ with the $P2_1/c$ space group, respectively, obtained from refined high-resolution XRD patterns. (f) The structure of $L_{1.6}AlCl_{3.4}S_{0.6}$ viewed along the a-axis showing tetrahedral voids face-shared with Li-octahedra. (h) The visualization of partially occupied octahedral lithium at Wyckoff 2b position face-shared with highly distorted octahedral sites at Wyckoff 4e positions. (i) Possible lithium migration pathways.
Figures 16E, 16F, 16G, 16H, 16I:
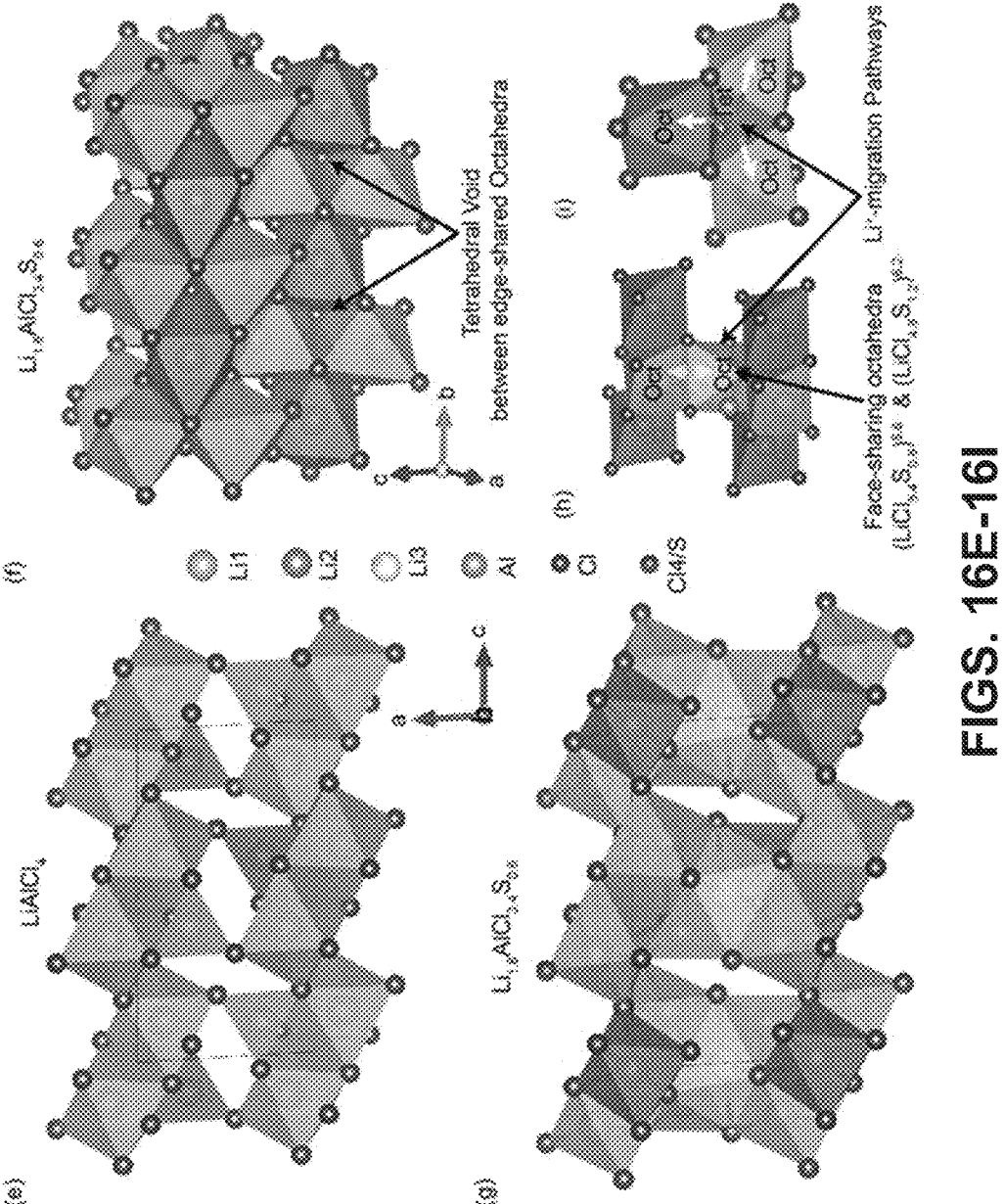

The powder XRD confirms the presence of a monoclinic LiAlCl$_4$ phase. With sulfur substitution, the long-range monoclinic structure is maintained for Li$_2$AlCl$_3$S. However, the weak and diffuse diffraction pattern of the as-milled Li$_2$AlCl$_3$S suggests a decrease in the crystallinity of the material. Rietveld refinement was performed against high-resolution XRD data using GSAS-II. FIGS. 16c-f show the diffraction patterns and the refined structures. For LiAlCl$_4$, the crystalline phase was refined with a monoclinic structure type in the P2$_1$/c space group. The structure is built from distorted LiX$_6$ octahedra and AlCl$_4$ tetrahedra. Two LiCl$_6$⁵⁻ octahedra are edge-shared to form Li$_2$Cl$_{10}$⁸⁻ dimers. AlCl$_4$⁻ tetrahedra are isolated from one another. All the atoms in the structure occupy only the 4e Wyckoff positions, leaving all other sites, i.e., 2a, 2b, 2c, and 2d Wyckoff positions, vacant (see FIG. 16e). The arrangement of atoms is characterized by a slightly distorted hexagonal cubic packed (hcp) Cl⁻ sublattice, where octahedral and tetrahedral interstices are filled by Li⁺ and A³⁺, respectively. In addition, each AlCl$_4$ tetrahedron is linked to one Li—Cl dimer via two edges and to two other dimers through one corner each (FIG. 16e).

Similarly, Li$_2$AlCl$_3$S crystallizes in the P2$_1$/c space group. However, different from LiAlCl$_4$, the unit cell consists of three octahedrally coordinated cation sites —Li1 at 4e, Li2 at 2a, and Li3 at the 2a Wyckoff position; and tetrahedrally coordinated Al at the 4e Wyckoff position. Sulfur and chlorine atoms co-occupy the 4e anionic site, yielding a disordered anion sublattice. Along the c-direction, the structure exhibits three distinct cation layers (FIG. 16g). In the first layer, Li2 octahedra (LiCl$_6$)⁵⁻ edge-share with Li1 (LiCl$_{5.4}$S$_{0.6}$)⁵·⁶⁻ and corner-share with the tetrahedrally coordinated Al. In the second layer, Li3 octahedra (LiCl$_{4.8}$S$_{1.2}$)⁶·²⁻ face-share with Li1 (FIG. 16h), and both Li1 and Li3 octahedra share corners with the tetrahedrally coordinated Al. In the third layer, the Al sites face-share with Li3 and edge-share with Li1 and Li2 octahedra. In addition, the edge-sharing Li1, Li2, and Li3 octahedra produce tetrahedral voids (FIG. 16f). The complete refinement parameters for LiAlCl$_4$ and Li$_2$AlCl$_3$S are provided in Table 11 to Table 13. The refinement reveals the actual composition of the nominal Li$_2$AlCl$_3$S is Li$_{1.6}$AlCl$_{3.4}$S$_{0.6}$, which exhibits mixed Cl⁻/S²⁻ site occupancies in the structure. A trace amount of Li$_2$S is identified in the ball-milled Li$_2$AlCl$_3$S sample, consistent with the data from the powder XRD. The refined composition, Li$_{1.6}$AlCl$_{3.4}$S$_{0.6}$, is adopted hereafter.

TABLE 11

Rietveld-refinement results of high-resolution X-ray diffraction data at room temperature for the mechanochemically synthesized LiAlCl$_4$.
LiAlCl$_4$ - Ball milled for 20 h.
Composition: LiAlCl$_4$
Lattice parameter: a = 7.0035(7), b = 6.5088(6), c = 13.0008(8), a = g = 90.000, b = 93.34(7),
Unit-cell volume = 591.62(8) Å³
Density of Li$_2$AlCl$_4$ = 1.973 g/cm³
R$_{wp}$ = 5.482%, Space group P21/c, Impurity phases: 2.8 wt % of LiCl

| Name | Atom | Wycoff position | Atomic coordinates x | y | z | Occupancy | U$_{iso}$ |
|---|---|---|---|---|---|---|---|
| Li1 | Li | 4e | 0.176(3) | 1.009(4) | 0.380(2) | 1 | 0.038(6) |
| Al1 | Al | 4e | 0.7098(8) | 0.329(1) | 0.9006(5) | 1 | 0.039(2) |
| Cl1 | Cl | 4e | 0.6944(8) | 0.1834(8) | 0.0459(5) | 1 | 0.045(2) |
| Cl2 | Cl | 4e | 0.8085(8) | 0.6225(8) | 0.9265(5) | 1 | 0.036(2) |
| Cl3 | Cl | 4e | 0.9232(8) | 0.1819(9) | 0.8136(5) | 1 | 0.038(2) |
| Cl4 | Cl | 4e | 0.4469(8) | 0.3062(8) | 0.8127(5) | 1 | 0.035(2) |

TABLE 12

Rietveld-refinement results of the high-resolution X-ray diffraction data for the
mechanochemically synthesized $Li_2AlCl_3S$.
Refined composition : $Li_{1.6}AlCl_{3.4}S_{0.6}$
Lattice parameter: a = 7.0207(8), b = 6.5206(8), c = 13.004(2), a = g = 90.0000, b = 93.43(1),
Unit-cell volume = 594.26(8) Å³;
Density of $Li_{1.6}AlCl_{3.4}S_{0.6}$ = 1.984 g cm⁻³
$R_{wp}$ = 2.85%, Space group P2₁/c
Impurity phases: 14 wt % of $Li_2S$ and 10 wt % of $Li_{1.66}S_{0.66}Cl_{0.34}$

| Name | Atom | Wycoff position | Atomic coordinates x | y | z | Occupancy |
|------|------|-----------------|-------|-------|-------|-----------|
| Li1 | Li | 4e | 0.198(1) | 0.035(1) | 0.349(6) | 1 |
| Li2 | Li | 2a | 0 | 0 | 0 | 1(4) |
| Li3 | Li | 2a | 0.5 | 0 | 0.5 | 0.17(3) |
| Al2 | Al | 4e | 0.728(2) | 0.335(2) | 0.898(1) | 1 |
| Cl1 | Cl | 4e | 0.685(2) | 0.200(2) | 0.043(1) | 1 |
| Cl2 | Cl | 4e | 0.955(2) | 0.164(2) | 0.809(1) | 1 |
| Cl3 | Cl | 4e | 0.812(2) | 0.622(1) | 0.925(1) | 1 |
| Cl4 | Cl | 4e | 0.464(2) | 0.296(2) | 0.806(1) | 0.519(6) |
| S4 | S | 4e | 0.464(2) | 0.296(2) | 0.806(1) | 0.481(6) |

TABLE 13

Rietveld-refinement results of the
$Li_{1.66}S_{0.66}Cl_{0.34}$-phase present in $Li_2AlCl_3S$.
Refined composition: $Li_{1.66}S_{0.66}Cl_{0.34}$
Lattice parameter: a = 5.7138(7), a = b = g = 90.0000,
Unit-cell volume = 186.64(5) Å³;
Density of $Li_{1.66}S_{0.66}Cl_{0.34}$ = 1.592 g/cm³
Space group Fm-3m

| Name | Atom | Wycoff position | Atomic coordinates x | y | z | Occupancy | $U_{iso}$ |
|------|------|-----------------|-------|-------|-------|-----------|-----------|
| Li | Li | 8c | 0.25 | 0.25 | 0.25 | 0.83(1) | 0.015(5) |
| S | S | 4a | 0 | 0 | 0 | 0.66(1) | 0.012(1) |
| Cl | Cl | 4a | 0 | 0 | 0 | 0.34(2) | 0.012(2) |

Figure 17:
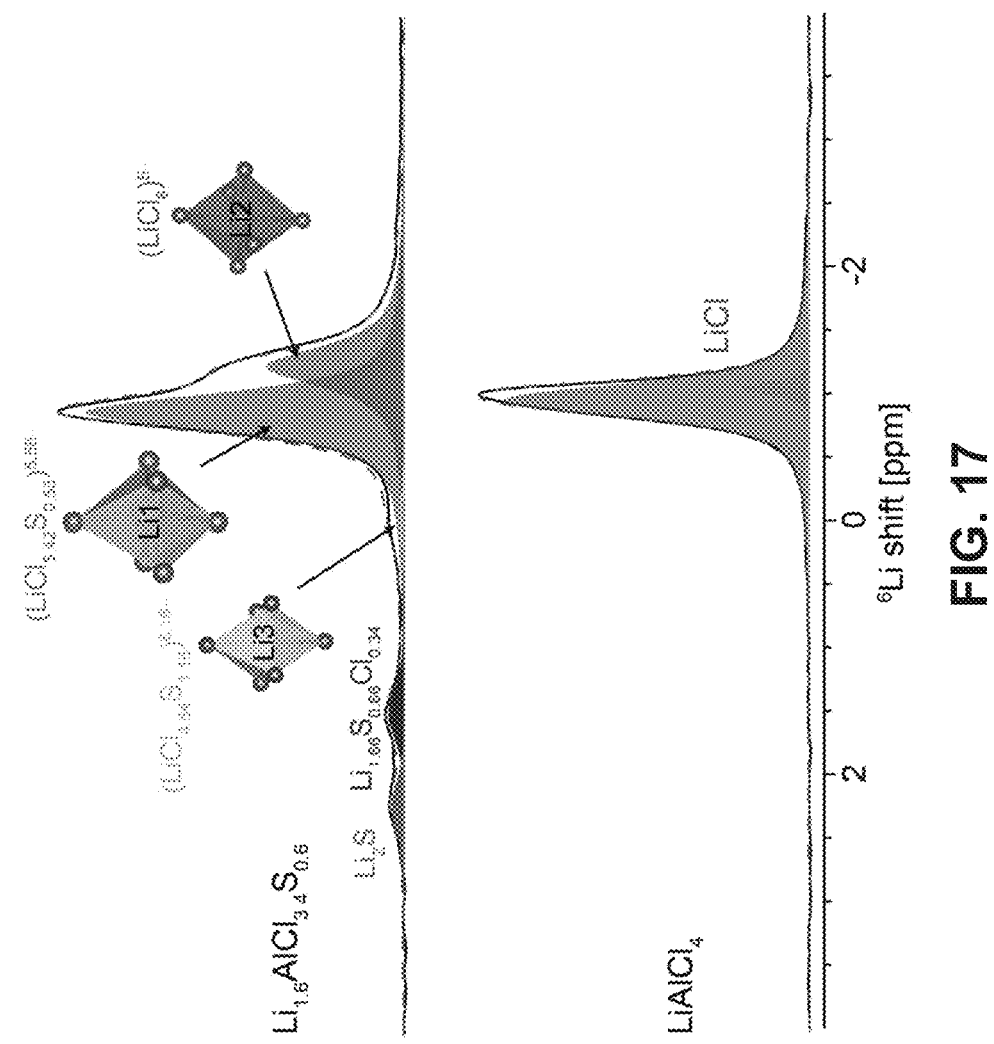
FIG. 17 shows the $^6Li$ MAS NMR spectra of $LiAlCl_4$ and $Li_{1.6}AlCl_{3.4}S_{0.6}$.

To understand the local structures of $LiAlCl_4$ and $Li_{1.6}AlCl_{3.4}S_{0.6}$, $^6Li$ MAS NMR experiments were performed. As shown in FIG. 17, the $^6Li$ MAS NMR spectrum of $LiAlCl_4$ reveals a major resonance at −0.92 ppm assigned to octahedrally coordinated Li1. This is consistent with findings from a previous study. In addition, a minor resonance at −1.08 ppm is assigned to LiCl.[24] After incorporating $S^{2-}$ in the parent material, the $^6Li$ NMR spectra of $Li_{1.6}AlCl_{3.4}S_{0.6}$ is characterized by five distinct resonances at −0.89, −1.24, −0.07, 1.48, and 2.21 ppm—indicating changes in the local Li environment. The minor peak observed at 2.21 ppm corresponds to the $Li_2S$ impurity.[25] The phase quantification is given in Table 14. The resonances at −0.89, −1.24, and −0.07 ppm are assigned to the octahedrally coordinated Li1, Li2, and Li3 sites, respectively—in agreement with the results from structural refinement. In addition, there is an extra peak at 1.48 ppm, likely from the $Li_{1.66}S_{0.66}Cl_{0.34}$ phase identified with the Rietveld refinement of the high-resolution diffraction pattern.

$^7Li$ spin-lattice relaxation time (Ti) is a useful indicator of ion dynamics.[10,26] According to the Bloembergen, Purcell, and Pound (BPP) model, $T_1$ relaxation time is a function of motional rate $$\left(T_c^{-1}\right),^{27} \quad \frac{1}{T_1} = \frac{3\gamma^4\hbar^2}{10r_0^6}\left[\frac{\tau_c}{1+\omega_0^2\tau_c^2} + \frac{4\tau_c}{1+4\omega_0^2\tau_c^2}\right],$$

where $\gamma$ is the gyromagnetic ratio, $\hbar$ is the reduced Planck's constant, $r_0$ is the interatomic distance, $\omega_0=\gamma B_0$ is the Larmor frequency, and $B_0$ is the external magnetic field strength.

In the fast-motion regime ($\omega_0\tau_c \ll 1$), $T_1$ increases with increasing motional rate, while in the slow-motion regime ($\omega_0\tau_c \gg 1$), $T_1$ decreases with increasing motional rate. In addition, a resonance can lie in the intermediate region where $\omega_0\tau_c \approx 1$.[27] Variable-temperature $^7Li$ NMR $T_1$ relaxation data of $Li_{1.6}AlCl_{3.4}S_{0.6}$ reveals a decrease in $T_1$ relaxation time with increasing temperature and, thus, suggesting $Li^+$ dynamics in $Li_{1.6}AlCl_{3.4}S_{0.6}$ lie in the slow-motion regime ($\omega_0\tau_c \gg 1$). Therefore, a shorter $T_1$ value will correlate with faster ion mobility. As presented in Table 15, the $^7Li$ $T_1$ relaxation time significantly decreases from $LiAlCl_4$ to $Li_{1.6}AlCl_{3.4}S_{0.6}$, suggesting enhanced $Li^+$ mobility[28] with sulfur incorporation.

TABLE 14

Li (%) distribution in various components in $LiAlCl_4$
and $Li_{1.6}AlCl_{3.4}S_{0.6}$ from $^6Li$ NMR analysis.

| Sample | $^6Li$ (%) Li1 | Li2 | Li3 | $Li_2S$ | LiCl | $Li_{1.66}S_{0.66}Cl_{0.34}$ |
|--------|-----|-----|-----|---------|------|------------------------------|
| $LiAlCl_4$ | 92.5 | — | — | — | 7.5 | — |
| $Li_{1.6}AlCl_{3.4}S_{0.6}$ | 60.6 | 31.1 | 1.3 | 3.1 | — | 3.9 |

TABLE 15

| $^7$Li spin-lattice relaxation time ($T_1$) of LiAlCl$_4$ and Li$_{1.6}$AlCl$_{3.4}$S$_{0.6}$ | |
|---|---|
| Sample | $^7$Li $T_1$[s] |
| LiAlCl$_4$ | 5.2 |
| Li$_{1.6}$AlCl$_{3.4}$S$_{0.6}$ | 3.1 |

Ion Transport Pathways Determined by Tracer-Exchange NMR

To directly probe the Li$^+$ transport pathways in Li$_{1.6}$AlCl$_{3.4}$S$_{0.6}$, tracer-exchange NMR is employed.[32] By identifying and quantifying $^6$Li$^+$ à $^7$Li$^+$ exchange under an applied biased potential, the preferential pathway utilized by Li$^+$ ions for migration is directly mapped out—facilitating the identification of active sites for Li$^+$ transport.[29-32] The experimental configuration involves sandwiching Li$_{1.6}$AlCl$_{3.4}$S$_{0.6}$ pellet between two $^6$Li foils. An externally applied potential gradient establishes a driving force for $^6$Li$^+$ ions in the $^6$Li foils to move toward and exchange with $^7$Li$^+$ in the Li$_{1.6}$AlCl$_{3.4}$S$_{0.6}$ pellet. Consequently, the preferential Li$^+$ transport pathways are selectively enriched with $^6$Li$^+$ ions. The $^6$Li NMR spectra reveal changes in the relative intensities of resonances assigned to distinct Li$^+$ environments. Notably, a significant increase in the intensity of the Li1 and Li2 resonances is observed, suggesting the major involvement of Li1 and Li2 in ion conduction. In addition, the Li3 resonance shows a small intensity enhancement after cycling. The enhancement of these resonances suggests that Li1, Li2, and Li3 all participate in Li$^+$-ion transport within the Li$_{1.6}$AlCl$_{3.4}$S$_{0.6}$ solid electrolyte.

AIMD Simulations

Figures 18A, 18B, 18C, 18D:
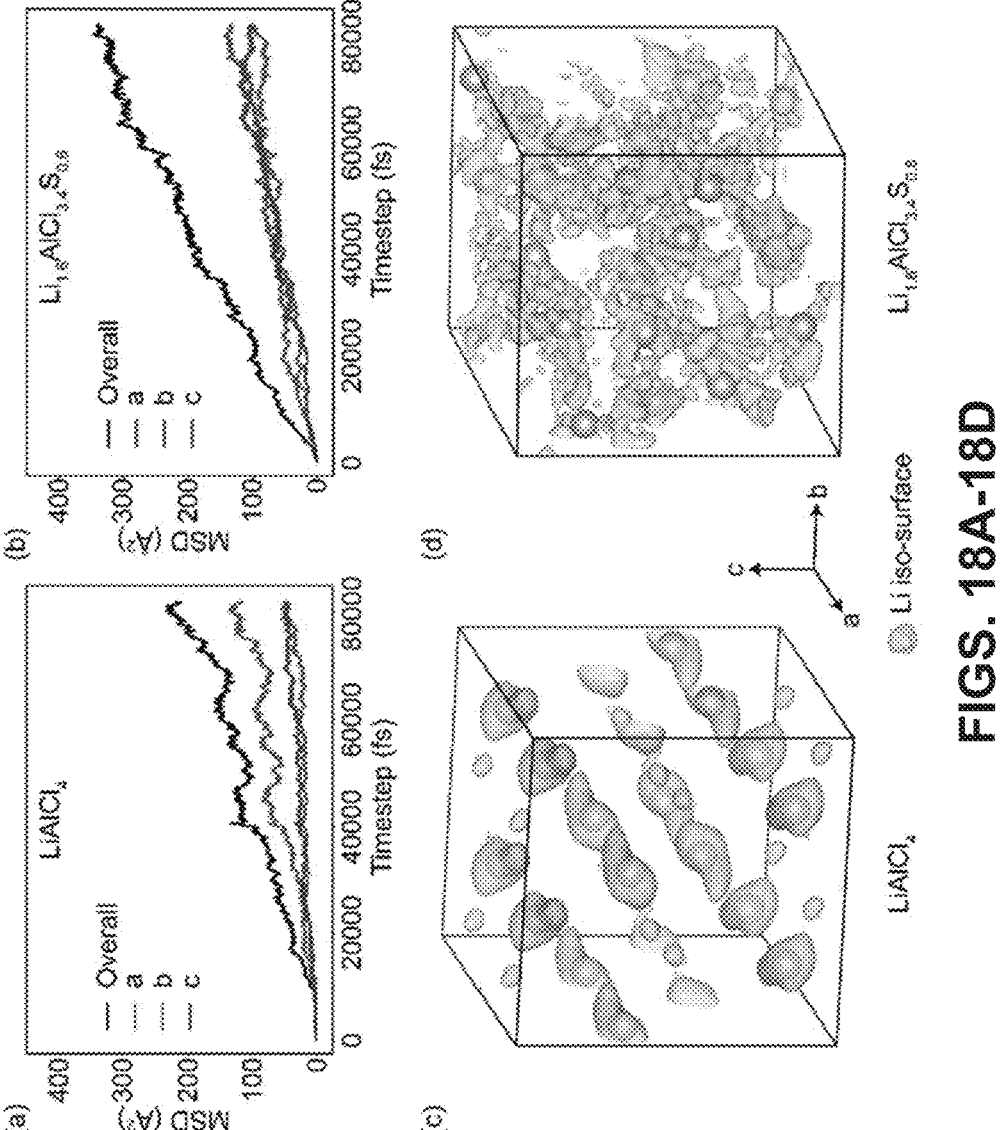
FIGS. 18A-18D show the mean square displacement (MSD) of $Li^+$ in (a) $LiAlCl_4$ and (b) $Li_{1.6}AlCl_{3.4}S_{0.6}$ generated from AIMD simulations. $Li^+$ (yellow) probability density map of $LiAlCl_4$ (c) and $Li_{1.6}AlCl_{3.4}S_{0.6}$ (d) in a 2×2×1 cell based on AIMD simulations at 900 K.

To further understand the effect of Cl—S anion mixing on the Li$^+$ density distribution and diffusion, AIMD simulations are employed for LiAlCl$_4$ and Li$_{1.6}$AlCl$_{3.4}$S$_{0.6}$ in a 2×2×1 cell. The mean square displacements (MSD) of Li$^+$ (FIGS. 18$a$ & $b$) and distribution probability (FIG. 18$c$ & $d$) for Li at 900 K were calculated. The MSD plots demonstrate that Li$^+$ can diffuse in all three directions, with higher diffusion observed along the b direction in LiAlCl$_4$. However, with Cl—S anion mixing, Li$^+$ diffusion along the a and c directions increases significantly, resulting in comparable MSDs in all three directions in Li$_{1.6}$AlCl$_{3.4}$S$_{0.6}$. This transformation indicates that L$_{1.6}$AlCl$_{3.4}$S$_{0.6}$ is a 3D ion conductor with a uniform ion transport network in all three dimensions. Furthermore, the overall MSD of Li$^+$ shows a 50% increase upon Cl—S anion diversification compared to LiAlCl$_4$. The AIMD simulation of Li$^+$ trajectories (i.e., Li$^+$ probability density) in LiAlCl$_4$ shows a localized "cage-like" Li$^+$ diffusion pattern with few interstitial jumps, indicating limited long-range Li$^+$ migration. In comparison, Li$_{1.6}$AlCl$_{3.4}$S$_{0.6}$ exhibits a delocalized Li$^+$ diffusion network, suggesting improved macroscopic Li$^+$ migration and, consequently, enhanced Li$^+$ conduction in Li$_{1.6}$AlCl$_{3.4}$S$_{0.6}$.

Electrochemical Properties

Figures 19A, 19B, 19C, 19D:
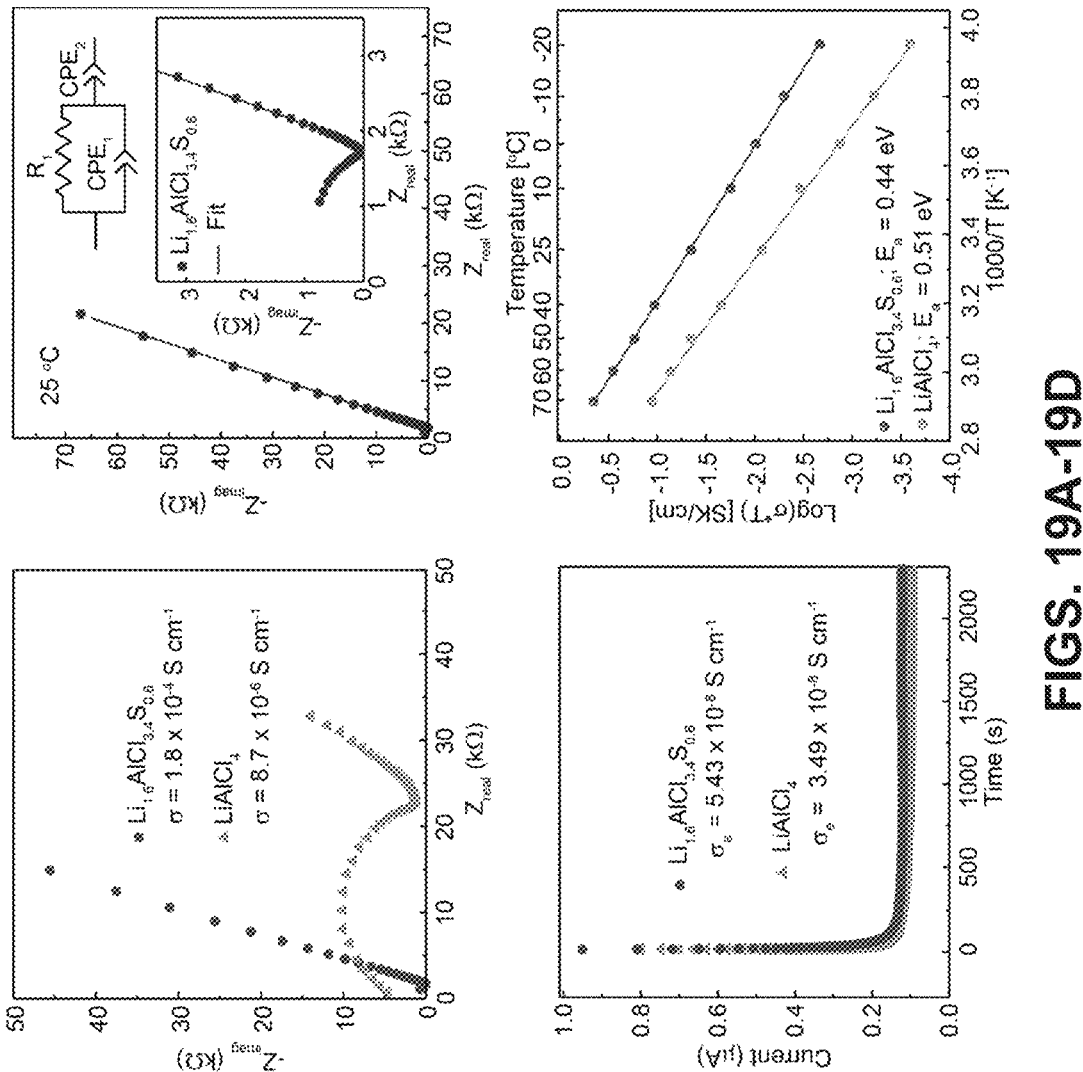
FIGS. 19A-19D show the charge transport properties of $LiAlCl_4$ and $L_{1.6}AlCl_{3.4}S_{0.6}$. (a) Nyquist plots of $LiAlCl_4$ and $L_{1.6}AlCl_{3.4}S_{0.6}$. (b) Exemplary equivalent circuit fitting of the Nyquist plot for $Li_{1.6}AlCl_{3.4}S_{0.6}$ measured at 25° C. (c) Electronic conductivities were determined using DC polarization, and (d) Arrhenius plots and activation energies for ion transport in $LiAlCl_4$ and $Li_{1.6}AlCl_{3.4}S_{0.6}$.

To examine ion transport properties of all prepared SEs, variable-temperature electrochemical impedance spectroscopy (EIS) was employed, and the corresponding Nyquist plots at 25° C. are presented in FIG. 19$a$ with a corresponding exemplary equivalent circuit fitting shown in FIG. 19$b$. The results from the EIS analysis are given in Table 16. Based on fitted resistances from the Nyquist plot using equivalent circuit modeling, the conductivities of LiAlCl$_4$ and Li$_{1.6}$AlCl$_{3.4}$S$_{0.6}$ are 0.008 mS cm$^{-1}$ and 0.18 mS cm$^{-1}$, respectively. (FIG. 19$a$). To confirm the conductivities are due to ionic transport, the DC polarization measurements[23]

were performed, and the plots for LiAlCl$_4$ and Li$_{1.6}$AlCl$_{3.4}$S$_{0.6}$ are shown in FIG. 19$c$. The current value upon plateauing corresponds to electronic conductivities of 3.49×10$^{-8}$ S cm$^{-1}$ and 5.43×10$^{-8}$ S cm$^{-1}$ for LiAlCl$_4$ and Li$_{1.6}$AlCl$_{3.4}$S$_{0.6}$, respectively, thereby confirming negligible electronic contribution to the measured total conductivities of the samples. The ionic conductivity of Li$_{1.6}$AlCl$_{3.4}$S$_{0.6}$ is approximately twenty-fold greater than LiAlCl$_4$ at room temperature. The significant increase in ionic conductivity of Li$_{1.6}$AlCl$_{3.4}$S$_{0.6}$ can be attributed to the local disorder and "Li-stuffing" of the Li3-octahedra that connect with neighboring Li1/Li2 octahedra and the substitution of Cl with more polarizable S anions. The energy barrier for Li-ion transport ($E_a$) was calculated from the variable-temperature EIS measurements between 0° C. to 70° C. The Arrhenius-type plot of LiAlCl$_4$ and Li$_{1.6}$AlCl$_{3.4}$S$_{0.6}$ are shown in FIG. 19$d$. A decrease in $E_a$ from 0.51 eV to 0.44 eV is observed from LiAlCl$_4$ to Li$_{1.6}$AlCl$_{3.4}$S$_{0.6}$. This decrease in activation energy correlates with the increase in ionic conductivity.[33] This trend agrees with the energy barrier obtained from the Bond Valence Site Energy (BVSE) calculation.

TABLE 16

| DC ionic conductivity at 25° C., electronic conductivity at 25° C., activation energy, and Arrhenius prefactor of LiAlCl$_4$ and Li$_{1.6}$AlCl$_{3.4}$S$_{0.6}$. | | | | |
|---|---|---|---|---|
| Composition | $\sigma_{DC,25°\ C.}$ [S cm$^{-1}$] | $\sigma_{e,25°\ C.}$ [S cm$^{-1}$] | $E_a$ [eV] | Log($\sigma_0$) [S cm$^{-1}$ K] |
| LiAlCl$_4$ | 8.65 × 10$^{-6}$ | 3.49 × 10$^{-8}$ | 0.51 | 6.55 |
| Li$_{1.6}$AlCl$_{3.4}$S$_{0.6}$ | 1.80 × 10$^{-4}$ | 5.43 × 10$^{-8}$ | 0.44 | 6.07 |

Cyclic Voltammetry and Galvanostatic Cycling of ASSB Half-Cells

Figure 20:
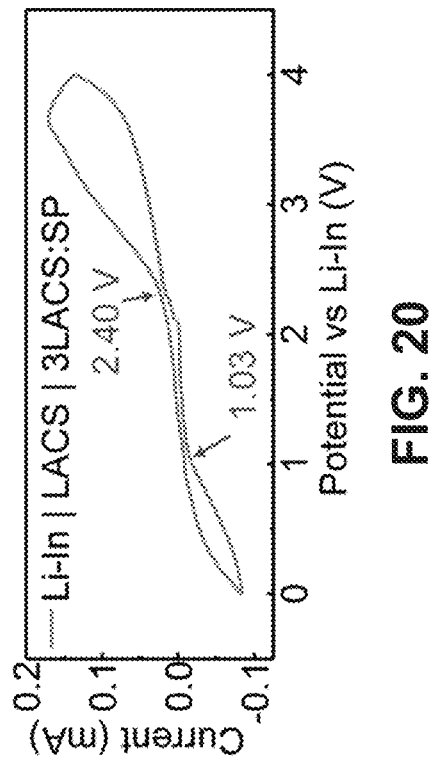
FIG. 20 shows the cyclic voltammogram of $L_{1.6}AlCl_{3.4}S_{0.6}$ using carbon black (Super P) as the electronic conductive medium in $3Li_{1.6}AlCl_{3.4}S_{0.6}$:SP. An electrochemical stability window of 1.03 V to 2.40 V is obtained for $Li_{1.6}AlCl_{3.4}S_{0.6}$.

Conventionally, CV measurements were done using stainless steel as the blocking electrode, which fails to accurately measure the oxidation and reduction current of SEs due to the limited electrical contact area of the SE and the planar ion-blocking electrode.[10,34] To overcome this and estimate the oxidation-reduction reactions of the SE, we performed CV utilizing a 3SE:C (mass ratio) composite cathode in the Li—In|SE|3SE:C half-cell setup, according to the literature.[35-37] In this setup, carbon serves as an electronic conductive medium in the composite cathode, enabling increased SE surface area in electrical contact with the electrode and consequential detection of degradation current.[10,16,34-36,36-40] FIG. 20 shows the voltammograms of Li$_{1.6}$AlCl$_{3.4}$S$_{0.6}$ with a scanning window of 0-4 V vs. Li—In. The first cathodic peak starts at the voltage of 1.04 V vs. Li—In. This voltage is assigned to the electrolyte reduction to form Li$_2$S and AlCl$_3$.[10,16,41] The CV for Li$_{1.6}$AlCl$_{3.4}$S$_{0.6}$ indicates the onset oxidation voltage of 2.4 V vs. Li—In. This is reasonable as most of the reported sulfide solid electrolytes have a lower stability window than halides (LiAlCl$_4$).[42,43] So, the electrochemical stability window of the prepared Li$_{1.6}$AlCl$_{3.4}$S$_{0.6}$ is in the range of 1.04-2.41V vs. Li—In, corresponding to the 1.64-3.01 V vs Li/Li$^+$.

Titanium disulfide (TiS$_2$) was employed as the cathode active material (CAM) in the half-cell configurations for electrochemical evaluation. Li—In|Li$_6$PS$_5$Cl|2(LiAlCl$_4$):TiS$_2$ and Li—In|Li$_6$PS$_5$Cl|2(Li$_{1.6}$AlCl$_{3.4}$S$_{0.6}$):TiS$_2$ cells were fabricated according to previous studies.[10,16] A Li—In anode was employed for enhanced stability against SEs and reduced dendrite formation through micropores—reducing the risk of short circuits.[44] Li$_6$PS$_5$Cl was utilized as the separator due to its high ionic conductivity and stability against Li metal. The electrochemical performance of these half-cells was assessed through a series of rate capability tests, spanning charging/discharging currents from 0.1 C to 2 C conducted under galvanostatic conditions at −22° C. Each rate was applied over five cycles (0.1 C~0.14 mA $cm^{-2}$, 0.2 C~0.28 mA $cm^{-2}$, 0.5 C~0.70 mA $cm^{-2}$, 1 C~1.40 mA $cm^{-2}$, and 2 C~2.80 mA $cm^{-2}$) followed by 125 cycles at 0.2 C. A theoretical capacity of 239 mAh $g^{-1}$ for $TiS_2$ was used to calculate the charge-discharge rates.

Figures 21A, 21B, 21C:
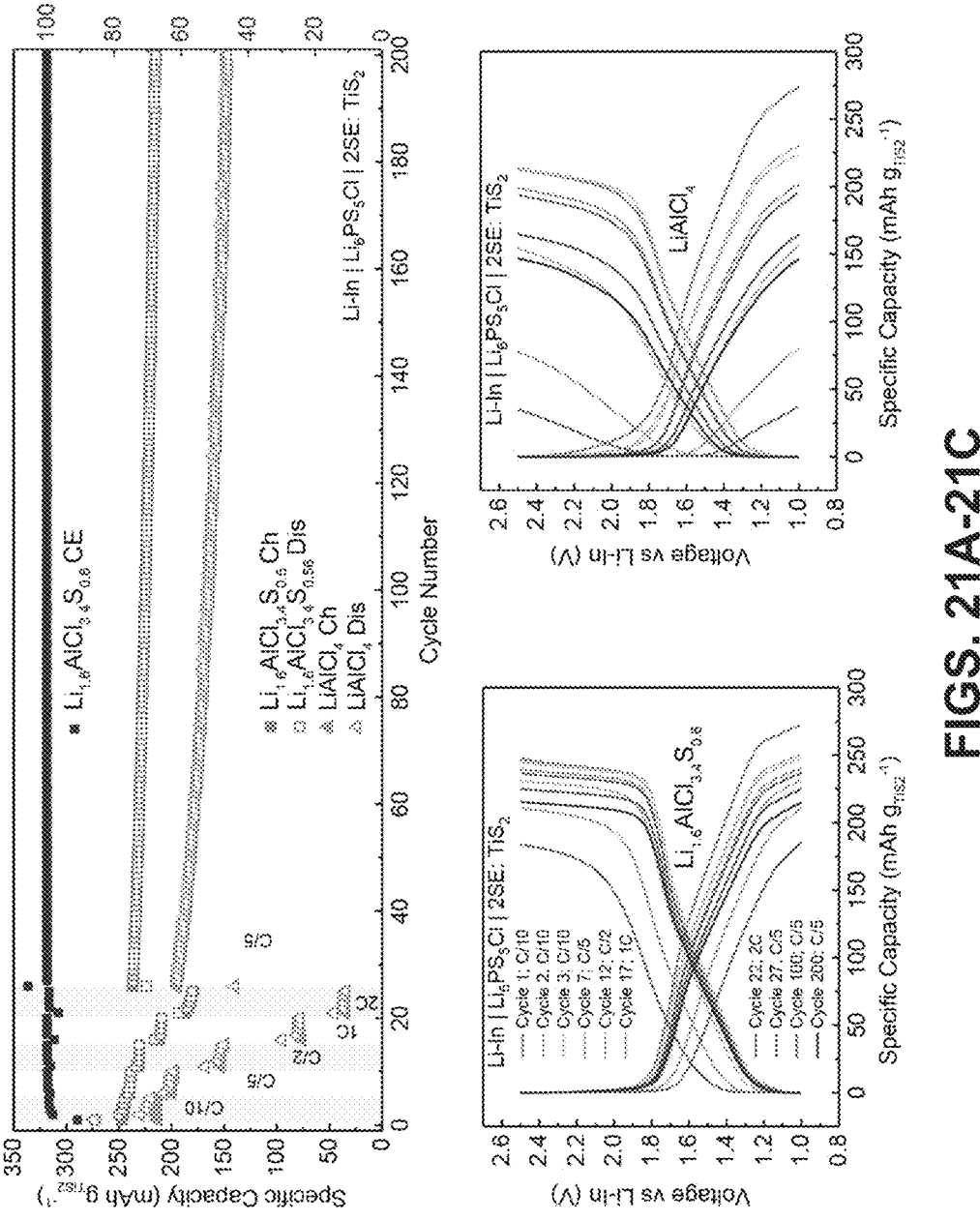
FIGS. 21A-21C show the galvanostatic cycling of 2SE: $TiS_2$ catholyte with argyrodite $Li_6PS_5Cl$ as the separator. (a) Rate performance of $Li—In|Li_6PS_5Cl|2SE:TiS_2$ cell ($SE=LiAlCl_4$ or $Li_{1.6}AlCl_{3.4}S_{0.6}$) followed by long-term cycling at C/5, where C=239 mAh/g. Voltage profile of Cycle 1 along with the $2^{nd}$ cycles of each C-rate for a (b) $Li—In|Li_6PS_5Cl|2(Li_{1.6}AlCl_{3.4}S_{0.6}):TiS_2$ cell and (c) $Li—In|Li_6PS_5Cl|2(LiAlCl_4):TiS_2$ cell.
Figures 22A, 22B:
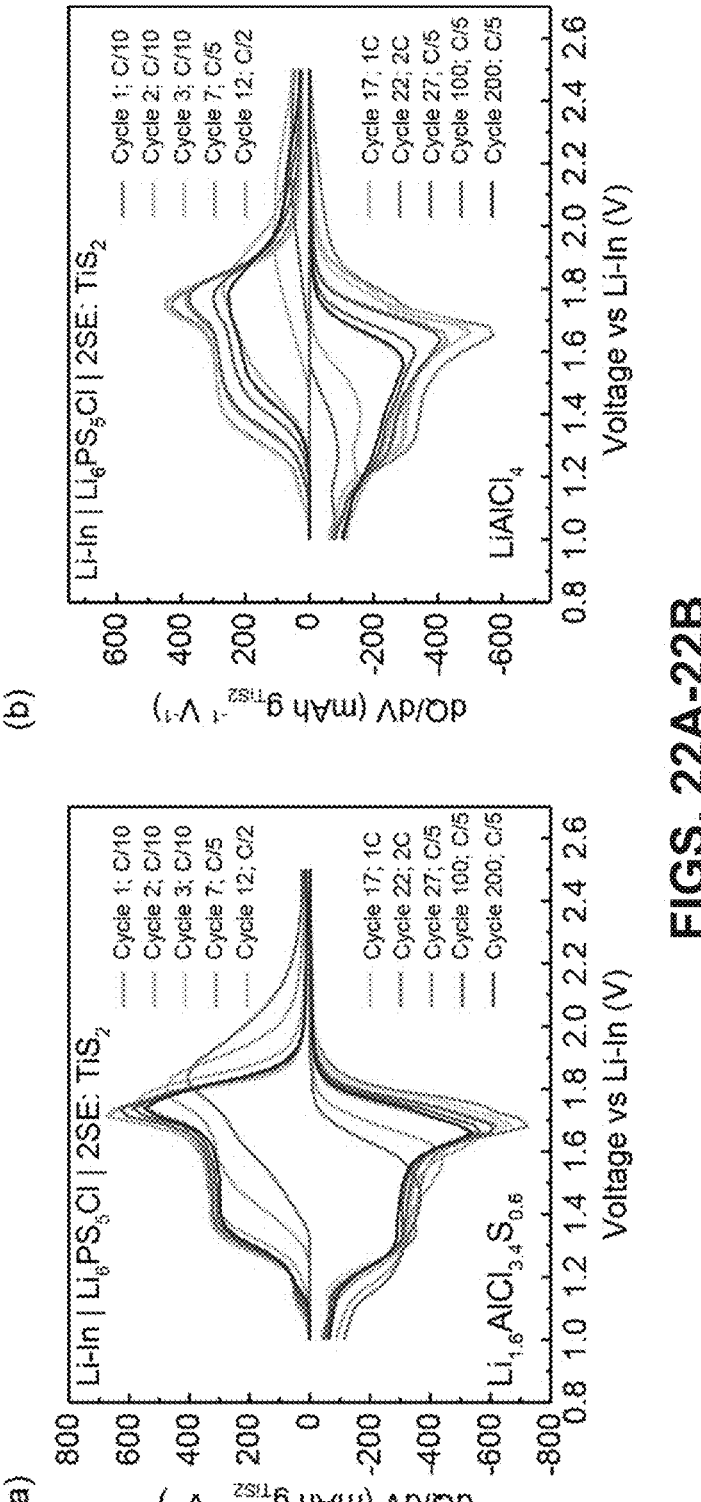
FIGS. 22A-22B show the differential capacity plots of $Li—In|LPSCl|2SE:TiS2$ cells using (a) $L_{1.6}AlCl_{3.4}S_{0.6}$ and (b) $LiAlCl4$ as the solid electrolyte (SE).

FIG. 21a illustrates the variation in specific capacity with cycle number for the half-cell configurations, while FIGS. 21b,c display the voltage profiles for select cycles. Initially, the cell incorporating $LiAlCl_4$ demonstrated a discharge capacity of approximately 273 mAh $g^{-1}$ and a charge capacity of 213 mAh $g^{-1}$, whereas the $Li_{1.6}AlCl_{3.4}S_{0.6}$-containing cell exhibited a comparable initial discharge capacity of 272 mAh $g^{-1}$ and a higher charge capacity of 248 mAh $g^{-1}$ (FIG. 21a,b). Upon the second discharge, the capacity for the $LiAlCl_4$-based cell declined to 208 mAh $g^{-1}$, whereas the $Li_{1.6}AlCl_{3.4}S_{0.6}$-based cell showed a reduced yet more stable capacity of 240 mAh $g^{-1}$, eventually stabilizing around 239 mAh $g^{-1}$ (FIG. 21a,b). This is likely due to the formation of a stable solid-electrolyte interface (SEI) during the first cycle. The lower capacity observed in the $LiAlCl_4$-based cell is primarily due to its low ionic conductivity of the solid electrolyte (SE), which restricts the efficient utilization of the active material—leading to a lower capacity.[45] Interestingly, initial capacities recorded for both cells surpassed the theoretical capacity of $TiS_2$, (239 mAh $g^{-1}$). This is attributable to the unidentified reversible redox behavior of the SE in addition to the $Ti^{3+/4+}$ redox (FIGS. 22a-b).[46,47]

The $Li_{1.6}AlCl_{3.4}S_{0.6}$-containing cell exhibited a capacity of 180 mAh $g^{-1}$ even at a high discharge rate of 2 C, indicative of exceptional rate performance in contrast to the significantly reduced capacity of 37 mAh $g^{-1}$ observed at a similar rate for the $LiAlCl_4$-based cells. Upon returning to 0.2 C after 26 cycles, both cell configurations demonstrated remarkable stability over 200 cycles. Furthermore, these cells maintained a high coulombic efficiency exceeding 99% throughout this extended cycle period (FIG. 21a). Between the 27th and 200th cycles, the $Li_{1.6}AlCl_{3.4}S_{0.6}$-based cell demonstrated a capacity retention of approximately 90%, whereas the $LiAlCl_4$-based cell exhibited a faster degradation rate. The superior performance of the $Li—In|Li_6PS_5Cl|2(Li_{1.6}AlCl_{3.4}S_{0.6})$:$TiS_2$ cell is attributed to the synergistic benefits of enhanced ionic conductivity, electrochemical stability, and improved utilization of cathode active materials.[70]

CONCLUSION

Developing inexpensive SEs using earth-abundant elements is imperative to reduce the cost of ASSBs for widespread applications in electric vehicles and consumer electronics. In this work, we synthesized a new lithium chalcohalide solid electrolyte, $Li_{1.6}AlCl_{3.4}S_{0.6}$, with a room-temperature ionic conductivity of 0.18 mS $cm^{-1}$. Structural characterization reveals that the enhanced ionic conductivity of $Li_{1.6}AlCl_{3.4}S_{0.6}$ strongly correlates with the formation of face- and edge-sharing octahedrally coordinated lithium sites. The face- and edge-shared octahedra create low-energy conduction pathways that promote 3D $Li^+$ conduction, further confirmed by AIMD simulations using the refined structures. [6,7]Li MAS NMR combined with tracer exchange and relaxometry reveals increased ion mobility and participation of all $Li^+$ sites in ion conduction. $Li_{1.6}AlCl_{3.4}S_{0.6}$ demonstrates good long-term cycling stability and rate performance in ASSBs, achieving a specific capacity of 180 mAh $g^{-1}$ at a fast charging rate of 2 C in a $Li—In|Li_6PS_5Cl|2(Li_{1.6}AlCl_{3.4}S_{0.6})$:$TiS_2$ battery cell, compared to 37 mAh $g^{-1}$ in the $LiAlCl_4$-containing cell. The cost-effectiveness, combined with the demonstrated high performance, makes $Li_{1.6}AlCl_{3.4}S_{0.6}$ an excellent candidate as electrolytes for ASSBs.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES FOR EXAMPLE 1

(1) Flores-Gonzalez, N.; Minafra, N.; Dewald, G.; Reardon, H.; Smith, R. I.; Adams, S.; Zeier, W. G.; Gregory, D. H. Mechanochemical Synthesis and Structure of Lithium Tetrahaloaluminates, LiAlX 4 (X=Cl, Br, 1): A Family of Li-Ion Conducting Ternary Halides. ACS Materials Lett. 2021, 3 (5), 652-657.

(2) Scholz, F.; Unkrig, W.; Eiden, P.; Schmidt, M. A.; Garsuch, A.; Krossing, I. Synthesis, Spectroscopic Characterization, Crystal Structures, Energetics, and Thermal Stabilities of Li[AlX 4](X=Cl, Br): Investigation and Performance of Their Electrolyte Solutions. Eur. J. Inorg. Chem. 2015, 2015 (19), 3128-3138.

(3) Gao, T.; Wang, B.; Wang, L.; Liu, G.; Wang, F.; Luo, H.; Wang, D. LiAlCl4·3SO2 as a High Conductive, Non-Flammable and Inorganic Non-Aqueous Liquid Electrolyte for Lithium Ion Batteries. Electrochimica Acta 2018, 286, 77-85.

(4) Weller, J. M.; Li, M. M.; Polikarpov, E.; Han, K. S.; Kidner, N.; Patel, A.; Nguyen, M.; Stout, M.; Gossett, M.; Jung, K.; Reed, D. M.; Sprenkle, V. L.; Li, G. Unlocking the NaCl—AlCl3 Phase Diagram for Low-Cost, Long-Duration Na—Al Batteries. Energy Storage Materials 2023, 56, 108-120.

(5) Campos, J. M. S. D.; Viccini, L. F. Cytotoxicity of Aluminum on Meristematic Cells of *Zea Mays* and *Allium Cepa*. Caryologia 2003, 56 (1), 65-73.

(6) Park, J.; Son, J. P.; Ko, W.; Kim, J.-S.; Choi, Y.; Kim, H.; Kwak, H.; Seo, D.-H.; Kim, J.; Jung, Y. S. NaAlCl 4: New Halide Solid Electrolyte for 3 V Stable Cost-Effective All-Solid-State Na-Ion Batteries. ACS Energy Lett. 2022, 7 (10), 3293-3301.

(7) Richards, W. D.; Miara, L. J.; Wang, Y.; Kim, J. C.; Ceder, G. Interface Stability in Solid-State Batteries. Chem. Mater. 2016, 28 (1), 266-273.

(8) Mo, Y.; Liu, Y.; He, X.; Ling, C. LiAlC14 Derivatives in the Space Group of Pnma as Li Super-Ionic Conductor, Solid Electrolyte, and Coating Layer for Li Metal Battery and Li-Ion Battery. U.S. Pat. No. 11,462, 766 B2.

(9) Tanibata, N.; Takimoto, S.; Nakano, K.; Takeda, H.; Nakayama, M.; Sumi, H. Metastable Chloride Solid Electrolyte with High Formability for Rechargeable All-Solid-State Lithium Metal Batteries. ACS Materials Lett. 2020, 2 (8), 880-886.

(10) Weppner, W.; Huggins, R. A. Ionic Conductivity of Solid and Liquid LiAlCl4. Journal of The Electrochemical Society 1977, 124 (1), 35-38.

(11) Deck, M. J.; Hu, Y.-Y. Leveraging Local Structural Disorder for Enhanced Ion Transport. Journal of Materials Research 2023, 38 (10), 2631-2644.

(12) Wood, B. C.; Varley, J. B.; Kweon, K. E.; Shea, P.; Hall, A. T.; Grieder, A.; Ward, M.; Aguirre, V. P.; Rigling, D.; Lopez Ventura, E.; Stancill, C.; Adelstein, N. Paradigms of Frustration in Superionic Solid Electrolytes. Phil. Trans. R. Soc. A. 2021, 379 (2211), 20190467.

(13) Karabelli, D.; Birke, K. P.; Weeber, M. A Performance and Cost Overview of Selected Solid-State Electrolytes: Race between Polymer Electrolytes and Inorganic Sulfide Electrolytes. Batteries 2021, 7 (1), 18.

(14) Patel, S. V.; Banerjee, S.; Liu, H.; Wang, P.; Chien, P.-H.; Feng, X.; Liu, J.; Ong, S. P.; Hu, Y.-Y. Tunable Lithium-Ion Transport in Mixed-Halide Argyrodites Li6-XPS5-XClBrx: An Unusual Compositional Space. Chem. Mater. 2021, 33 (4), 1435-1443.

(15) Feng, X.; Chien, P.-H.; Zhu, Z.; Chu, I.-H.; Wang, P.; Immediato-Scuotto, M.; Arabzadeh, H.; Ong, S. P.; Hu, Y.-Y. Studies of Functional Defects for Fast Na-Ion Conduction in Na3-yPS4-xClx with a Combined Experimental and Computational Approach. Advanced Functional Materials 2019, 29 (9), 1807951.

(16) Shastri, A.; Rons, N.; Ding, Q.-P.; Kmiec, S. J.; Olson, M.; Furukawa, Y.; Martin, S. W. The Novel Oxy-Sulfide Glassy Ionic Conductors Na4P2S7-XOx $0 \leq x \leq 7$: Understanding the Features of Static and Dynamic Cations. Solid State Ionics 2023, 402, 116363.

(17) Olson, M.; Kmiec, S.; Martin, S. W. NaPON Doping of Na4P2S7 Glass and Its Effects on the Structure and Properties of Mixed Oxy-Sulfide-Nitride Phosphate Glass. Inorg. Chem. 2022, 61 (44), 17469-17484.

(18) Zhang, Q.; Arnold, W.; Hood, Z. D.; Li, Y.; DeWees, R.; Chi, M.; Chen, Z.; Chen, Y.; Wang, H. Li 0.625 Al 0.125 H 0.25 Cl 0.75 O 0.25 Superionic Conductor with Disordered Rock-Salt Structure. ACS Appl. Energy Mater. 2021, 4 (8), 7674-7680.

(19) Ohno, S.; Rosenbach, C.; Dewald, G. F.; Janek, J.; Zeier, W. G. Linking Solid Electrolyte Degradation to Charge Carrier Transport in the Thiophosphate-Based Composite Cathode toward Solid-State Lithium-Sulfur Batteries. Advanced Functional Materials 2021, 31 (18), 2010620.

(20) Tsai, P.; Mair, S.; Smith, J.; Halat, D. M.; Chien, P.; Kim, K.; Zhang, D.; Li, Y.; Yin, L.; Liu, J.; Lapidus, S. H.; Reimer, J. A.; Balsara, N. P.; Siegel, D. J.; Chiang, Y. Double Paddle-Wheel Enhanced Sodium Ion Conduction in an Antiperovskite Solid Electrolyte. Advanced Energy Materials 2023, 13 (7), 2203284.

(21) Wang, K.; Ren, Q.; Zhenqi, G.; Duan, C.; Wang, J.; Zhu, F.; Fu, Y.; Hao, J.; Zhu, J.; He, L.; Wang, C.-W.; Lu, Y.; Ma, J.; Ma, C. A Cost-Effective and Humidity-Tolerant Chloride Solid Electrolyte for Lithium Batteries. Nature Communications 4410.

(22) Zhang, Z.; Roy, P.-N.; Li, H.; Avdeev, M.; Nazar, L. F. Coupled Cation-Anion Dynamics Enhances Cation Mobility in Room-Temperature Superionic Solid-State Electrolytes. Journal of the American Chemical Society 2019.

(23) Huff, L. A.; Rapp, J. L.; Baughman, J. A.; Rinaldi, P. L.; Gewirth, A. A. Identification of Lithium-Sulfur Battery Discharge Products through 6Li and 33S Solid-State MAS and 7Li Solution NMR Spectroscopy. Surface Science 2015, 631, 295-300.

(24) Duff, B. B.; Elliott, S. J.; Gamon, J.; Daniels, L. M.; Rosseinsky, M. J.; Blanc, F. Toward Understanding of the Li-Ion Migration Pathways in the Lithium Aluminum Sulfides Li 3 AlS 3 and Li 4.3 AlS 3.3 Cl 0.7 via 6,7 Li Solid-State Nuclear Magnetic Resonance Spectroscopy. Chem. Mater. 2023, 35 (1), 27-40.

(25) Nagel, R.; Wickel, C.; Senker, J.; Lutz, H. D. 6Li and 7Li MAS-NMR Studies on Fast Ionic Conducting Inverse Spinel-Type Li2-2xMg1+xCl4 and Normal Spinel-Type Li2ZnCl4. Solid State Ionics 2000, 130 (1-2), 169-173.

(26) Nagel, R.; Groß, Th. W.; Gunther, H.; Lutz, H. D. 6Li and 7Li MAS NMR Studies on Fast Ionic Conducting Spinel-Type Li2MgCl4, Li2-XCuxMgCl4, Li2-XNaxMgCl4, and Li2ZnCl4. Journal of Solid State Chemistry 2002, 165 (2), 303-311.

(27) Wu, N.; Chien, P.; Qian, Y.; Li, Y.; Xu, H.; Grundish, N. S.; Xu, B.; Jin, H.; Hu, Y.; Yu, G.; Goodenough, J. B. Enhanced Surface Interactions Enable Fast Li+ Conduction in Oxide/Polymer Composite Electrolyte. Angew Chem Int Ed 2020, 59 (10), 4131-4137.

(28) Gao, Y.; Nolan, A. M.; Du, P.; Wu, Y.; Yang, C.; Chen, Q.; Mo, Y.; Bo, S.-H. Classical and Emerging Characterization Techniques for Investigation of Ion Transport Mechanisms in Crystalline Fast Ionic Conductors. Chem. Rev. 2020, 120 (13), 5954-6008.

REFERENCES FOR EXAMPLE 2

(1) Cao, X.; Xu, S.; Zhang, Y.; Hu, X.; Yan, Y.; Wang, Y.; Qian, H.; Wang, J.; Chang, H.; Cheng, F.; Yang, Y. Fluorine-Doped High-Performance Li6PS5Cl Electrolyte by Lithium Fluoride Nanoparticles for All-Solid-State Lithium-Metal Batteries. *Trans. Tianjin Univ.* 2024.

(2) Flores-González, N.; Minafra, N.; Dewald, G.; Reardon, H.; Smith, R. I.; Adams, S.; Zeier, W. G.; Gregory, D. H. Mechanochemical Synthesis and Structure of Lithium Tetrahaloaluminates, LiAlX 4 (X=Cl, Br, I): A Family of Li-Ion Conducting Ternary Halides. *ACS Materials Lett.* 2021, 3 (5), 652-657.

(3) Scholz, F.; Unkrig, W.; Eiden, P.; Schmidt, M. A.; Garsuch, A.; Krossing, I. Synthesis, Spectroscopic Characterization, Crystal Structures, Energetics, and Thermal Stabilities of Li[AlX 4](X=Cl, Br): Investigation and Performance of Their Electrolyte Solutions. *Eur. J. Inorg. Chem.* 2015, 2015 (19), 3128-3138.

(4) Gao, T.; Wang, B.; Wang, L.; Liu, G.; Wang, F.; Luo, H.; Wang, D. LiAlCl4·3SO2 as a High Conductive, Non-Flammable and Inorganic Non-Aqueous Liquid Electrolyte for Lithium Ion Batteries. *Electrochimica Acta* 2018, 286, 77-85.

(5) Weller, J. M.; Li, M. M.; Polikarpov, E.; Han, K. S.; Kidner, N.; Patel, A.; Nguyen, M.; Stout, M.; Gossett, M.; Jung, K.; Reed, D. M.; Sprenkle, V. L.; Li, G. Unlocking the NaCl—AlCl3 Phase Diagram for Low-Cost, Long-Duration Na—Al Batteries. *Energy Storage Materials* 2023, 56, 108-120.

(6) Campos, J. M. S. D.; Viccini, L. F. Cytotoxicity of Aluminum on Meristematic Cells of *Zea Mays* and *Allium Cepa. Caryologia* 2003, 56 (1), 65-73.

(7) Tanibata, N.; Takimoto, S.; Nakano, K.; Takeda, H.; Nakayama, M.; Sumi, H. Metastable Chloride Solid Electrolyte with High Formability for Rechargeable All-Solid-State Lithium Metal Batteries. *ACS Materials Lett.* 2020, 2 (8), 880-886.

(8) Weppner, W.; Huggins, R. A. Ionic Conductivity of Solid and Liquid LiAlCl4. *Journal of The Electrochemical Society* 1977, 124 (1), 35-38.

(9) Wood, B. C.; Varley, J. B.; Kweon, K. E.; Shea, P.; Hall, A. T.; Grieder, A.; Ward, M.; Aguirre, V. P.; Rigling, D.; Lopez Ventura, E.; Stancill, C.; Adelstein, N. Paradigms of Frustration in Superionic Solid Electrolytes. *Phil. Trans. R. Soc. A.* 2021, 379 (2211), 20190467.

(10) Poudel, T. P.; Deck, M. J.; Wang, P.; Hu, Y.-Y. Transforming Li3PS4 Via Halide Incorporation: A Path to Improved Ionic Conductivity and Stability in All-Solid-State Batteries. *Advanced Functional Materials* 2024, 34 (4), 2309656.

(11) Karabelli, D.; Birke, K. P.; Weeber, M. A Performance and Cost Overview of Selected Solid-State Electrolytes: Race between Polymer Electrolytes and Inorganic Sulfide Electrolytes. *Batteries* 2021, 7 (1), 18.

(12) Patel, S. V.; Banerjee, S.; Liu, H.; Wang, P.; Chien, P.-H.; Feng, X.; Liu, J.; Ong, S. P.; Hu, Y.-Y. Tunable Lithium-Ion Transport in Mixed-Halide Argyrodites Li6-xPS5-xClBrx: An Unusual Compositional Space. *Chem. Mater.* 2021, 33 (4), 1435-1443.

(13) Feng, X.; Chien, P.-H.; Zhu, Z.; Chu, I.-H.; Wang, P.; Immediato-Scuotto, M.; Arabzadeh, H.; Ong, S. P.; Hu, Y.-Y. Studies of Functional Defects for Fast Na-Ion Conduction in Na3-yPS4-xClx with a Combined Experimental and Computational Approach. *Advanced Functional Materials* 2019, 29 (9), 1807951.

(14) Shastri, A.; Rons, N.; Ding, Q.-P.; Kmiec, S. J.; Olson, M.; Furukawa, Y.; Martin, S. W. The Novel Oxy-Sulfide Glassy Ionic Conductors Na4P2S7-xOx 0≤x≤7: Understanding the Features of Static and Dynamic Cations. *Solid State Ionics* 2023, 402, 116363.

(15) Olson, M.; Kmiec, S.; Martin, S. W. NaPON Doping of Na4P2S7 Glass and Its Effects on the Structure and Properties of Mixed Oxy-Sulfide-Nitride Phosphate Glass. *Inorg. Chem.* 2022, 61 (44), 17469-17484.

(16) Deck, M. J.; Chien, P.-H.; Poudel, T. P.; Jin, Y.; Liu, H.; Hu, Y.-Y. Oxygen-Induced Structural Disruption for Improved Li+ Transport and Electrochemical Stability of Li3PS4. *Advanced Energy Materials* 2024, 14 (4), 2302785.

(17) Zhang, Q.; Arnold, W.; Hood, Z. D.; Li, Y.; DeWees, R.; Chi, M.; Chen, Z.; Chen, Y.; Wang, H. Li 0.625 Al 0.125 H 0.25 Cl 0.75 O 0.25 Superionic Conductor with Disordered Rock-Salt Structure. *ACS Appl. Energy Mater.* 2021, 4 (8), 7674-7680.

(18) Kresse, G.; Furthmüller, J. Efficient Iterative Schemes for Ab Initio Total-Energy Calculations Using a Plane-Wave Basis Set. *Phys. Rev. B* 1996, 54 (16), 11169-11186.

(19) Blöchl, P. E. Projector Augmented-Wave Method. *Phys. Rev. B* 1994, 50 (24), 17953-17979.

(20) Perdew, J. P.; Burke, K.; Ernzerhof, M. Generalized Gradient Approximation Made Simple. *Phys. Rev. Lett.* 1996, 77 (18), 3865-3868.

(21) Ong, S. P.; Richards, W. D.; Jain, A.; Hautier, G.; Kocher, M.; Cholia, S.; Gunter, D.; Chevrier, V. L.; Persson, K. A.; Ceder, G. Python Materials Genomics (Pymatgen): A Robust, Open-Source Python Library for Materials Analysis. *Computational Materials Science* 2013, 68, 314-319.

(22) Wang, Y.; Richards, W. D.; Ong, S. P.; Miara, L. J.; Kim, J. C.; Mo, Y.; Ceder, G. Design Principles for Solid-State Lithium Superionic Conductors. *Nature Mater* 2015, 14 (10), 1026-1031.

(23) Ohno, S.; Rosenbach, C.; Dewald, G. F.; Janek, J.; Zeier, W. G. Linking Solid Electrolyte Degradation to Charge Carrier Transport in the Thiophosphate-Based Composite Cathode toward Solid-State Lithium-Sulfur Batteries. *Advanced Functional Materials* 2021, 31 (18), 2010620.

(24) Gamon, J.; Dyer, M. S.; Duff, B. B.; Vasylenko, A.; Daniels, L. M.; Zanella, M.; Gaultois, M. W.; Blanc, F.; Claridge, J. B.; Rosseinsky, M. J. Li 4.3 AlS 3.3 Cl 0.7: A Sulfide-Chloride Lithium Ion Conductor with Highly Disordered Structure and Increased Conductivity. *Chem. Mater.* 2021, 33 (22), 8733-8744.

(25) Huff, L. A.; Rapp, J. L.; Baughman, J. A.; Rinaldi, P. L.; Gewirth, A. A. Identification of Lithium-Sulfur Battery Discharge Products through 6Li and 33S Solid-State MAS and 7Li Solution NMR Spectroscopy. *Surface Science* 2015, 631, 295-300.

(26) Deck, M. J.; Hu, Y.-Y. Leveraging Local Structural Disorder for Enhanced Ion Transport. *Journal of Materials Research* 2023, 38 (10), 2631-2644.

(27) Bloembergen, N.; Purcell, E. M.; Pound, R. V. Relaxation Effects in Nuclear Magnetic Resonance Absorption. *Phys. Rev.* 1948, 73 (7), 679-712.

(28) Wu, N.; Chien, P.; Qian, Y.; Li, Y.; Xu, H.; Grundish, N. S.; Xu, B.; Jin, H.; Hu, Y.; Yu, G.; Goodenough, J. B. Enhanced Surface Interactions Enable Fast Li+ Conduction in Oxide/Polymer Composite Electrolyte. *Angew Chem Int Ed* 2020, 59 (10), 4131-4137.

(29) Wang, P.; Liu, H.; Patel, S.; Feng, X.; Chien, P.-H.; Wang, Y.; Hu, Y.-Y. Fast Ion Conduction and Its Origin in $Li_{6-x}PS_{5-x}Br_{1+x}$. *Chem. Mater.* 2020, 32 (9), 3833-3840.

(30) Zheng, J.; Hu, Y.-Y. New Insights into the Compositional Dependence of Li-Ion Transport in Polymer-Ceramic Composite Electrolytes. *ACS Appl. Mater. Interfaces* 2018, 10 (4), 4113-4120.

(31) Zheng, J.; Dang, H.; Feng, X.; Chien, P.-H.; Hu, Y.-Y. Li-Ion Transport in a Representative Ceramic-Polymer-Plasticizer Composite Electrolyte: Li, $La_3$ $Zr_2$ $O_{12}$-Polyethylene Oxide-Tetraethylene Glycol Dimethyl Ether. *J. Mater. Chem. A* 2017, 5 (35), 18457-18463.

(32) Zheng, J.; Tang, M.; Hu, Y. Lithium Ion Pathway within $Li_7$ $La_3$ $Zr_2$ $O_{12}$-Polyethylene Oxide Composite Electrolytes. *Angew Chem Int Ed* 2016, 55 (40), 12538-12542.

(33) Gao, Y.; Nolan, A. M.; Du, P.; Wu, Y.; Yang, C.; Chen, Q.; Mo, Y.; Bo, S.-H. Classical and Emerging Characterization Techniques for Investigation of Ion Transport Mechanisms in Crystalline Fast Ionic Conductors. *Chem. Rev.* 2020, 120 (13), 5954-6008.

(34) Dewald, G. F.; Ohno, S.; Kraft, M. A.; Koerver, R.; Till, P.; Vargas-Barbosa, N. M.; Janek, J.; Zeier, W. G. Experimental Assessment of the Practical Oxidative Stability of Lithium Thiophosphate Solid Electrolytes. *Chem. Mater.* 2019, 31 (20), 8328-8337.

(35) Tan, D. H. S.; Wu, E. A.; Nguyen, H.; Chen, Z.; Marple, M. A. T.; Doux, J.-M.; Wang, X.; Yang, H.; Banerjee, A.; Meng, Y. S. Elucidating Reversible Electrochemical Redox of Li6PS5Cl Solid Electrolyte. *ACS Energy Lett.* 2019, 4 (10), 2418-2427.

(36) Tian, Y.; Shi, T.; D. Richards, W.; Li, J.; Chul Kim, J.; Bo, S.-H.; Ceder, G. Compatibility Issues between Electrodes and Electrolytes in Solid-State Batteries. *Energy & Environmental Science* 2017, 10 (5), 1150-1166.

(37) Han, F.; Zhu, Y.; He, X.; Mo, Y.; Wang, C. Electrochemical Stability of Li 10 GeP 2 S 12 and Li 7 La 3 Zr 2 O 12 Solid Electrolytes. *Advanced Energy Materials* 2016, 6, n/a-n/a.

(38) Han, F.; Zhu, Y.; He, X.; Mo, Y.; Wang, C. Electrochemical Stability of Li10GeP2S12 and Li7La3Zr2 O 12 Solid Electrolytes. *Advanced Energy Materials* 2016, 6 (8), 1501590.

(39) Wang, S.; Fang, R.; Li, Y.; Liu, Y.; Xin, C.; Richter, F. H.; Nan, C.-W. Interfacial Challenges for All-Solid-State Batteries Based on Sulfide Solid Electrolytes. *Journal of Materiomics* 2021, 7 (2), 209-218.

(40) Bui, A. D.; Choi, S.-H.; Choi, H.; Lee, Y.-J.; Doh, C.-H.; Park, J.-W.; Kim, B. G.; Lee, W.-J.; Lee, S.-M.; Ha, Y.-C. Origin of the Outstanding Performance of Dual Halide Doped Li7P2S8X (X=I, Br) Solid Electrolytes for All-Solid-State Lithium Batteries. *ACS Appl. Energy Mater.* 2021, 4 (1), 1-8.

(41) Banerjee, S.; Holekevi Chandrappa, M. L.; Ong, S. P. Role of Critical Oxygen Concentration in the β-Li3PS4-xOx Solid Electrolyte. *ACS Appl. Energy Mater.* 2022, 5 (1), 35-41.

(42) Wang, S.; Bai, Q.; Nolan, A. M.; Liu, Y.; Gong, S.; Sun, Q.; Mo, Y. Lithium Chlorides and Bromides as Promising Solid-State Chemistries for Fast Ion Conductors with Good Electrochemical Stability. *Angewandte Chemie International Edition* 2019, 58 (24), 8039-8043.

(43) Richards, W. D.; Miara, L. J.; Wang, Y.; Kim, J. C.; Ceder, G. Interface Stability in Solid-State Batteries. *Chem. Mater.* 2016, 28 (1), 266-273.

(44) Qu, J.; Xiao, J.; Wang, T.; Legut, D.; Zhang, Q. High Rate Transfer Mechanism of Lithium Ions in Lithium-Tin and Lithium-Indium Alloys for Lithium Batteries. *J. Phys. Chem. C* 2020, 124 (45), 24644-24652.

(45) Minnmann, P.; Quillman, L.; Burkhardt, S.; Richter, F. H.; Janek, J. Editors' Choice-Quantifying the Impact of Charge Transport Bottlenecks in Composite Cathodes of All-Solid-State Batteries. *J. Electrochem. Soc.* 2021, 168 (4), 040537.

(46) Oh, D. Y.; Choi, Y. E.; Kim, D. H.; Lee, Y.-G.; Kim, B.-S.; Park, J.; Sohn, H.; Jung, Y. S. All-Solid-State Lithium-Ion Batteries with TiS2 Nanosheets and Sulphide Solid Electrolytes. *J. Mater. Chem. A* 2016, 4 (26), 10329-10335.

(47) Shin, B. R.; Nam, Y. J.; Kim, J. W.; Lee, Y.-G.; Jung, Y. S. Interfacial Architecture for Extra Li+ Storage in All-Solid-State Lithium Batteries. *Sci Rep* 2014, 4 (1), 5572.

The invention claimed is:

1. A compound having the formula $Li_aAl_bN_cCl_dS_f$, wherein

N is Ca or Zn;

S is sulfur;

a is from about 1 to about 2;

b is from about 0.5 to about 1;

c is from about 0.1 to about 1.5;

d is from about 2 to about 4;

f is about 1 to about 3; and the sum (a+3b+2c) is equal to the sum (d+2f).

2. The compound of claim 1, wherein the compound has an X-ray powder diffraction pattern comprising peaks at 23.5° and 38.9°±0.2° 2θ as measured by X-ray powder diffraction using an X-ray wavelength of 0.24 Å.

3. The compound of claim 1, wherein the compound has an X-ray powder diffraction pattern comprising peaks at 28.4° and 40.6°±0.2° 2θ as measured by X-ray powder diffraction using an X-ray wavelength of 0.24 Å.

4. The compound of claim 1, wherein the compound has a capacity of about 150 mAh/g to about 200 mAh/g at a discharge rate of 2 C.

5. A battery comprising the compound of claim 1.

6. A compound having the formula $Li_aAl_bCl_dBr_eS_f$, wherein

S is sulfur;

a is from about 1 to about 2;

b is from about 0.5 to about 1;

d is from about 2 to about 4;

e is greater than 0 to about 1;

f is from about 1 to about 3; and the sum (a+3b) is equal to the sum (d+e+2f).

7. The compound of claim 6, wherein the compound has a capacity of about 150 mAh/g to about 200 mAh/g at a discharge rate of 2 C.

8. A battery comprising the compound of claim 6.

* * * * *